(12) United States Patent
Mitsunaga

(10) Patent No.: US 8,248,492 B2
(45) Date of Patent: Aug. 21, 2012

(54) EDGE PRESERVING AND TONE CORRECTING IMAGE PROCESSING APPARATUS AND METHOD

(75) Inventor: Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 4 days.

(21) Appl. No.: 12/530,251

(22) PCT Filed: Jan. 23, 2009

(86) PCT No.: PCT/JP2009/051030
§ 371 (c)(1),
(2), (4) Date: Sep. 8, 2009

(87) PCT Pub. No.: WO2009/093673
PCT Pub. Date: Jul. 30, 2009

(65) Prior Publication Data
US 2011/0050934 A1    Mar. 3, 2011

(30) Foreign Application Priority Data
Jan. 25, 2008   (JP) ................... 2008-014505

(51) Int. Cl.
*H04N 5/208* (2006.01)
*G06K 9/40* (2006.01)

(52) U.S. Cl. ............ 348/252; 382/264; 382/266

(58) Field of Classification Search ........... 348/222.1, 348/252; 382/255, 264, 266, 269
See application file for complete search history.

(56) References Cited

U.S. PATENT DOCUMENTS

| | | | |
|---|---|---|---|
| 5,552,825 A * | 9/1996 | Talluri et al. ............... | 348/222.1 |
| 6,148,115 A * | 11/2000 | Mackinnon et al. .......... | 382/266 |
| 6,285,798 B1 * | 9/2001 | Lee .............................. | 382/260 |
| 6,980,696 B2 * | 12/2005 | Maurer ........................ | 382/262 |
| 7,995,839 B2 * | 8/2011 | Tanaka et al. ............... | 382/167 |
| 2008/0122953 A1 * | 5/2008 | Wakahara et al. ........... | 348/241 |

FOREIGN PATENT DOCUMENTS

| | | |
|---|---|---|
| EP | 1 515 274 | 3/2005 |
| WO | WO 01 26054 | 4/2001 |

(Continued)

OTHER PUBLICATIONS

A. Lev et al., "Iterative Enhancement of Noisy Images," IEEE Transactions on Systems, Man, and Cybernetics, vol. SMC-7, No. 6, pp. 435-442 (1977).

(Continued)

*Primary Examiner* — Timothy J Henn
(74) *Attorney, Agent, or Firm* — Finnegan, Henderson, Farabow, Garrett & Dunner, L.L.P.

(57) ABSTRACT

This present invention relates to an image processing apparatus capable of performing edge preserving smoothing processing with less operations, an image processing method, and a program. The block-histogram calculation unit 113 calculates the number of pixels, as a block histogram, included in each of luminance blocks which are obtained by dividing a luminance image in a spatial direction and a luminance direction. The block-integration value 115 calculates an integration value of luminance values of the pixels included in each of the luminance blocks as a block integration value. The weighted product-sum unit 117 calculates a general-luminance value representing average luminance of an object region to which a pixel being processed belongs using the block integration value, the block histogram, and the luminance value of the pixel being processed. This invention is applicable to digital video cameras.

20 Claims, 32 Drawing Sheets

FOREIGN PATENT DOCUMENTS

WO    WO 2006 072671    7/2006

OTHER PUBLICATIONS

D. Wang et al., "Gradient Inverse Weighted Smoothing Scheme and the Evaluation of its Performance," Computer Graphics and Image Processing, vol. 15, pp. 167-181 (1981).

M. Nagao et al., "Edge Preserving Smoothing," 3 Computer Graphics and Image Processing, vol. 9, pp. 394-407 (1978).

F. Durand et al., "Fast Bilateral Filtering for the Display of High-Dynamic-Range Images," Proc. of ACM SIGGRAPH 2002, pp. 257-266 (2002).

S. Pattanaik et al., "Adaptive Gain Control for High Dynamic Range Image Display," Proc. of Spring Conference in Computer Graphics 2002 (2002).

B. Weiss, "Fast Median and Bilateral Filtering," Proc. of ACM SIGGRAPH 2006, pp. 519-526 (2006).

Joung-Youn Kim, Lee-Sup Kim, and Seung-Ho Hwang, "An Advanced Contrast Enhancement Using Partially Overlapped Sub-Block Histogram Equalization." IEEE Transactions of Circuits and Systems for Video Technology, vol. 11. No. 4, (Apr. 2001.) pp. 475-484.

Supplementary European Search Report of Corresponding European Application No. EP 09 70 4285 mailed May 3, 2011.

* cited by examiner

FIG. 3

| G | B | G | B |
|---|---|---|---|
| R | G | R | G |
| G | B | G | B |
| R | G | R | G |

(24-1)

EDGE PRESERVING AND TONE CORRECTING IMAGE PROCESSING APPARATUS AND METHOD

CROSS-REFERENCE TO RELATED APPLICATIONS

This application is a national phase application of International Application No. PCT/JP2009/051030, filed Jan. 23, 2009, and claims the priority of Japanese Application No. 2008-014505, filed Jan. 25, 2008, the contents of both of which are incorporated herein by reference.

TECHNICAL FIELD

The present invention relates to image processing apparatuses, image processing methods, and programs, and particularly, relates to an image processing apparatus suitably used to perform tone correction on an image, an image processing method, and a program.

BACKGROUND ART

As an image processing technique, an edge preserving smoothing processing is known. The edge preserving smoothing processing is nonlinear filter processing performed for smoothing tone while considerable differences of luminance-levels in boundaries between objects in an image remain. The edge preserving smoothing processing has been used through the ages in noise reduction processing for removing small variation of luminance while contours of objects which affect visibility are preserved (refer to Non-Patent Documents 1 to 3, for example).

Furthermore, the edge preserving smoothing processing is also used in tone correction processing in which, while detail components, such as texture, are not changed, luminance-level differences among other components are compressed by making use of a characteristic in which small luminance variation of texture of an object and a luminance-level difference can be separated from each other (refer to Non-Patent Document No. 4 and 5).

In such edge preserving smoothing processing, in recent years, a technique referred to as a bilateral filter has been often used. In general, in a bilateral filter BLF(pc) for images, as shown in equation (1), a calculation in which a pixel value I(p) of a pixel positioned in the vicinity of a pixel position pc which has been weighted by a weight function $\omega$ (p−pc) in a spatial direction and a weight function $\phi$(I(p)−I(pc)) in a luminance-value direction is added is performed.

Equation (1)

$$BLF(pc) = \frac{\sum_{p\in\Omega} \omega(p-pc)\cdot\phi(I(p)-I(pc))\cdot I(p)}{\sum_{p\in\Omega} \omega(p-pc)\cdot\phi(I(p)-I(pc))} \quad (1)$$

Note that, in equation (1), a denominator on the right-hand side denotes a normalized coefficient. Non-Patent Document 4 discloses a technique of tone correction processing employing such a bilateral filter.

As shown in equation (1), in the bilateral filter, the weighting on pixels p included in a local region changes depending on luminance values of center pixels pc. Therefore, a weight value should be recalculated for each pixel, and accordingly, an amount of operation becomes larger than that required for a normal linear FIR (Finite Impulse Response) filter, for example. In Non-Patent Documents 4 and 6, to address such a disadvantage of bilateral filters, methods for increasing a calculation speed of a bilateral filter have been disclosed.

NON-Patent Document 1: A. Lev, S. W. Zucker, A. Rosenfeld, "Iterative enhancement of noise images", IEEE Trans. Systems, Man, and Cybernetics, Vol. SMC-7, 1977.

NON-Patent Document 2: D. C. C. Wang, A. H. Vagnucci, C. C. Li, "Gradient inverse weighted smoothing scheme and the evaluation of its performance", CVGIP, Vol. 15, pp. 167-181, 1981.

NON-Patent Document 3: M. Nagao, T. Matsuyama, "Edge preserving smoothing", CGIP, Vol. 9, pp. 394-407, 1978.

NON-Patent Document 4: F. Durand, J. Dorsey, "Fast bilateral filtering for the display of high-dynamic-range images", Proc. of ACM SIGGRAPH 2002, 2002.

NON-Patent Document 5: S. N. Pattanaik, H. Yee, "Adaptive gain control for high dynamic range image display", Proc. of Spring Conference in Computer Graphics 2002, 2002.

NON-Patent Document 6: Weiss, "Fast median and bilateral filtering", Proc. of ACM SIGGRAPH 2006, 2006.

DISCLOSURE OF INVENTION

Technical Problem

Meanwhile, in image processing using such edge preserving smoothing described above, edge preserving smoothing in which a large region is simultaneously processed, or edge preserving smoothing using pixels included in a comparatively large region may be required.

For example, in noise reduction processing, since edge preserving smoothing is performed with an operator size of approximately several pixels by several pixels so that high-frequency noise is removed, low-frequency noise may, on the contrary, become marked. In order to remove the low-frequency noise, the edge preserving smoothing in which a larger region is simultaneously processed should be employed. Especially, in a case where display is performed while a large gain is applied to an output of an image sensor when shooting is performed in a dark place, for example, since amplitude of low-frequency noise is considerably large, a large edge preserving smoothing operator is should be used.

Such edge preserving smoothing performed on a large area is especially required for tone correction processing.

In the tone correction processing, similarly to a small change of luminance of texture of an object, a change of luminance which occurs due to unevenness in the object is often a component to be stored without compressing a luminance difference.

For example, when a change of luminance in a region of a human face is subjected to luminance compression processing, it looks like facial expression is changed, which is adverse effect. In order to separate the change of luminance which occurs due to unevenness of an object from a luminance level difference of a contour of the object, edge preserving smoothing which is performed on a large region having a size of approximately several hundreds pixels by several hundreds pixels may be required depending on an image.

As described above, for a bilateral filter serving as edge preserving smoothing, a method for reducing an operation amount by simplifying calculation thereof has been proposed. However, such a method realizes that increase of the operation amount is limited to a linear increase with respect to a size (the number of pixels×the number of pixels) of an operator, and an operation amount for the size of several hundreds pixels by several hundreds pixels is large after all, which is unrealistic.

The present invention has been made in view of the above problems and allows edge preserving smoothing to be performed with a smaller calculation amount.

Technical Solution

An image processing apparatus according to a first aspect of the present invention which performs edge preserving processing on an input image includes frequency-value calculation means for calculating, in luminance blocks into which pixels included in spatial blocks obtained by dividing the input image in a spatial direction are classified in accordance with luminance values of the pixels whereby the spatial blocks are further divided in a luminance direction, frequency values of the pixels which belong to the luminance blocks, characteristic-value calculation means for calculating characteristic values representing characteristics of the luminance blocks, and weighted product-sum means for performing edge preserving smoothing on the input image at pixel positions of the input image, by performing weighted mean on the characteristic values using the characteristic values and the frequency values of neighborhood luminance blocks which are included in the luminance blocks obtained from some of the spatial blocks in the vicinity of the pixels in accordance with a distance between the pixels and the neighborhood luminance blocks in the spatial direction and the luminance direction.

The characteristic-value calculation means may calculate a sum of luminance values of pixels included in one of the luminance blocks as the characteristic value.

The characteristic-value calculation means may calculate center values of the luminance ranges of the luminance blocks as the characteristic values.

The weighted product-sum means may include frequency-value interpolation means for performing interpolation processing using a spatial weight determined in accordance with a relative position between one of the spatial blocks from which the neighborhood luminance blocks are obtained and the pixels and the frequency values in the neighborhood luminance blocks and calculating interpolation frequency values which are frequency values obtained by performing interpolation on the positions of the pixels for each of luminance levels corresponding to the neighborhood luminance blocks, characteristic-value interpolation means for performing interpolation processing using the spatial weight and the characteristic values of the neighborhood luminance blocks and calculating interpolation characteristic values which are characteristic values obtained by performing interpolation on the positions of the pixels for each of the luminance levels corresponding to the neighborhood luminance blocks, frequency-value product-sum means for obtaining a sum of the interpolation frequency values which are multiplied by luminance weight determined by the luminance values of the pixels and the luminance levels corresponding to the neighborhood luminance blocks and calculating a weighted sum of the interpolation frequency values using the luminance weight, characteristic-value product-sum means for obtaining a sum of the interpolation characteristic values which are multiplied by the luminance weight and calculating a weighted sum of the interpolation characteristic values using the luminance weight, and dividing means for calculating a weighted mean of the characteristic values by dividing a weighted sum of the interpolation characteristic values by a weighted sum of the interpolation frequency values.

The weighted product-sum means may include first convolution means for convolving, for each spatial block, a luminance weight function in which a luminance value is employed as a variable to the frequency values of the neighborhood luminance blocks obtained from the spatial blocks, second convolution means for convolving, for each spatial block, the luminance weight function to the characteristic values of the neighborhood luminance blocks obtained from the spatial blocks, frequency-value interpolation means for performing interpolation processing using a spatial weight determined in accordance with a relative position between one of the spatial blocks from which the neighborhood luminance blocks are obtained and the pixels and the frequency values to which the luminance weight function is convolved, and calculating interpolation frequency values which are frequency values obtained through interpolation performed on the luminance values of the pixels at the pixel positions, characteristic-value interpolation means for performing interpolation processing using the spatial weight and the characteristic values to which the luminance weight function is convolved, and calculating interpolation characteristic values which are characteristic values obtained through interpolation performed on the luminance values of the pixels at the pixel positions, and dividing means for calculating a weighted mean of the characteristic value by dividing the interpolation characteristic value.

The weighted product-sum means may further include frequency-value storage means for storing the frequency values to which the luminance weight function is convolved and which are calculated from the input image of a predetermined frame for a period of time corresponding to one frame of the input image, and characteristic-value storage means for storing the characteristic values to which the luminance weight function is convolved and which are calculated from the input image of a predetermined frame for a period of time corresponding to one frame of the input image. The frequency-value interpolation means may calculate the interpolation frequency values of the input image in a frame following the predetermined frame using the frequency values which are stored in the frequency-value storage means and which are calculated from the input image of the predetermined frame. The characteristic-value interpolation means may calculate the interpolation characteristic values of the input image in the following frame using the characteristic values which are stored in the characteristic-value storage means and which are calculated from the input image of the predetermined frame.

The image processing apparatus may further include size-reduced-image generating means for generating a size-reduced image obtained by reducing a size of the input image in accordance with the input image. The frequency-value calculation means may calculate frequency values of pixels of the size-reduced image which belong to luminance blocks obtained by dividing the size-reduced image in a spatial direction and a luminance direction, and the characteristic-value calculation means may calculate characteristic values representing characteristics of luminance blocks obtained by dividing the size-reduced image in a spatial direction and a luminance direction.

The image processing apparatus may further include frequency-value storage means for storing the frequency values calculated from the input image of a predetermined frame for a period of time corresponding to one frame of the input image, and characteristic-value storage means for storing the characteristic values calculated from the input image of a predetermined frame for a period of time corresponding to one frame of the input image. The weighted product-sum means may perform a weighted mean on the characteristic values of the input image in a frame following the predetermined frame using the frequency values which are stored in the frequency-value storage means and the characteristic values which are stored in the characteristic-value storage means.

An image processing method or a program according to the first aspect of the present invention, which performs edge preserving smoothing processing on an input image, include the steps of calculating, in luminance blocks into which pixels included in spatial blocks obtained by dividing the input image in a spatial direction are classified in accordance with luminance values of the pixels whereby the spatial blocks are further divided in a luminance direction, frequency values of the pixels which belong to the luminance blocks, calculating characteristic values representing characteristics of the luminance blocks, and performing edge preserving smoothing on the input image at pixel positions of the input image, by performing weighted mean on the characteristic values using the characteristic values and the frequency values of neighborhood luminance blocks which are included in the luminance blocks obtained from some of the spatial blocks in the vicinity of the pixels in accordance with a distance between the pixels and the neighborhood luminance blocks in the spatial direction and the luminance direction.

According to the first aspect of the present invention, in the image processing apparatus, the edge preserving smoothing processing is performed on an input image by calculating, in luminance blocks into which pixels included in spatial blocks obtained by dividing the input image in a spatial direction are classified in accordance with luminance values of the pixels whereby the spatial blocks are further divided in a luminance direction, frequency values of the pixels which belong to the luminance blocks, calculating characteristic values representing characteristics of the luminance blocks, and performing edge preserving smoothing on the input image at pixel positions of the input image, by performing weighted mean on the characteristic values using the characteristic values and the frequency values of neighborhood luminance blocks which are included in the luminance blocks obtained from some of the spatial blocks in the vicinity of the pixels in accordance with a distance between the pixels and the neighborhood luminance blocks in the spatial direction and the luminance direction.

An image processing apparatus according to a second aspect of the present invention, which performs tone correction on an input image, includes frequency-value calculation means for calculating, in luminance blocks into which pixels included in spatial blocks obtained by dividing the input image in a spatial direction are classified in accordance with luminance values of the pixels whereby the spatial blocks are further divided in a luminance direction, frequency values of the pixels which belong to the luminance blocks, characteristic-value calculation means for calculating characteristic values representing characteristics of the luminance blocks, weighted product-sum means for calculating a general luminance value representing average brightness of an object region including the pixels in the input image at pixel positions of the input image, by performing weighted mean on the characteristic values using the characteristic values and the frequency values of neighborhood luminance blocks which are included in the luminance blocks obtained from some of the spatial blocks in the vicinity of the pixels in accordance with a distance between the pixels and the neighborhood luminance blocks in the spatial direction and the luminance direction, tone-curve calculation means for calculating, at the pixel positions, a shape of a tone cure for each pixel in accordance with the general luminance value, and luminance-value tone-correction means for correcting tone of the luminance values of the pixels using the tone curve at the pixel positions.

When the general luminance value is subjected to tone correction using the tone curve, the tone-curve calculation means may calculate the shape of the tone curve such that the general luminance value is converted in to a value substantially in the middle of a possible range of a luminance value after the tone correction using the tone curve.

The image processing apparatus may further include general-luminance-value tone-correction means for correcting tone of the general luminance value of the pixels using the tone curve at the pixel positions, and contrast correction means for correcting contrast of the luminance values obtained through the tone correction performed by the luminance-value tone-correction means in accordance with the general luminance value obtained through the tone correction performed by the general-luminance-value tone-correction means and the shape of the tone curve.

The weighted product-sum means may include frequency-value interpolation means for performing interpolation processing using a spatial weight determined in accordance with a relative position between one of the spatial blocks from which the neighborhood luminance blocks are obtained and the pixels and the frequency values in the neighborhood luminance blocks and calculating interpolation frequency values which are frequency values obtained by performing interpolation on the positions of the pixels for each of luminance levels corresponding to the neighborhood luminance blocks, characteristic-value interpolation means for performing interpolation processing using the spatial weight and the characteristic values of the neighborhood luminance blocks and calculating interpolation characteristic values which are characteristic values obtained by performing interpolation on the positions of the pixels for each of the luminance levels corresponding to the neighborhood luminance blocks, frequency-value product-sum means for obtaining a sum of the interpolation frequency values which are multiplied by luminance weight determined by the luminance values of the pixels and the luminance levels corresponding to the neighborhood luminance blocks and calculating a weighted sum of the interpolation frequency values using the luminance weight, characteristic-value product-sum means for obtaining a sum of the interpolation characteristic values which are multiplied by the luminance weight and calculating a weighted sum of the interpolation characteristic values using the luminance weight, and dividing means for calculating a weighted mean of the characteristic values by dividing a weighted sum of the interpolation characteristic values by a weighted sum of the interpolation frequency values.

The weighted product-sum means may include first convolution means for convolving, for each spatial block, a luminance weight function in which a luminance value is employed as a variable to the frequency values of the neighborhood luminance blocks obtained from the spatial blocks, second convolution means for convolving, for each spatial block, the luminance weight function to the characteristic values of the neighborhood luminance blocks obtained from the spatial blocks, frequency-value interpolation means for performing interpolation processing using a spatial weight determined in accordance with a relative position between one of the spatial blocks from which the neighborhood luminance blocks are obtained and the pixels and the frequency values to which the luminance weight function is convolved, and calculating interpolation frequency values which are frequency values obtained through interpolation performed on the luminance values of the pixels at the pixel positions, characteristic-value interpolation means for performing interpolation processing using the spatial weight and the characteristic values to which the luminance weight function is convolved, and calculating interpolation characteristic values which are characteristic values obtained through interpolation performed on the luminance values of the pixels at the pixel positions, and dividing means for calculating a weighted mean of the characteristic value by dividing the interpolation characteristic value.

The weighted product-sum means may further include frequency-value storage means for storing the frequency values to which the luminance weight function is convolved and which are calculated from the input image of a predetermined frame for a period of time corresponding to one frame of the input image, and characteristic-value storage means for storing the characteristic values to which the luminance weight function is convolved and which are calculated from the input image of a predetermined frame for a period of time corresponding to one frame of the input image. The frequency-value interpolation means may calculate the interpolation frequency values of the input image in a frame following the predetermined frame using the frequency values which are stored in the frequency-value storage means and which are calculated from the input image of the predetermined frame, and the characteristic-value interpolation means may calculate the interpolation characteristic values of the input image in the following frame using the characteristic values which are stored in the characteristic-value storage means and which are calculated from the input image of the predetermined frame.

The image processing apparatus may further include size-reduced-image generating means for generating a size-reduced image obtained by reducing a size of the input image in accordance with the input image. The frequency-value calculation means may calculate frequency values of pixels of the size-reduced image which belong to luminance blocks obtained by dividing the size-reduced image in a spatial direction and a luminance direction, and the characteristic-value calculation means may calculate characteristic values representing characteristics of luminance blocks obtained by dividing the size-reduced image in a spatial direction and a luminance direction.

The image processing apparatus may further include frequency-value storage means for storing the frequency values calculated from the input image of a predetermined frame for a period of time corresponding to one frame of the input image, and characteristic-value storage means for storing the characteristic values calculated from the input image of a predetermined frame for a period of time corresponding to one frame of the input image. The weighted product-sum means may perform a weighted mean on the characteristic values of the input image in a frame following the predetermined frame using the frequency values which are stored in the frequency-value storage means and the characteristic values which are stored in the characteristic-value storage means.

An image processing method or a program according to the second aspect of the present invention, which performs tone correction on an input image, include the steps of calculating, in luminance blocks into which pixels included in spatial blocks obtained by dividing the input image in a spatial direction are classified in accordance with luminance values of the pixels whereby the spatial blocks are further divided in a luminance direction, frequency values of the pixels which belong to the luminance blocks, calculating characteristic values representing characteristics of the luminance blocks, calculating a general luminance value representing average brightness of an object region including the pixels in the input image by performing weighted mean on the characteristic values using the characteristic values and the frequency values of neighborhood luminance blocks which are included in the luminance blocks obtained from some of the spatial blocks in the vicinity of the pixels in accordance with a distance between the pixels and the neighborhood luminance blocks in the spatial direction and the luminance direction, calculating, at the pixel positions, a shape of a tone cure for each pixel in accordance with the general luminance value, and correcting tone of the luminance values of the pixels using the tone curve at the pixel positions.

According to the second aspect of the present invention, in the image processing apparatus, the tone correction is performed on the luminance values of the pixels by calculating, in luminance blocks into which pixels included in spatial blocks obtained by dividing the input image in a spatial direction are classified in accordance with luminance values of the pixels whereby the spatial blocks are further divided in a luminance direction, frequency values of the pixels which belong to the luminance blocks, calculating characteristic values representing characteristics of the luminance blocks, calculating a general luminance value representing average brightness of an object region including the pixels in the input image by performing weighted mean on the characteristic values using the characteristic values and the frequency values of neighborhood luminance blocks which are included in the luminance blocks obtained from some of the spatial blocks in the vicinity of the pixels in accordance with a distance between the pixels and the neighborhood luminance blocks in the spatial direction and the luminance direction, calculating, at the pixel positions, a shape of a tone cure for each pixel in accordance with the general luminance value, and correcting tone of the luminance values of the pixels using the tone curve at the pixel positions.

Advantageous Effects

According to the first aspect of the present invention, the edge preserving smoothing processing can be performed with less operations.

According to the second aspect of the present invention, the tone correction processing can be performed with less operations.

BRIEF DESCRIPTION OF DRAWINGS

FIG. 3 is a diagram illustrating an example of an arrangement of pixels included in a mosaic image.

EXPLANATION OF REFERENCE NUMERALS

16 DSP, 53 tone correction processor, 81 luminance calculation unit, 83 luminance-tone correction unit, 85-1 to 85-3 tone correction unit, 111 luminance-region-information calculation unit, 113 block-histogram calculation unit, 115 block-integration-value calculation unit, 117 weighted product-sum unit, 118 tone curve calculation unit, 122 contrast correction unit, 271 interpolation unit, 272 interpolation unit, 274 product-sum unit, 275 product-sum unit, 277 divider, 402 convolution unit, 404 convoluting unit, 406 weighted product-sum unit, 461 size-reducing unit, 501 tone correction processor, 581 tone correction processor

BEST MODES FOR CARRYING OUT THE INVENTION

Hereinafter, embodiments of the present invention will be described with reference to the accompanying drawings.

Figure 1:
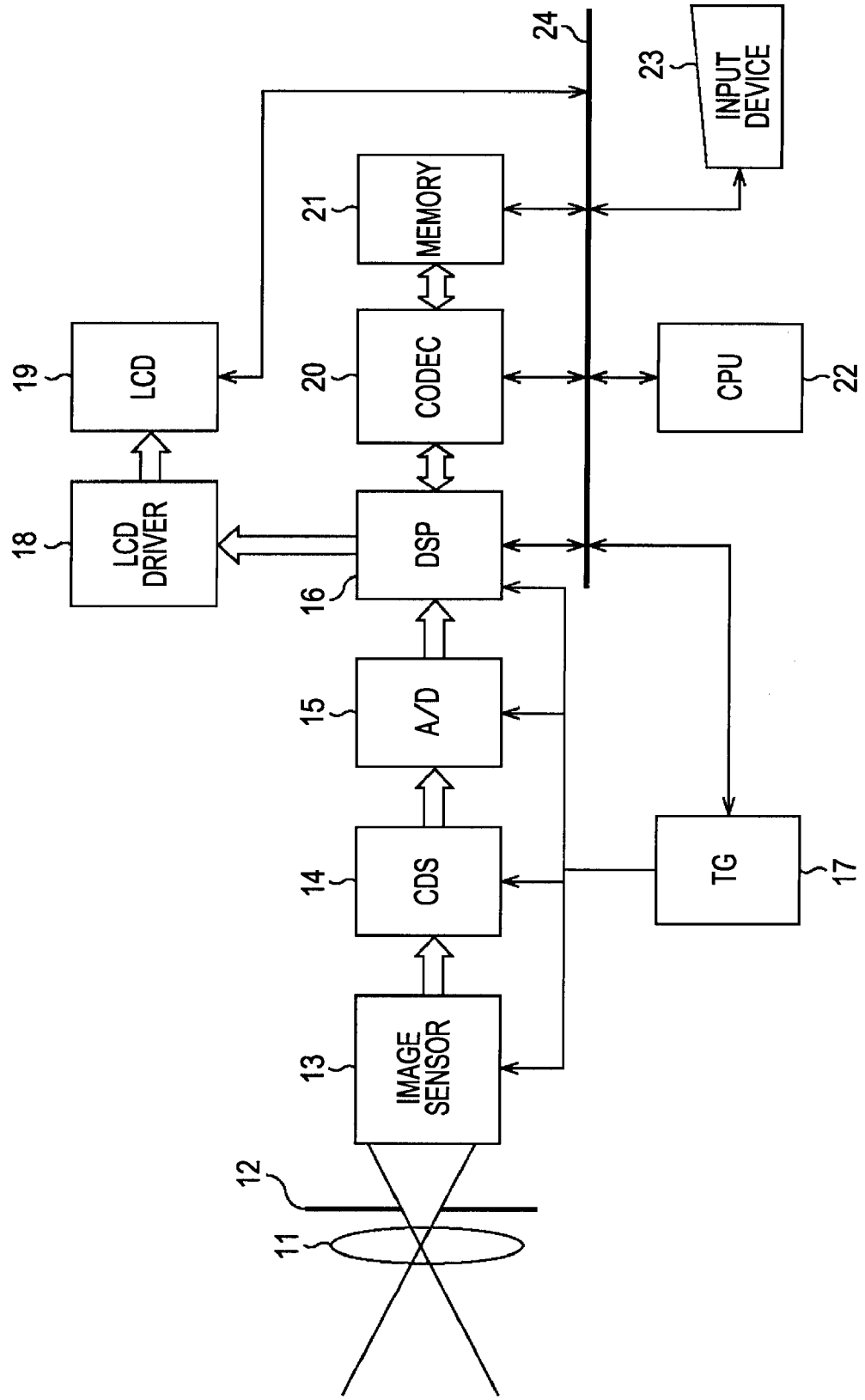
FIG. 1 is a block diagram illustrating a digital video camera to which the present invention is applied according to an embodiment.

FIG. 1 is a block diagram illustrating a digital video camera according to an embodiment to which the present invention is applied. The digital video camera includes a lens 11, an aperture 12, an image sensor 13, a correlated double sampling circuit (CDS) 14, an A/D (Analog/Digital) convertor 15, a DSP (Digital Signal Processor) block 16, a timing generator (TG) 17, an LCD (Liquid Crystal Display) driver 18, an LCD 19, a CODEC (Compression/Decompression) 20, a memory 21, a CPU (Central Processing Unit) 22, an input device 23, and a bus 24. Note that the DSP block 16 includes, for example, a processor (a DSP, for example) used for signal processing and a memory, such as a RAM (Random Access Memory) which stores image data, and performs image processing, which will be described hereinafter, when the processor executes predetermined programs. Note that the DSP block 16 is simply referred to as a DSP 16 hereinafter.

Incident light from an object through an optical system including the lens 11 and the aperture 12 reaches light-receiving elements on an imaging plane of the image sensor 13, and is converted into an electric signal through photoelectric conversion performed by the light-receiving elements. Noise included in the electric signal output from the image sensor 13 is removed by the correlated double sampling circuit 14, and the electric signal is digitalized by the A/D convertor 15. Thereafter, digitalized image data is temporarily stored in the memory included in the DSP 16. The timing generator 17 controls a signal processing system including the correlated double sampling circuit 14, the A/D convertor 15, and the DSP 16 so as to obtain image data at a predetermined frame rate. That is, streams of the image data are supplied to the DSP 16 at a predetermined frame rate.

Note that the image sensor 13 has a dynamic range larger than those of general image sensors, such as CCDs (Charge Coupled Devices), and can capture an image of an object in a range from dark portions to bright portions thereof without saturation and noise generation. Therefore, the A/D convertor 15 converts the input electric signal into image data having tone levels (for example, a number of tone levels which can be realized by data of 14 to 16 bits) more than those of normal digital video cameras (for example, a number of tone levels which can be realized by data of 10 to 12 bits).

The DSP 16 performs image processing, which will be described hereinafter, on the image data so that a dynamic range of the image data becomes suitable for display in the LCD 19, and thereafter, supplies the image data, which has been subjected to the image processing, to the LCD driver 18 or the CODEC 20 where appropriate.

The LCD driver 18 converts the image data supplied from the DSP 16 into an analog image signal. The LCD driver 18 supplies the analog image signal to the LCD 19 serving as a finder of the digital video camera and instructs the LCD 19 to display an image corresponding to the image signal.

The CODEC 20 encodes the image data supplied from the DSP 16 in a predetermined method and instructs the memory 21 to store the encoded image data in the memory 21, such as a semiconductor, a magnetic recording medium, a magneto-optical recording medium, or an optical recording medium.

The CPU 22 controls entire operation of the digital video camera in accordance with an instruction issued by a user operating the input device 23 configured by, for example, operation buttons, such as a shutter button. Note that the DSP 16, the timing generator 17, the CODEC 20, the memory 21, the LCD 19, the CPU 22, and the input device 23 are connected to one another through the bus 24.

Figure 2:
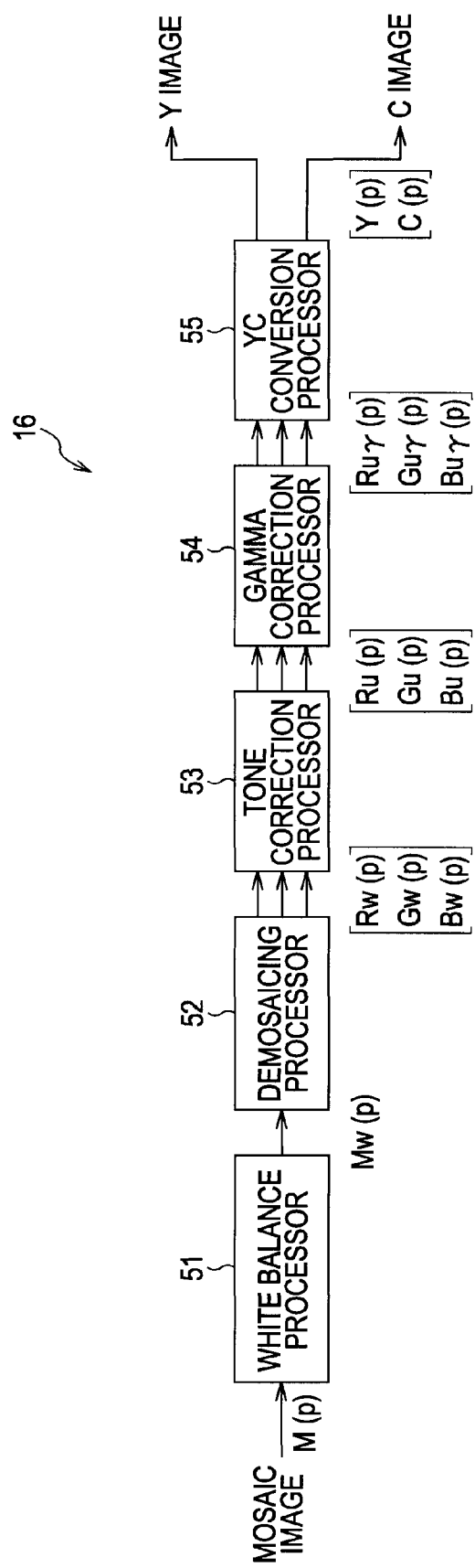
FIG. 2 is a diagram illustrating an example of a configuration of a DSP.

FIG. 2 is a block diagram illustrating an example of a configuration of functions realized when the processor (calculation unit) included in the DSP 16 executes a predetermined program. When the processor included in the DSP 16 executes the predetermined program, functions including a white balance processor 51, a demosaicing processor 52, a tone correction processor 53, a gamma correction processor 54, and an YC conversion processor 55 are realized.

The white balance processor 51 obtains a mosaic image corresponding to image data of a moving image, for example, which has been subjected to A/D conversion using the A/D convertor 15. The mosaic image is an image in which data corresponding to one of R, G, and B color components is included in a pixel and such pixels are arranged in accordance with a color array referred to as Bayer array, and the mosaic image is also referred to as RAW data.

Figure 3:
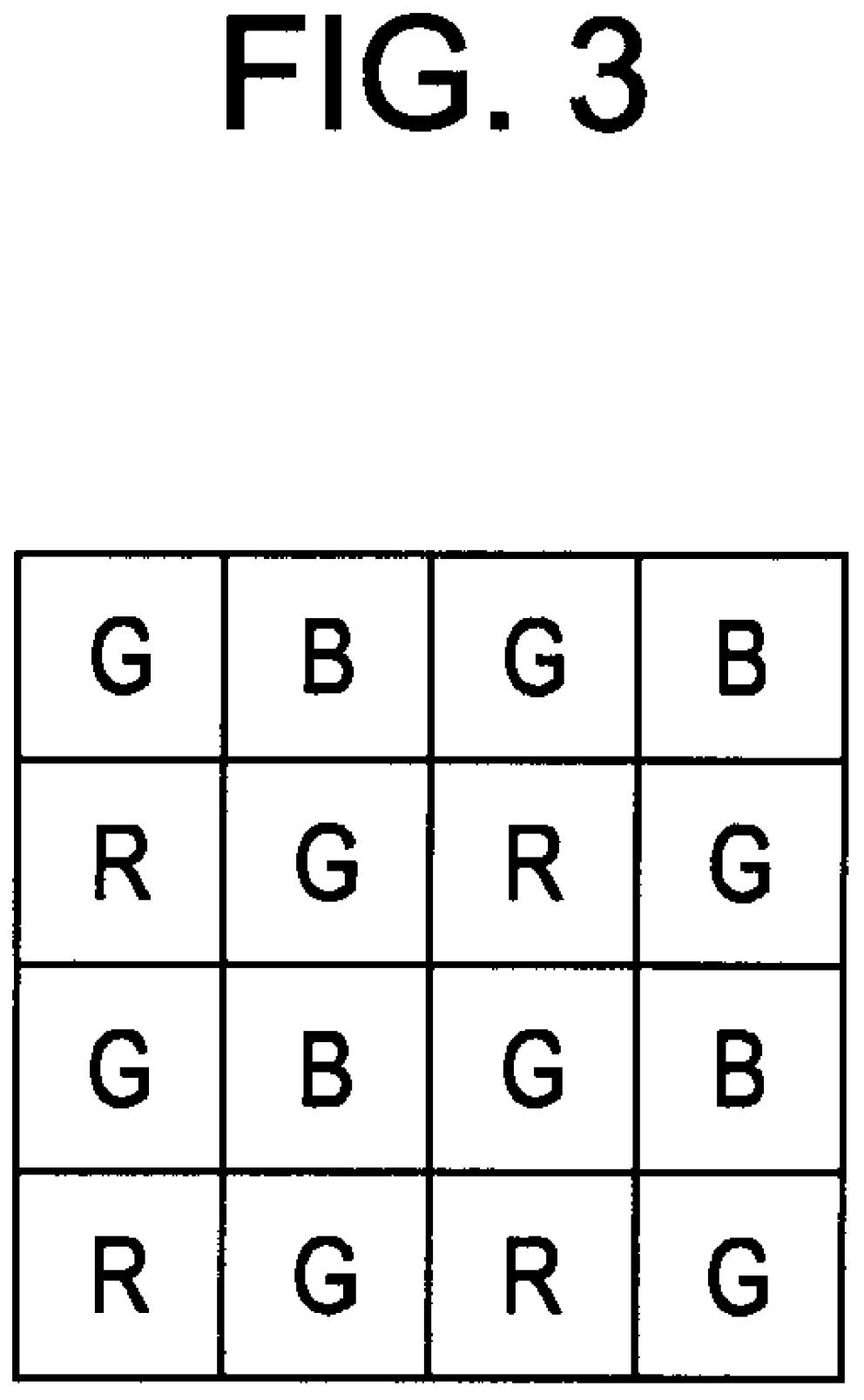

Referring to FIG. 3, a single square denotes a single pixel, and characters R, G, and B included in squares denote R pixels, G pixels, and B pixels, respectively. Then, the G pixels are arranged in a checkered pattern and the R and B pixels are alternately arranged based on rows in remaining portions.

Referring back to the description of FIG. 2, the white balance processor 51 controls white balance of the mosaic image so that color balance of achromatic portions of the object actually becomes achromatic by multiplying pixel values of the pixels included in the obtained mosaic image by appropriate coefficients. The white balance processor 51 supplies the mosaic image in which the white balance has been controlled to the demosaicing processor 52. Note that a mosaic image in which the white balance has been controlled is denoted by Mw hereinafter.

The demosaicing processor 52 performs demosaicing processing on the mosaic image Mw supplied from the white balance processor 51 so that each of the pixels includes all the R, G, and B components. By this, three image data items corresponding to R, G, and B images corresponding to the three color components, i.e., the R, G, and B color components, are generated. The demosaicing processor 52 supplies the generated three image data items corresponding to the R, G, and B images to the tone correction processor 53.

Note that, the three image data items, i.e., the R, G, and B images are also collectively referred to as an RGB image hereinafter. Furthermore, a pixel value at a pixel position p of the mosaic image is denoted by M(p) hereinafter. Moreover, a pixel value at a pixel position p of the image data which has been subjected to the demosaicing processing is denoted by (Rw(p), Gw(p), Bw(p)). Note that "Rw(p)" represents a pixel value of the R component, "Gw(p)" represents a pixel value of the G component, and "Bw(p)" represents a pixel value of the B component.

The tone correction processor 53 performs tone correction processing on the RGB image and supplies the RGB image which has been subjected to the tone correction processing to the gamma correction processor 54. Note that a pixel value of the image data at the pixel position p which has been subjected to the tone correction processing is denoted by (Ru(p), Gu(p), Bu(p)). Here, "Ru(p)" represents a pixel value of the R component, "Gu(p)" represents a pixel value of the G component, and "Bu(p)" represents a pixel value of the B component.

The gamma correction processor 54 performs gamma correction on the RGB image which has been subjected to the tone conversion. The gamma correction processor 54 supplies the RGB image which has been subjected to the gamma correction to the YC conversion processor 55. Note that a pixel value of the image data at the pixel position p which has been subjected to the gamma correction is denoted by (Ruγ(p), Guγ(p), Buγ(p)). Here, "Ruγ(p)" represents a pixel value of the R component, "Guγ(p)" represents a pixel value of the G component, and "Buγ(p)" represents a pixel value of the B component.

The YC conversion processor 55 performs YC matrix processing on the RGB image which has been subjected to the gamma correction and band limitation on chromatic components so as to generate a Y image constituted by a luminance component (Y component) and a C image constituted by a color difference component (Cb or Cr component). The YC conversion processor 55 supplies the generated Y image and the generated C image to the LCD driver 18 or the CODEC 20 where appropriate. Note that a pixel value at the pixel position p of the image data output from the YC conversion processor 55 is denoted by (Y(p), C(p)). Here, "Y(p)" represents a value of the luminance component and "C(p)" represents a value of the color difference component. Note that the Cb component of the C image is denoted by Cb(p) and the Cr component of the C image is denoted by Cr(p).

Figure 4:
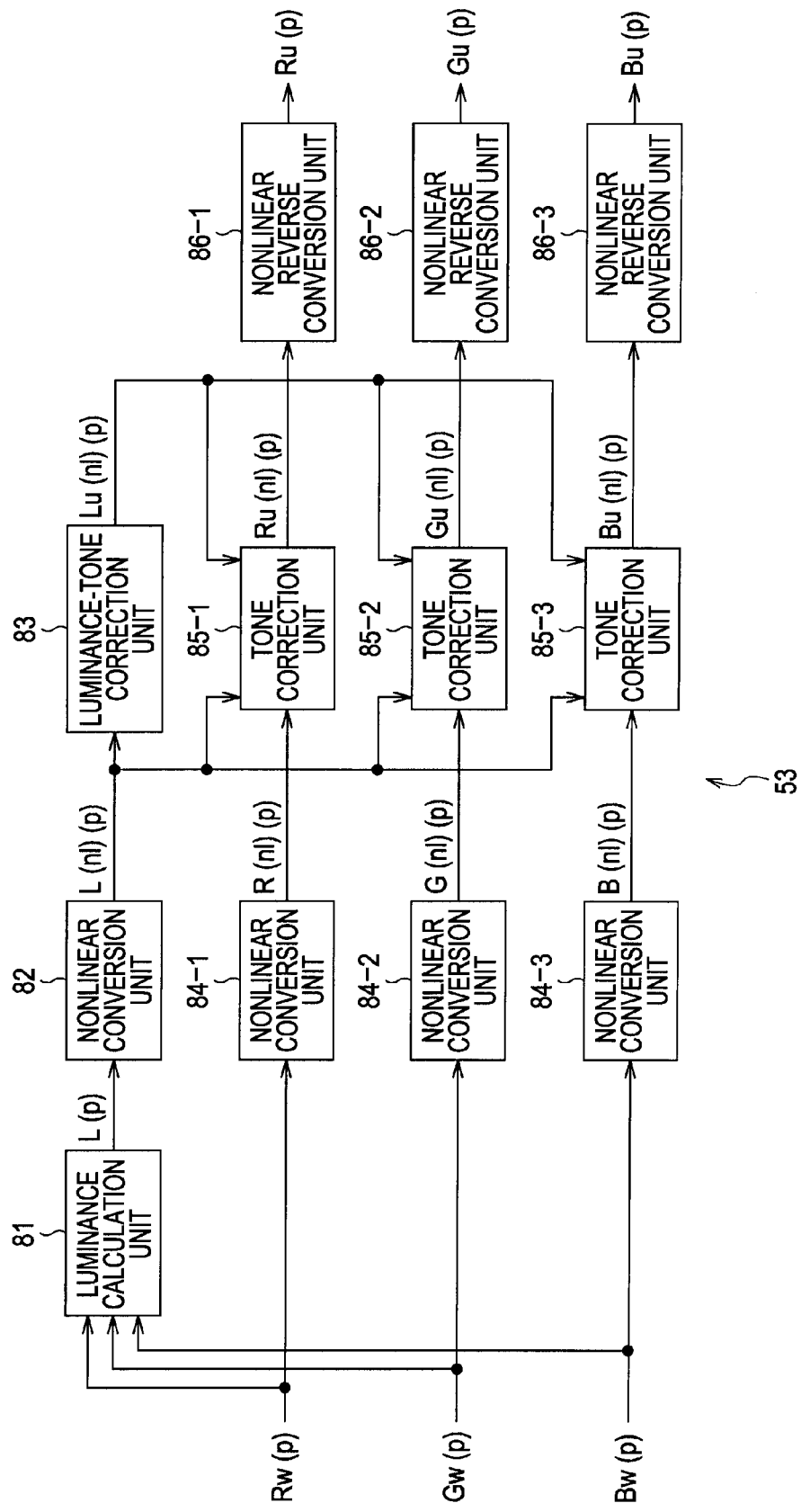
FIG. 4 is a diagram illustrating an example of a configuration of a tone correction processor.

FIG. 4 is a block diagram illustrating an example of a configuration of functions of the tone correction processor 53. The tone correction processor 53 includes a luminance calculation unit 81, a nonlinear conversion unit 82, a luminance-tone correction unit 83, nonlinear conversion units 84-1 to 84-3, tone correction units 85-1 to 85-3, and nonlinear reverse conversion units 86-1 to 86-3.

The luminance calculation unit 81 calculates a value of a luminance component (luminance value L(p)) at a pixel position corresponding to the pixel values Rw(p), Gw(p), and Bw(p) of the RGB image supplied from the demosaicing processor 52, and supplies the luminance value L(p) to the nonlinear conversion unit 82. The nonlinear conversion unit 82 performs nonlinear conversion on the luminance value L(p) supplied from the luminance calculation unit 81, and supplies a resultant luminance value L(nl)(p) to the luminance-tone correction unit 83 and the tone correction units 85-1 to 85-3.

The luminance-tone correction unit 83 performs tone correction on the luminance value L(nl)(p) by compressing tone of the luminance value L(nl)(p) supplied from the nonlinear conversion unit 82, and supplies a luminance value Lu(nl)(p) obtained through the tone correction to the tone correction units 85-1 to 85-3.

The nonlinear conversion units 84-1 to 84-3 perform nonlinear conversion on the pixel values Rw(p), Gw(p), and Bw(p), respectively, of the RGB image supplied from the demosaicing processor 52. Furthermore, the nonlinear conversion units 84-1 to 84-3 supply pixel values R(nl)(p), G(nl)(p), and B(nl)(p) obtained through the nonlinear conversion to the tone correction units 85-1 to 85-3, respectively. Note that the nonlinear conversion units 84-1 to 84-3 are simply referred to as nonlinear conversion units 84 hereinafter unless otherwise distinguished.

The tone correction units 85-1 to 85-3 perform tone correction on the pixel values R(nl)(p), G(nl)(p), and B(nl)(p), supplied from the nonlinear conversion units 84-1 to 84-3, respectively, using the luminance value L(nl)(p) supplied from the nonlinear conversion unit 82 and the luminance value Lu(nl)(p) supplied from the luminance-tone correction unit 83. The tone correction units 85-1 to 85-3 supply pixel values Ru(nl)(p), Gu(nl)(p), and Bu(nl)(p) obtained through the tone correction to the nonlinear reverse conversion units 86-1 to 86-3, respectively.

The nonlinear reverse conversion units 86-1 to 86-3 perform nonlinear reverse conversion, which is reverse conversion of the nonlinear conversion performed by the nonlinear conversion units 84, on the pixel values Ru(nl)(p), Gu(nl)(p), and Bu(nl)(p) supplied from the tone correction units 85-1 to 85-3, respectively. The nonlinear reverse conversion units 86-1 to 86-3 supply Ru(p), Gu(p), and Bu(p), respectively, obtained through the nonlinear reverse conversion to the gamma correction processor 54.

Note that the tone correction units 85-1 to 85-3 are simply referred to as tone correction units 85 hereinafter unless otherwise distinguished. Furthermore, the nonlinear reverse conversion units 86-1 to 86-3 are simply referred to as nonlinear reverse conversion units 86 hereinafter unless otherwise distinguished.

Figure 5:
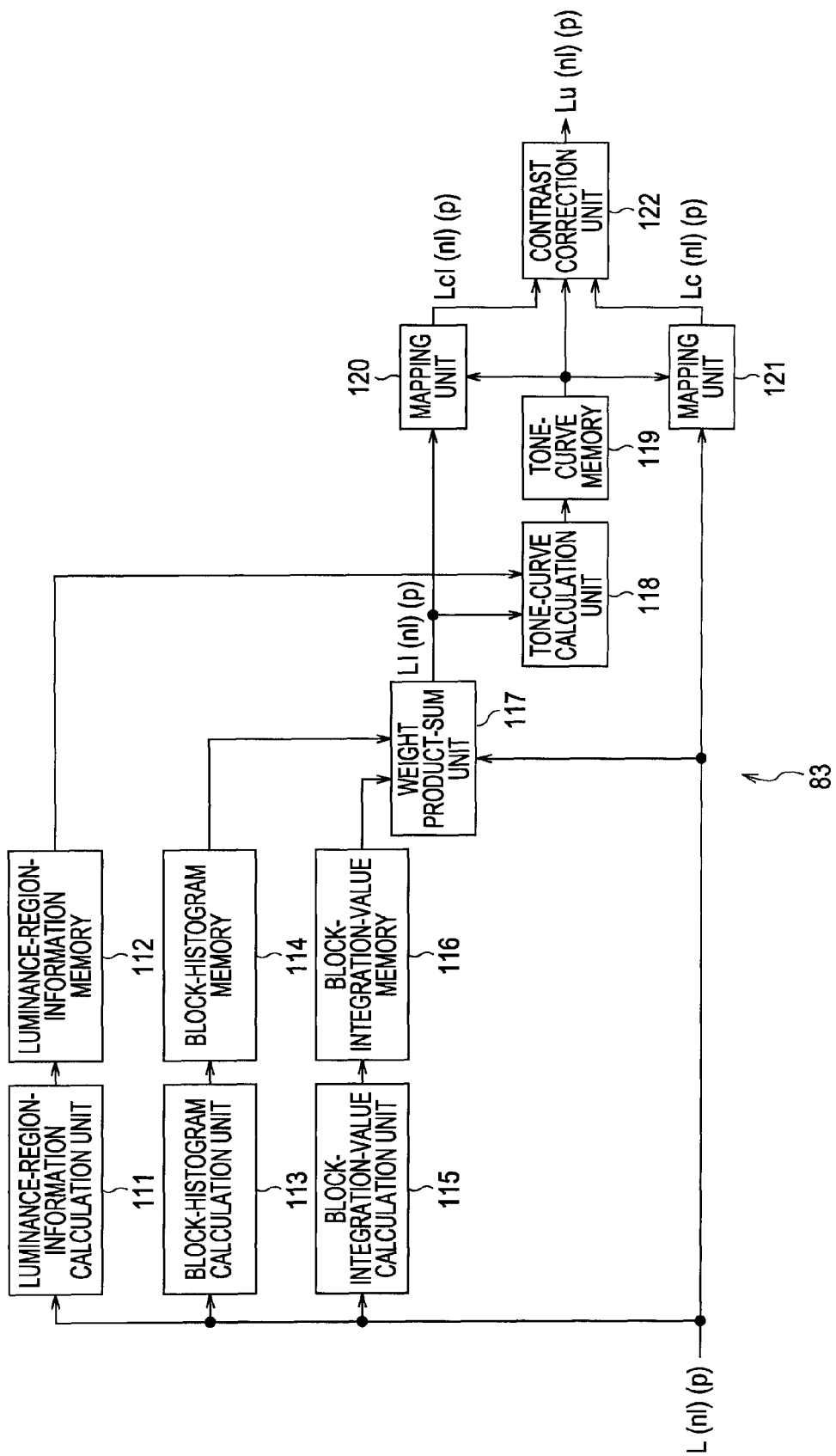
FIG. 5 is a diagram illustrating an example of a configuration of a luminance-tone correction unit.

FIG. 5 is a block diagram illustrating an example of a configuration of functions of the luminance-tone correction unit 83. The luminance-tone correction unit 83 includes a luminance-region-information calculation unit 111, a luminance-region-information memory 112, a block-histogram calculation unit 113, a block-histogram memory 114, a block-integration-value calculation unit 115, a block-integration-value memory 116, a weighted product-sum unit 117, a tone-curve calculation unit 118, a tone-curve memory 119, mapping units 120 and 121, and a contrast correction unit 122.

The luminance-region-information calculation unit 111, the block-histogram calculation unit 113, and the block-integration-value calculation unit 115 calculate information on a large region of the RGB image and perform processing for updating the information for each frame.

Specifically, the luminance-region-information calculation unit 111 obtains skirt values which are luminance values of skirt portions on a dark luminance side and a bright luminance side of a histogram of luminance values of pixels in an image for one frame (hereinafter referred to as a "luminance image") having luminance values $L(nl)(p)$ supplied from the nonlinear conversion unit 82, and stores the skirt values as luminance-region information in the luminance-region-information memory 112. The luminance-region-information memory 112 temporarily stores the luminance-region information supplied from the luminance-region-information calculation unit 111 and supplies the luminance-region information to the tone-curve calculation unit 118.

The block-histogram calculation unit 113 divides the luminance image for one frame including the luminance values $L(nl)(p)$ supplied from the nonlinear conversion unit 82 into a plurality of spatial blocks (regions) in a spatial direction, and further divides each of the spatial blocks into luminance blocks in a luminance direction. Here, each of the luminance blocks is constituted by pixels, among pixels included in a corresponding one of the spatial blocks, having luminance values within a predetermined luminance range for the luminance block. Therefore, for example, when each of the spatial blocks is divided into D luminance blocks, a possible range of the luminance values is divided into D ranges in advance, and the pixels in each of the spatial blocks are categorized into D luminance blocks in accordance with luminance values of the pixels.

Furthermore, the block-histogram calculation unit 113 obtains a frequency value of the pixels included in each of the luminance blocks obtained by dividing the luminance image, and supplies the frequency value as a block histogram to the block-histogram memory 114. That is, the block histogram shows the number of pixels included in (categorized into) each of the luminance blocks. The block-histogram memory 114 temporarily stores such block histograms supplied from the block-histogram calculation unit 113 and supplies the block histograms to the weighted product-sum unit 117.

The block-integration-value calculation unit 115 calculates, for each of the luminance blocks, an integration value (sum) of the luminance values of the pixels included in the luminance block of interest, and supplies such calculated integration values as block integration values to the block-integration-value memory 116. The block-integration-value memory 116 temporarily stores the block integration values supplied from the block-integration-value calculation unit 115 and supplies the block integration values to the weighted product-sum unit 117.

Note that the luminance-region information, the block histograms, and the block integration values are also referred to as intermediate data hereinafter. The luminance-region information, the block histograms, and the block integration values serving as the intermediate data are stored in the luminance-region-information memory 112, the block-histogram memory 114, and the block-integration-value memory 116, respectively for a period of time corresponding to one frame of the luminance image (RGB image) and are updated every frame.

Furthermore, since calculation for obtaining the intermediate data requires a period of time corresponding to substantially one frame, in the known techniques, the generated intermediate data is practically used when image information of the next frame is input. However, since the tone correction processor 53 performs processing for calculating the intermediate data and processing for correcting tone of the RGB image using the intermediate data in parallel, even moving-image data can be processed in real time.

The weighted product-sum unit 117 calculates general luminance values $Ll(nl)(p)$, which are luminance values of an image (hereinafter referred to as a "general luminance image") constituted by very low frequency components of the luminance image having the luminance values $L(nl)(p)$ using the luminance values $L(nl)(p)$ supplied from the nonlinear conversion unit 82, the block histograms supplied from the block-histogram memory 114, and the block integration values supplied from the block-integration-value memory 116.

That is, the general luminance values $Ll(nl)(p)$ of the pixels having the supplied luminance values $L(nl)(p)$ are obtained using the block histograms and the block integration values obtained from the luminance image (RGB image) of a frame immediately prior to the frame of interest in terms of time. Here, the general luminance values are information items corresponding to average luminance levels of certain regions of an object to which the pixels of the RGB image belong, that is, luminance values representing average brightness levels of the regions of the object to which the pixels belong.

Note that hereinafter, pixels which have been processed, that is, for example, pixels corresponding to the luminance values $L(nl)(p)$ supplied to the luminance-tone correction unit 83 are also referred to as "processing pixels" hereinafter.

The weighted product-sum unit 117 supplies the calculated general luminance values $Ll(nl)(p)$ to the tone-curve calculation unit 118 and the mapping unit 120.

The tone-curve calculation unit 118 calculates a shape of a tone curve used for compressing the tone of the luminance values using the luminance-region information supplied from the luminance-region-information memory 112 and the general luminance values $Ll(nl)(p)$ supplied from the weighted product-sum unit 117, and supplies a result of the calculation to the tone-curve memory 119. The tone-curve memory 119 records a tone curve supplied from the tone-curve calculation unit 118, and supplies the recorded tone curve to the mapping units 120 and 121 and the contrast correction unit 122.

The mapping unit 120 compresses (corrects) the tone of the general luminance values $Ll(nl)(p)$ supplied from the weighted product-sum unit 117 in accordance with the tone curve recorded in the tone-curve memory 119, and supplies general luminance values $Lcl(nl)(p)$ obtained through the tone correction to the contrast correction unit 122. The mapping unit 121 compresses (corrects) the tone of the luminance values L(nl)(p) supplied from the nonlinear conversion unit 82 in accordance with the tone curve recorded in the tone-curve memory 119, and supplies luminance values Lc(nl)(p) obtained through the tone correction to the contrast correction unit 122.

The contrast correction unit 122 corrects contrast of the luminance image having the luminance values Lc(nl)(p) obtained by the tone compression in accordance with the general luminance values Lc1(nl)(p) supplied from the mapping unit 120, the luminance values Lc(nl)(p) supplied from the mapping unit 121, and the tone curve recorded in the tone-curve memory 119. Furthermore, the contrast correction unit 122 supplies luminance values Lu(nl)(p) obtained through the contrast correction to the tone correction units 85.

Figure 6:
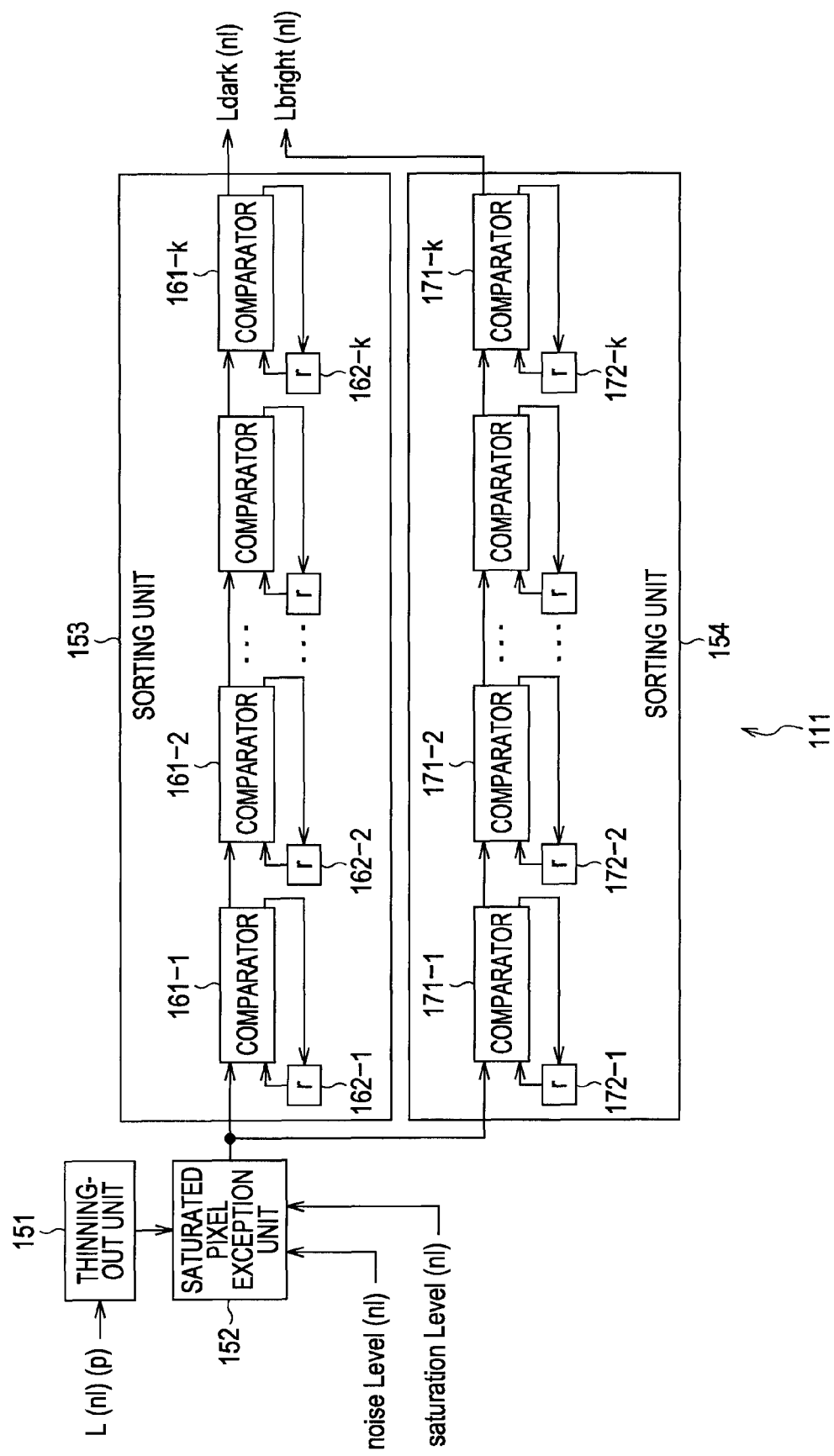
FIG. 6 is a diagram illustrating an example of a configuration of a luminance-region-information calculation unit.

FIG. 6 is a diagram illustrating an example of a configuration of functions of the luminance-region-information calculation unit 111 shown in FIG. 5. The luminance-region-information calculation unit 111 includes a thinning-out unit 151, a saturated-pixel exception unit 152, and sorting units 153 and 154.

The thinning-out unit 151 samples and outputs the luminance values L(nl)(p) of the pixels of the luminance image supplied in an order of raster scanning at predetermined intervals. That is, the thinning-out unit 151 determines whether pixel positions p of the luminance values L(nl)(p) supplied from the nonlinear conversion unit 82 correspond to sampling positions provided at predetermined intervals. When it is determined that the pixel positions p correspond to the sampling positions, the luminance values L(nl)(p) are supplied to the saturated-pixel exception unit 152. By this, the number of luminance values supplied to the sorting units 153 and 154 in subsequent stages does not become equal to or larger than a predetermined number.

The saturated-pixel exception unit 152 reads noiseLevel(nl) and saturationLevel(nl) from the internal memory, not shown, included in the DSP 16. Here, noiseLevel(nl) and saturationLevel(nl) denote a threshold value representing a luminance value in a noise level and a luminance value in a saturation level, respectively.

When one of the luminance values L(nl)(p) supplied from the thinning-out unit 151 is not less than the noiseLevel(nl) and not larger than the saturationLevel(nl), the saturated-pixel exception unit 152 supplies the luminance value L(nl)(p) to the sorting unit 153 and the sorting unit 154. Therefore, luminance values not larger than the noise level and luminance values not less than the saturation level are shut out, that is, are not outputted to a subsequent stage. Therefore, pixels out of an effective luminance region are not counted by the sorting units 153 and 154.

The sorting unit 153 includes comparators 161-1 to 161-$k$ and registers 162-1 to 162-$k$ provided for the respective comparators. The comparators 161-1 to 161-$k$ compare luminance values L(nl)(p) supplied from the saturated-pixel exception unit 152 and the comparators 161-1 to 161-($k$−1), respectively, with values of the corresponding registers 162-1 to 162-$k$.

Then, when the luminance values L(nl)(p) are smaller than the corresponding values of the registers 162-1 to 162-$k$, the comparators 161-1 to 161-$k$ output the values of the registers 162-1 to 162-$k$ to subsequent stages and instruct the registers 162-1 to 162-$k$ to record the luminance values L(nl)(p). Furthermore, when the luminance values L(nl)(p) are equal to or larger than the corresponding values of the registers 162-1 to 162-$k$, the comparators 161-1 to 161-$k$ merely output the luminance values L(nl)(p) to the subsequent stages.

By this, among the supplied luminance values L(nl)(p), the smallest value to the k-th smallest value are recorded in the registers 162-1 to 162-$k$ in ascending order. After the luminance values L(nl)(p) of the luminance image for one frame are sorted, the sorting unit 153 supplies the value recorded in the register 162-$k$ as a skirt value Ldark(nl) on the dark luminance side to the luminance-region-information memory 112.

Note that the comparators 161-1 to 161-$k$ are simply referred to as comparators 161 hereinafter unless otherwise distinguished. Furthermore, the registers 162-1 to 162-$k$ are simply referred to as registers 162 hereinafter unless otherwise distinguished.

The sorting unit 154 includes comparators 171-1 to 171-$k$ and registers 172-1 to 172-$k$ corresponding to the comparators 171-1 to 171-$k$. The comparators 171-1 to 171-$k$ compare luminance values L(nl)(p) supplied from the saturated-pixel exception unit 152 and the comparators 171-1 to 171-($k$−1), respectively, with values of the corresponding registers 172-1 to 172-$k$.

Then, when the luminance values L(nl)(p) are larger than the corresponding values of the registers 172-1 to 172-$k$, the comparators 171-1 to 171-$k$ output the values of the registers 172-1 to 172-$k$ to subsequent stages and instruct the registers 172-1 to 172-$k$ to record the luminance values L(nl)(p). Furthermore, when the luminance values L(nl)(p) are not equal to or smaller than the corresponding values of the registers 172-1 to 172-$k$, the comparators 171-1 to 171-$k$ merely output the luminance values L(nl)(p) to the subsequent stages.

By this, among the supplied luminance values L(nl)(p), the largest value to the k-th largest value are recorded in the registers 172-1 to 172-$k$ in descending order. After the luminance values L(nl)(p) of the luminance image for one frame are sorted, the sorting unit 154 supplies the value recorded in the register 172-$k$ as a skirt value Lbright(nl) on the bright luminance side to the luminance-region-information memory 112.

Note that the comparators 171-1 to 171-$k$ are simply referred to as comparators 171 hereinafter unless otherwise distinguished. Furthermore, the registers 172-1 to 172-$k$ are simply referred to as registers 172 hereinafter unless otherwise distinguished.

Here, the number of comparators 161 and registers 162 and the number of comparators 171 and registers 172 are determined in accordance with percentages of the luminance values calculated as the respective skirt values relative to areas of the histograms of the luminance values.

For example, on each of the dark luminance side and the blight luminance side, when a luminance value corresponding to 0.5% is to be obtained as a skirt value, operation of the thinning-out unit 151 is controlled so that the maximum number of the luminance values input to the sorting units 153 and 154 is limited to 1200. Then, the number of pairs of the comparators 161 and the registers 162 included in the sorting unit 153 is set to 6 and the number of pairs of the comparators 171 and the registers 172 included in the sorting unit 154 is set to 6.

Then, when input of the luminance values of all the pixels is terminated, luminance values corresponding to an area ratio of 0.5% have been recorded in the register 162-$k$ and the register 172-$k$ ($k$=6), and therefore, the luminance values are output as the skirt value on the dark luminance side and the skirt value of the bright luminance side.

Figure 7:
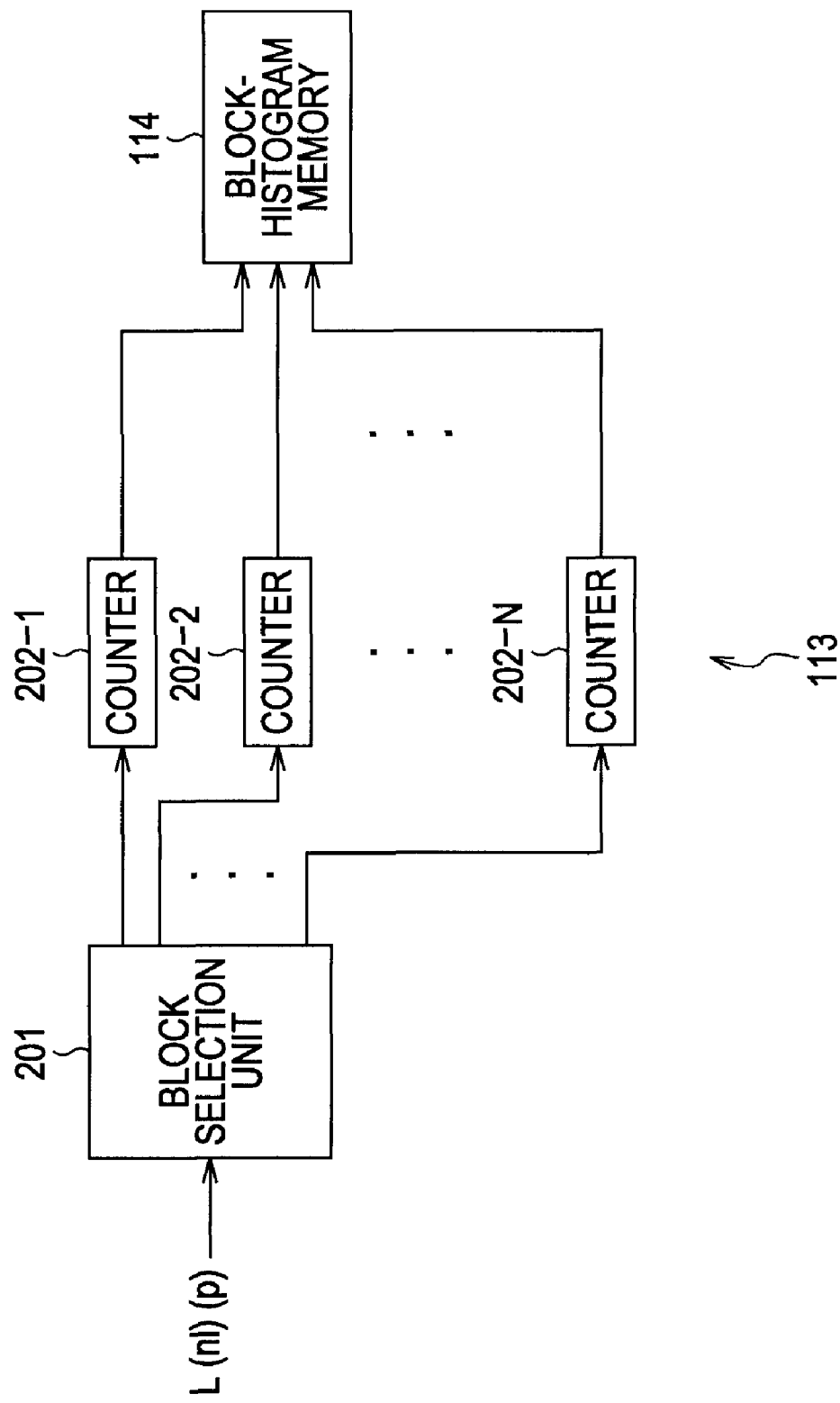
FIG. 7 is a diagram illustrating an example of a configuration of a block-histogram calculation unit.

FIG. 7 is a diagram illustrating an example of a configuration of functions of the block-histogram calculation unit 113. The block-histogram calculation unit 113 includes a block selection unit 201 and counters 202-1 to 202-N.

The block selection unit 201 specifies a luminance block to which a processing pixel belongs in accordance with a luminance value L(nl)(p) of the processing pixel supplied from the nonlinear conversion unit 82 and a position @ of the processing pixel, and increments a counter corresponding to the specified luminance block from among the counters 202-1 to 202-N corresponding to the luminance blocks by one.

Here, it is assumed that the luminance image is divided into W spatial blocks in a width direction and H spatial blocks in a height direction, and each of the spatial blocks is further divided into D luminance blocks, that is, the luminance image is divided into N (=W×H×D) luminance blocks in total. In this case, the block-histogram calculation unit 113 includes N counters 202-1 to 202-N which correspond to the N luminance blocks. Then, when one of the luminance blocks is specified, the block selection unit 201 increments a value of one of the counters which corresponds to the specified block.

Each of the counters 202-1 to 202-N stores a frequency value of pixels of a corresponding one of the luminance blocks, that is, a value representing the number of pixels included in the luminance block, and increments the stored value in accordance with an instruction issued by the block selection unit 201. Furthermore, the counters 202-1 to 202-N supply such stored value as block histograms to the block-histogram memory 114 after counting of the pixels included in the luminance image for one frame. Note that the counters 202-1 to 202-N are simply referred to as counters 202 hereinafter unless otherwise distinguished.

Figure 8:
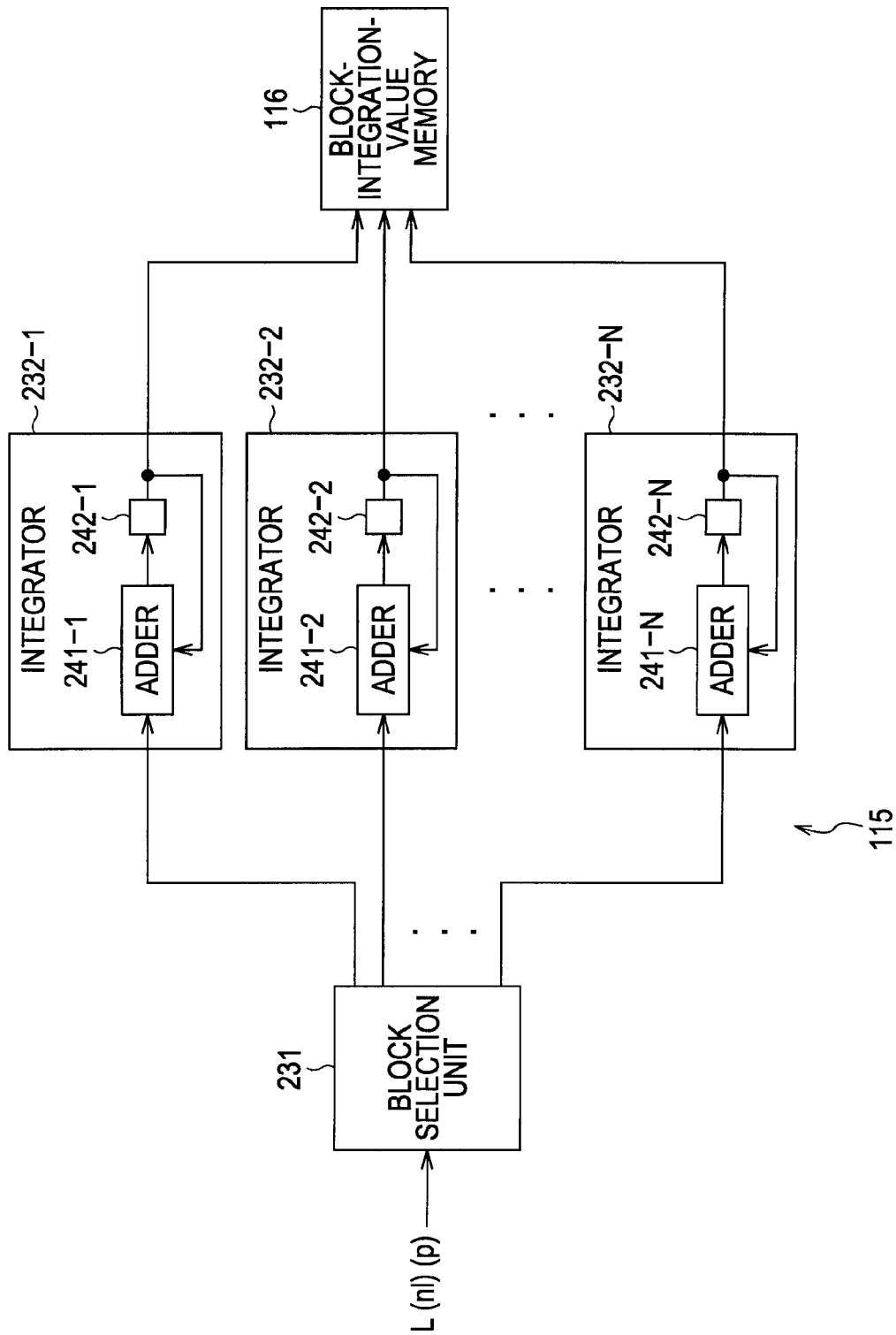
FIG. 8 is a diagram illustrating an example of a configuration of a block-integration-value calculation unit.

FIG. 8 is a diagram illustrating an example of a configuration of functions of the block-integration-value calculation unit 115 shown in FIG. 5. The block-integration-value calculation unit 115 includes a block selection unit 231 and integrators 232-1 to 232-N.

The block selection unit 231 specifies a luminance block to which a processing pixel belongs using luminance values L(nl)(p) of the processing pixel supplied from the nonlinear conversion unit 82 and a position p of the processing pixel, and supplies the luminance value L(nl)(p) to one of the integrators 232-1 to 232-N which corresponds to the specified luminance block.

Each of the integrators 232-1 to 232-N integrates luminance values L(nl)(p) supplied from the block selection unit 231 so as to obtain a block integration value of a corresponding one of the luminance blocks. Furthermore, each of the integrators 232-1 to 232-N obtains a sum of pixel values of the pixels included in the luminance image for one frame, and supplies the block integration value, when the block integration value is obtained, to the block-integration-value memory 116.

The integrators 232-1 to 232-N include adders 241-1 to 241-N and registers 242-1 to 242-N, respectively. Each of the adders 241-1 to 241-N adds the luminance values L(nl)(p) supplied from the block selection unit 231 to a value recorded in a corresponding one of the registers 242-1 to 242-N, and a resultant value is recorded in the corresponding one of the registers 242-1 to 242-N. That is, each of the registers 242-1 to 242-N records a sum of the supplied luminance values L(nl)(p).

The registers 242-1 to 242-N record values supplied from the corresponding adders 241-1 to 241-N, and supply the recorded values to the corresponding adders 241-1 to 241-N and the block-integration-value memory 116.

Note that the integrators 232-1 to 232-N are simply referred to as integrators 232 hereinafter unless otherwise distinguished. Furthermore, hereinafter, the adders 241-1 to 241-N are simply referred to as adders 241 unless otherwise distinguished, and the registers 242-1 to 242-N are simply referred to as registers 242 unless otherwise distinguished.

Figure 9:
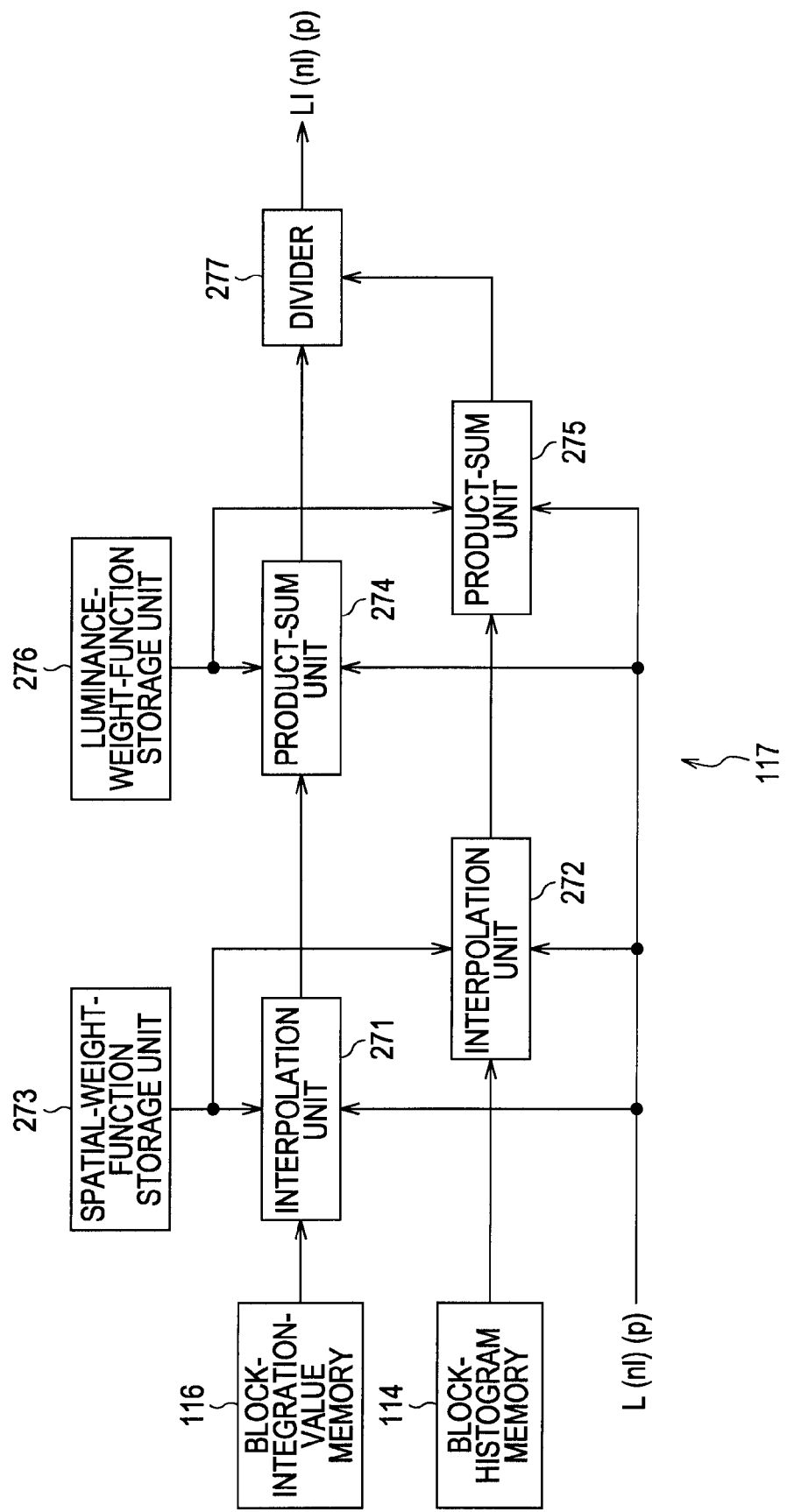
FIG. 9 is a diagram illustrating an example of a configuration of a weighted product-sum unit.

FIG. 9 is a diagram illustrating an example of a configuration of functions of the weighted product-sum unit 117 shown in FIG. 5. The weighted product-sum unit 117 includes interpolation units 271 and 272, a spatial-weight-function storage unit 273, product-sum units 274 and 275, a luminance-weight-function storage unit 276, and a divider 277.

The interpolation unit 271 obtains interpolated block integration values as luminance integration values for individual center values of luminance ranges of the luminance blocks relative to positions of pixels, in the luminance image, corresponding to the luminance values L(nl)(p) supplied from the nonlinear conversion unit 82, that is, positions of the processing pixels, and supplies the luminance integration values to the product-sum unit 274. Specifically, assuming that the center values of possible luminance-value ranges of the pixels in the luminance block are determined to be λ, the interpolation unit 271 multiplies individual block integration values of 16 luminance blocks having the center values λ by corresponding interpolation coefficients, from among luminance blocks obtained by dividing spatial blocks of 4×4 in the vicinity of the spatial direction of the processing pixels, and obtains a sum of the block integration values which have been multiplied by the corresponding interpolation coefficients whereby luminance integration values for the center values λ is obtained.

In other words, the interpolation unit 271 obtains luminance integration values for individual center values λ by performing the interpolation processing using the block integration values of the luminance blocks in the vicinity of the processing pixels. By this, D luminance integration values for individual center values λ are obtained. Here, the interpolation coefficients by which the block integration values are multiplied is read from a spatial-weight-function look-up table stored in the spatial-weight-function storage unit 273 in accordance with relative positions between the positions of the processing pixels and spatial blocks in the vicinity of the processing pixels.

The interpolation unit 272 obtains interpolated block histograms as luminance histograms for individual center values of luminance ranges of the luminance blocks relative to positions of pixels, in the luminance image, corresponding to the luminance values L(nl)(p) supplied from the nonlinear conversion unit 82, that is, positions of the processing pixels, and supplies the luminance histograms to the product-sum unit 275. Specifically, the interpolation unit 272 multiplies individual block histograms of 16 luminance blocks having the center values λ by the corresponding interpolation coefficients, from among luminance blocks obtained by dividing spatial blocks of 4×4 in the vicinity of the spatial direction of the processing pixels, and obtains a sum of the block integration values which have been multiplied by the corresponding interpolation coefficients whereby luminance histograms for the center values λ is obtained.

In other words, the interpolation unit 272 obtains luminance histograms for individual center values λ by performing the interpolation processing using the block histograms of the luminance blocks in the vicinity of the processing pixels. By this, D luminance histograms for individual center values λ, are obtained. Here, the interpolation coefficients by which the block histograms are multiplied is read from a spatial-weight-function look-up table stored in the spatial-weight-function storage unit 273 in accordance with relative positions between the positions of the processing pixels and spatial blocks in the vicinity of the processing pixels.

The product-sum unit 274 performs a product-sum operation on the D luminance integration values supplied from the interpolation unit 271 using a luminance weight value, and supplies a luminance integration value obtained through the product-sum operation to the divider 277. That is, a sum of the luminance integration values multiplied by the luminance weight value is obtained. Here, the luminance weight value by which the luminance integration values are multiplied is calculated using a luminance weight function of a luminance-weight-function look-up table stored in the luminance-weight-function storage unit 276 in accordance with the luminance values L(nl)(p) supplied from the nonlinear conversion unit 82 to the product-sum unit 274 and the center values $\lambda$.

The product-sum unit 275 performs a product-sum operation on the D luminance histograms supplied from the interpolation unit 272 using a luminance weight value and supplies a luminance histogram obtained through the product-sum operation to the divider 277. That is, a sum of the luminance histograms multiplied by the luminance weight value is obtained. Here, the luminance weight value by which the luminance histograms are multiplied is calculated using the luminance weight function of the luminance-weight-function look-up table stored in the luminance-weight-function storage unit 276 in accordance with the luminance values L(nl)(p) supplied from the nonlinear conversion unit 82 to the product-sum unit 275 and the center values $\lambda$.

The divider 277 divides luminance product-sum values supplied from the product-sum unit 274 by corresponding luminance histograms supplied from the product-sum unit 275 so as to obtain general luminance value Ll(nl)(p) of the processing pixels, and supplies the general luminance values Ll(nl)(p) to the mapping unit 120.

Figure 10:
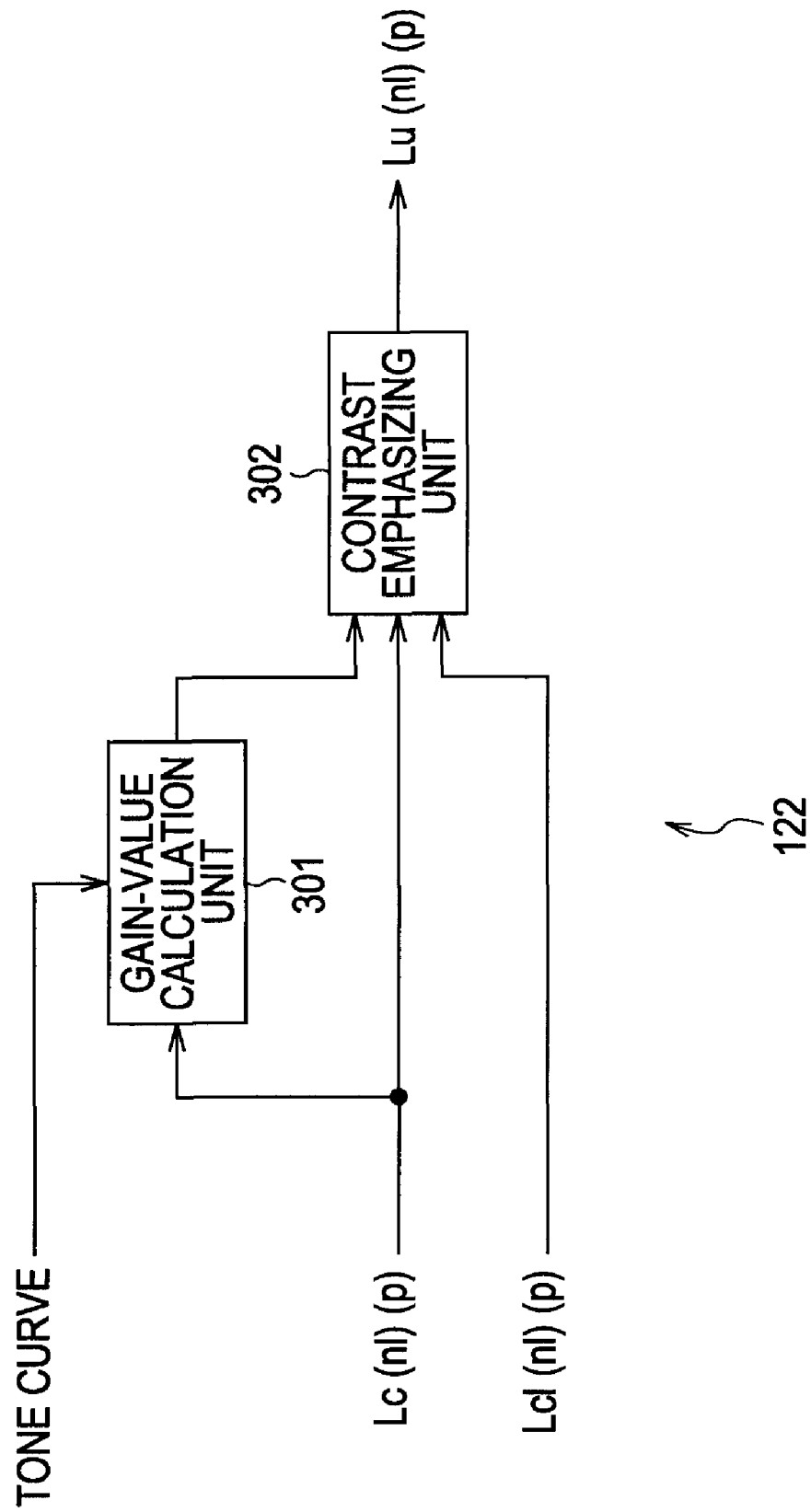
FIG. 10 is a diagram illustrating an example of a configuration of a contrast correction unit.

FIG. 10 is a diagram illustrating an example of a configuration of functions of the contrast correction unit 122 shown in FIG. 5. The contrast correction unit 122 includes a gain-value calculation unit 301 and a contrast emphasizing unit 302.

The gain-value calculation unit 301 calculates a γ-comp parameter which is a representative value of an inclination of the tone curve from the tone curve recorded in the tone-curve memory 119. Furthermore, the gain-value calculation unit 301 calculates gain values g(p) used to perform contrast correction on the luminance values Lc(nl)(p) in accordance with the luminance values Lc(nl)(p) supplied from the mapping unit 121 and the γ-comp parameter, and supplies the gain values g(p) to the contrast emphasizing unit 302.

The contrast emphasizing unit 302 corrects contrast of the luminance image including the luminance values Lc(nl)(p) supplied from the mapping unit 121 using the gain values g(p) supplied from the gain-value calculation unit 301 and the general luminance values Lcl(nl)(p) supplied from the mapping unit 120 so that the contrast of the luminance image is emphasized. The contrast emphasizing unit 302 supplies luminance values Lu(nl)(p) obtained through the contrast correction to the tone correction units 85-1 to 85-3.

Next, referring to a flowchart of FIG. 11, image processing executed by the DSP 16 will be described. Note that this processing starts after image capturing using the digital video camera shown in FIG. 1 is started and supply of a stream of image data (mosaic image) from the A/D convertor 15 to the DSP 16 is started. Note that the image data supplied to the DSP 16 is successively stored in the internal memory, not shown, included in the DSP 16.

In step S11, the white balance processor 51 reads a mosaic image.

Specifically, the white balance processor 51 reads a mosaic image of a leading frame stored in the internal memory, not shown, included in the DSP 16.

In step S12, the white balance processor 51 controls white balance of the obtained mosaic image and supplies the mosaic image to the demosaicing processor 52.

In step S13, the demosaicing processor 52 performs demosaicing processing. Specifically, the demosaicing processor 52 performs the demosaicing processing on the mosaic image supplied from the white balance processor 51 so as to generate an RGB image and supplies the RGB image to the tone correction processor 53.

In step S14, the tone correction processor 53 performs tone correction processing and corrects tone of the RGB image supplied from the demosaicing processor 52. Then, the tone correction processor 53 supplies the RGB image which has been subjected to the tone correction to the gamma correction processor 54. Note that the tone correction processing will be described in detail hereinafter.

In step S15, the gamma correction processor 54 performs gamma correction on the RGB image supplied from the tone correction processor 53 and supplies the RGB image to the YC conversion processor 55.

In step S16, the YC conversion processor 55 performs YC conversion processing. For example, the YC conversion processor 55 performs YC matrix processing on the RGB image supplied from the gamma correction processor 54 and band limitation on chromatic components so as to generate Y and C images from the RGB image. Then, in step S17, the YC conversion processor 55 outputs the Y and C images. For example, the YC conversion processor 55 outputs the Y and C images to the LCD driver 18 or the CODEC 20 where appropriate.

In step S18, the white balance processor 51 determines whether a subsequent frame exists. For example, when a mosaic image of a subsequent frame is stored in the internal memory, not shown, included in the DSP 16, it is determined that the subsequent frame exists.

In step S18, when it is determined that the subsequent frame exists, the process returns to step S11 where a mosaic image of the next frame to be processed is read. On the other hand, when it is determined that the subsequent frame does not exist in step S18, the image processing is terminated.

Next, referring to flowcharts shown in FIGS. 12 and 13, the tone correction processing corresponding to the operation of step S14 of FIG. 11 will be described.

In step S41, the weighted product-sum unit 117 and the tone-curve calculation unit 118 read intermediate data. Specifically, the interpolation unit 271 of the weighted product-sum unit 117 reads the block integration values serving as the intermediate data from the block-integration-value memory 116, and the interpolation unit 272 of the weighted product-sum unit 117 reads the block histograms serving as the intermediate data from the block-histogram memory 114. Furthermore, the tone-curve calculation unit 118 reads the luminance-region information serving as the intermediate data from the luminance-region-information memory 112.

In step S42, the saturated-pixel exception unit 152 of the luminance-region-information calculation unit 111 reads noiseLevel(nl) and saturationLevel(nl) from the internal memory, not shown, included in the DSP 16.

In step S43, the tone correction processor 53 reads a pixel value of a processing pixel of the RGB image from the demosaicing processor 52. Specifically, the nonlinear conversion units 84-1 to 84-3 read a pixel value Rw(p) of an R component, a pixel values Gw(p) of a G component, and a pixel values Bw(p) of a B component of the processing pixel, respectively. The luminance calculation unit 81 reads the pixel values of the R, G, and B components of the processing pixel.

In step S44, the luminance calculation unit 81 calculates a luminance value L(p) of the processing pixel in accordance with the read pixel values, and supplies the luminance value L(p) to the nonlinear conversion unit 82. For example, the luminance calculation unit 81 obtains a luminance value by multiplying the read pixel values of the R, G, and B components by predetermined coefficients and obtaining a linear sum, or obtains the maximum value selected from among the pixel values of the R, G, and B components as a luminance value.

In step S45, the nonlinear conversion unit 82 performs nonlinear conversion on the luminance value L(p) supplied from the luminance calculation unit 81 and supplies a luminance value L(nl)(p) obtained through the conversion to the luminance-tone correction unit 83 and the tone correction units 85. For example, the nonlinear conversion unit 82 performs the nonlinear conversion on the luminance value L(p) using a function having a characteristic of monotone increasing which increases upward, such as a power characteristic using an index smaller than 1 or a logarithmic characteristic.

In step S46, the luminance-tone correction unit 83 and the tone correction units 85 read the luminance value L(nl)(p) of the processing pixel from the nonlinear conversion unit 82.

In step S47, the luminance-region-information calculation unit 111 of the luminance-tone correction unit 83 performs pixel processing for calculating luminance-region information. Note that the pixel processing performed for calculating the luminance-region information will be described in detail hereinafter, and in the pixel processing performed for calculating the luminance-region information, luminance values of pixels of the luminance image which have been supplied so far are compared with the luminance value L(nl)(p) read from the nonlinear conversion unit 82 and sorting is performed.

In step S48, the block-histogram calculation unit 113 performs pixel processing for calculating a block histogram. Note that the pixel processing performed for calculating the block histogram will be described in detail hereinafter, and in the pixel processing performed for calculating the block histogram, the processing pixel is categorized into a luminance block in accordance with the luminance value L(nl)(p) read from the nonlinear conversion unit 82 and a position of the processing pixel. Then, a value of one of the counters 202 of the block-histogram calculation unit 113 corresponding to the luminance block is incremented.

In step S49, the block-integration-value calculation unit 115 performs pixel processing for calculating a block integration value. Note that the pixel processing performed for calculating the block integration value will be described in detail hereinafter, and in the pixel processing performed for calculating the block integration value, the processing pixel is categorized into a luminance block in accordance with the luminance value L(nl)(p) read from the nonlinear conversion unit 82 and the position of the processing pixel, and the luminance value L(nl)(p) is added to the block integration value corresponding to the luminance block.

In step S50, the weighted product-sum unit 117 calculates a general luminance value Ll(nl)(p) of the processing pixel through the general-luminance-value calculation processing, and supplies the general luminance value Ll(nl)(p) to the tone-curve calculation unit 118 and the mapping unit 120. Note that the general-luminance-value calculation processing will be described in detail hereinafter.

In step S51, the tone-curve calculation unit 118 obtains a tone curve using the luminance-region information read from the luminance-region-information memory 112 and the general luminance value Ll(nl)(p) supplied from the weighted product-sum unit 117.

Figure 14:
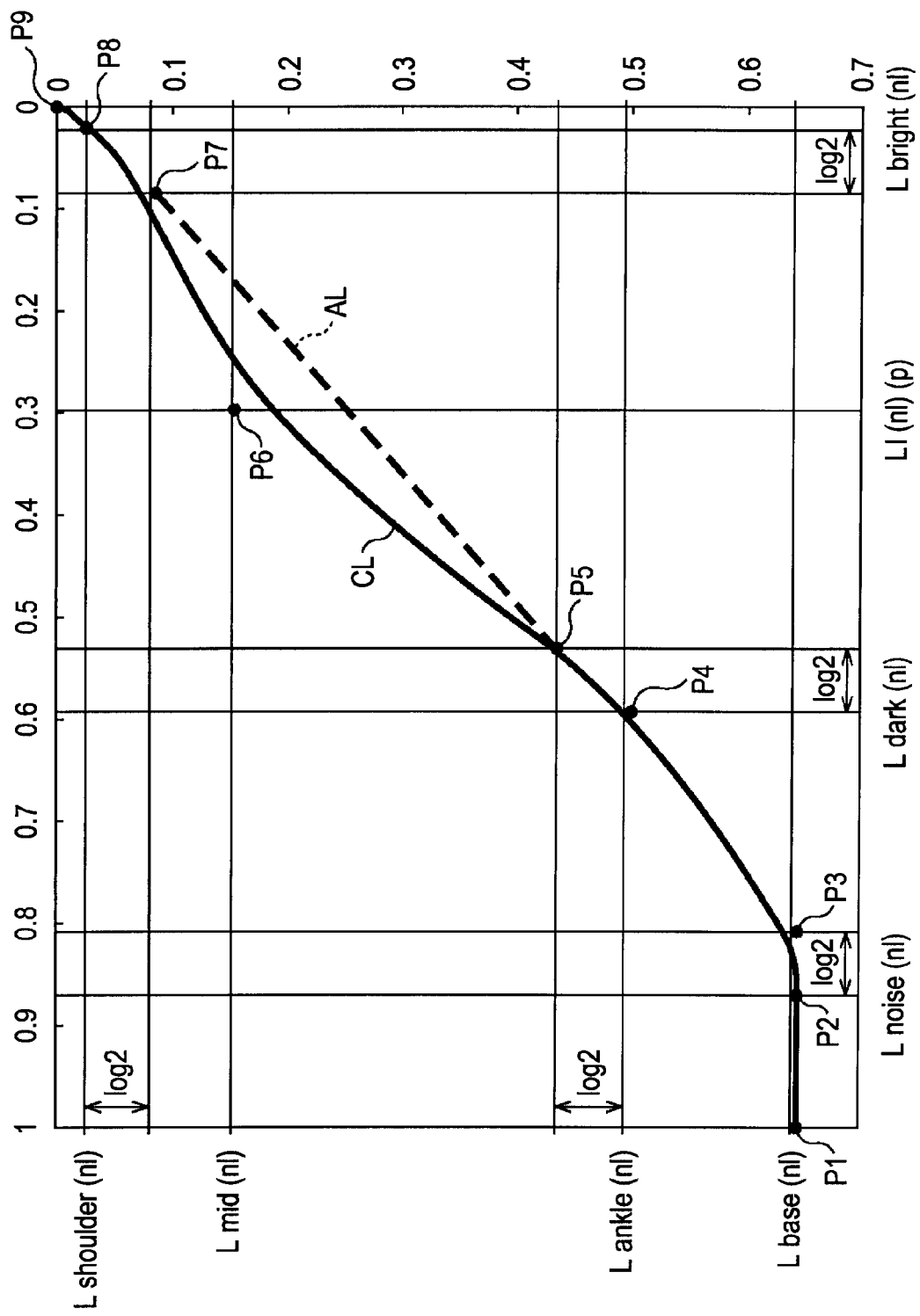
FIG. 14 is a diagram illustrating a tone curve.

For example, the tone-curve calculation unit 118 sets control points in the tone curve as shown in FIG. 14. Note that the axis of abscissa of a graph shown in FIG. 14 denotes a logarithm value of input luminance before tone correction and the axis of ordinate denotes a logarithm value of output luminance after the tone correction is performed using a tone curve CL.

First, the tone-curve calculation unit 118 sets nine control points P1 to P9. The control point P1 is set at a point corresponding to input luminance of a predetermined minimum level and output luminance of a predetermined minimum level Lbase(nl). The control point P2 is set at a point corresponding to input luminance of a predetermined noise level Lnoise(nl) which can represent that the luminance is in a noise level and output luminance of the minimum level Lbase (nl). The control point P3 is set at a point corresponding to input luminance of a luminance level of twice the noise level Lnoise(nl) and output luminance of the minimum level Lbase (nl).

The control point P4 is set at a point corresponding to input luminance of a skirt value Ldark(nl) on the dark luminance side serving as the luminance-region information supplied from the luminance-region-information memory 112 and output luminance of a luminance value Lankle(nl) which is a luminance value of a substantially black level. The control point P5 is set at a point corresponding to input luminance of a luminance value of twice the skirt value Ldark(nl) and output luminance of a luminance value of twice the luminance value Lankle(nl). The control point P6 is set at a point corresponding to input luminance corresponding to the general luminance value Ll(nl)(p) supplied from the weighted product-sum unit 117 and output luminance of a middle luminance level Lmid(nl) which is a predetermined intermediate level of a luminance range of the output luminance. That is, the control point P6 is controlled so that, when the general luminance value is subjected to the tone correction using the tone curve, the general luminance value is changed to a substantially intermediate value of a possible range of the luminance value after the tone correction.

The control point P7 is set at a point corresponding to input luminance having a luminance value corresponding to half the skirt value Lbright(nl) on the bright luminance side and output luminance having half the luminance value Lshoulder (nl) which is a luminance value of a substantially white level. The control point P8 is set at a point corresponding to input luminance corresponding to the skirt value Lbright(nl) serving as the luminance-region information supplied from the luminance-region-information memory 112 and output luminance having the luminance value Lshoulder(nl). The control point P9 is set at a point corresponding to input luminance having a predetermined maximum value and output luminance having a predetermined maximum value.

Furthermore, in FIG. 14, an inclination of a segment AL which connects the control point P5 to the control point P7 denotes the γ-comp parameter representing an inclination of the tone curve CL.

A shape of the tone curve CL for each processing pixel is determined by obtaining an output luminance value (tone curve value) relative to an input luminance value through B-Spline interpolation processing on the basis of the control points P1 to P9.

Note that the tone curve CL may be stored in the tone-curve memory 119 in any shape. However, since the shape of the tone curve CL is updated for each pixel, the tone curve CL is preferably stored in a form which realizes a small data amount. For example, it is appropriate that the shape of the tone curve is represented using some to more than 10 control points, and the mapping units 120 and 121 calculate the tone curve CL using the control points.

The tone-curve calculation unit 118 records pairs of input luminance and output luminance of the set control points P1 to P9 in the tone-curve memory 119. Therefore, in a period of time in which a luminance image for one frame is processed, practically, only the input luminance of the control point P6 is updated every time the processing pixel is changed.

Note that since the control point P3 is set as an assistant point, the tone curve CL reliably passes the control point P2 or in the vicinity of the control point P2. Specifically, when the input luminance corresponds to the substantially noise level Lnoise(nL), the input luminance is subjected to tone conversion so as to correspond to the output luminance of the minimum level Lbase(nl). Furthermore, since the control point P5 is set as an assistant point, the input luminance corresponds to the substantially skirt value Ldark(nl), and the tone curve CL in the vicinity of a portion (in the vicinity of the control point P4) corresponding to the luminance value of Lankle(nl) in which the output luminance is substantially the black level is prevented from being steeply and moderately inclined in an extreme manner. Furthermore, since the control point P7 is set as an assistant point, the input luminance corresponds to substantially the skirt value Lbright(nl), and the tone curve CL in the vicinity of a portion (in the vicinity of the control point P8) corresponding to the luminance value of Lshoulder(nl) in which the output luminance is substantially the white level is prevented from being steeply and moderately inclined in an extreme manner.

Accordingly, the tone curve CL moderately inclined at a portion in the vicinity of the control point P6 and has inclination of substantially 1 at portions in the vicinity of the control points P4 and P8, that is, the tone curve CL has a reverse S-shape and monotonically increases.

Specifically, the tone curve CL suppresses brightness of a pixel having a high luminance value when the general luminance value Ll(nl)(p) is high whereas the tone curve CL enhances brightness of a pixel having a low luminance value when the general luminance value Ll(nl)(p) is low. Accordingly, a combination of tone compression and contrast correction using the tone curve CL enables compression of tone of an image so that dark portions of the image become bright without generating an overexposed portion while a detail of the image is maintained.

Figure 12:
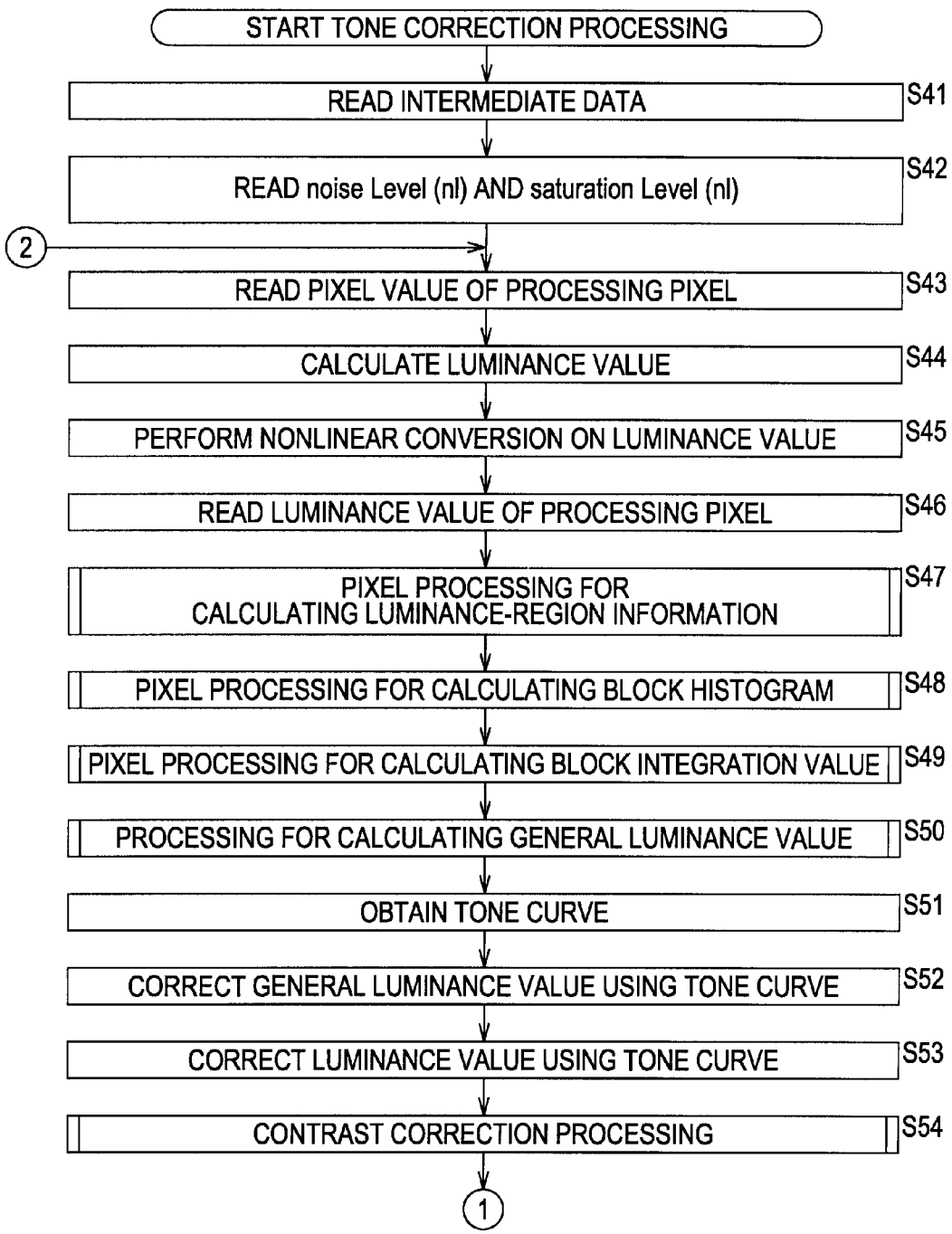
FIG. 12 is a flowchart illustrating tone correction processing.
Figure 13:
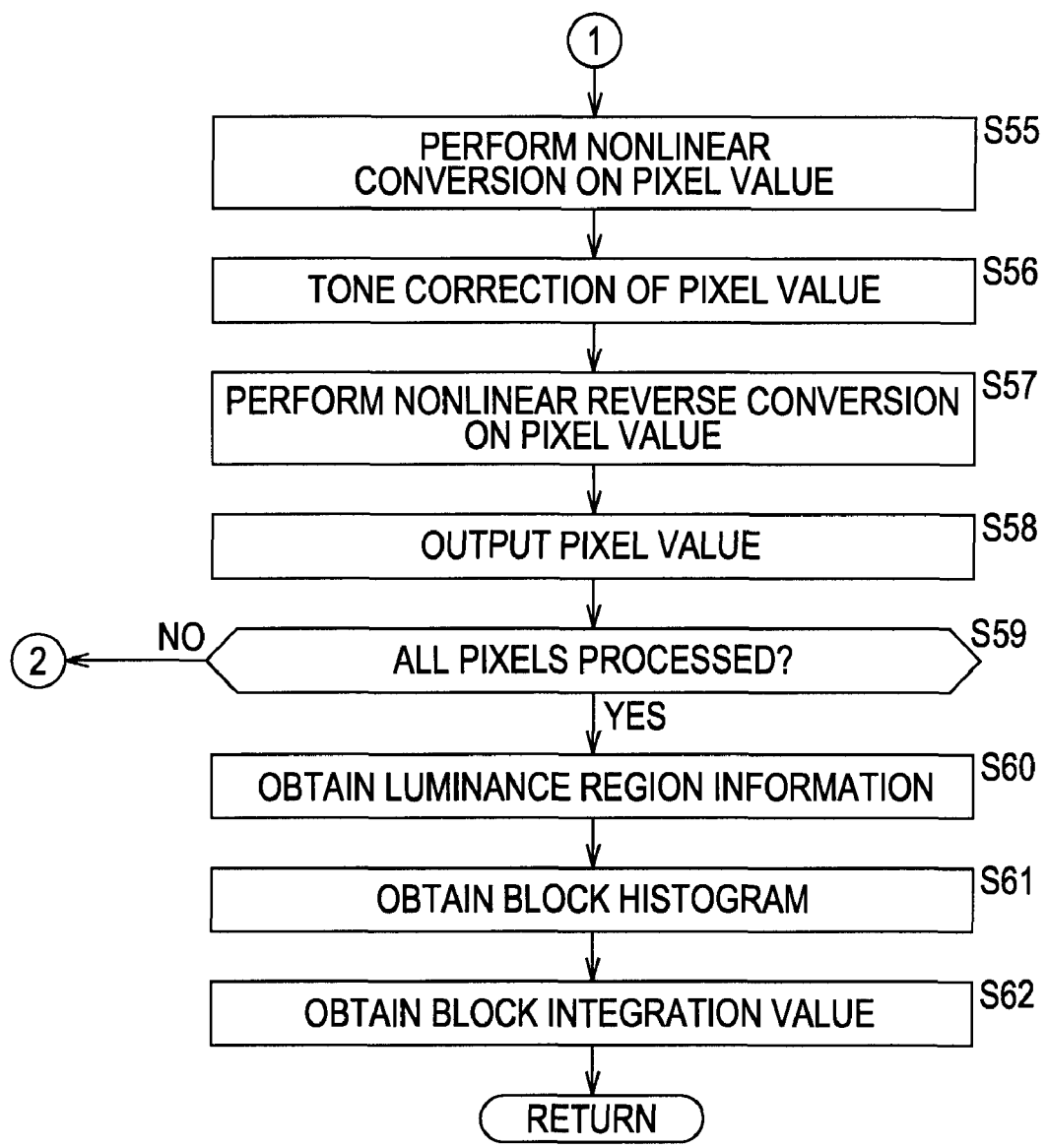
FIG. 13 is a flowchart illustrating the tone correction processing.

Returning back to the description of the flowchart shown in FIG. 12, after the shape of the tone curve is obtained and the shape of the tone curve, that is, the pairs of the input luminance and the output luminance of the control points are recorded in the tone-curve memory 119 in step S51, the process proceeds to step S52.

In step S52, the mapping unit 120 corrects the general luminance value Ll(nl)(p) supplied from the weighted product-sum unit 117 in accordance with the tone curve recorded in the tone-curve memory 119, and supplies the general luminance value Ll(nl)(p) to the contrast correction unit 122. That is, the mapping unit 120 obtains the tone curve by the B-Spline interpolation processing using the control points stored in the tone-curve memory 119, and converts the general luminance value Ll(nl)(p) into a general luminance value Lcl(nl)(p) using the obtained tone curve whereby tone of the general luminance value Ll(nl)(p) is corrected.

In step S53, the mapping unit 121 corrects the read luminance value L(nl)(p) of the processing pixel in accordance with the tone curve recorded in the tone-curve memory 119, and supplies the corrected luminance value L(nl)(p) to the contrast correction unit 122. Specifically, the mapping unit 121 obtains the tone curve by the B-Spline interpolation processing using the control points recorded in the tone-curve memory 119, and converts the luminance value L(nl)(p) into a luminance value Lc(nl)(p) using the obtained tone curve whereby tone of the luminance value L(nl)(p) is corrected.

In step S54, the contrast correction unit 122 performs contrast correction processing so that tone is corrected using the tone curve, and corrects the luminance image corresponding to the luminance value Lc(nl)(p) in which the contrast is deteriorated so that contrast substantially the same as that of the original image is obtained. The contrast correction unit 122 supplies the luminance value Lu(nl)(p) which has been subjected to the contrast correction to the tone correction units 85. Note that the contrast correction processing will be described in detail hereinafter.

In step S55, the nonlinear conversion units 84 perform nonlinear conversion on the read pixel values of the processing pixel and supply the pixel values to the tone correction units 85. Specifically, the nonlinear conversion units 84-1 to 84-3 perform nonlinear conversion the same as that performed in step S45 on the pixel values Rw(p), Gw(p), and Bw(p), respectively.

In step S56, the tone correction units 85-1 to 85-3 perform tone correction on the pixel values supplied from the nonlinear conversion units 84 using the luminance value L(nl)(p) supplied from the nonlinear conversion unit 82 and the luminance value Lu(nl)(p) supplied from the luminance-tone correction unit 83. Then, the tone correction units 85 supply the pixel values which have been subjected to the tone correction to the nonlinear reverse conversion units 86.

For example, each of the tone correction units 85 multiplies a corresponding one of the pixel values of the color components by a ratio of the luminance value L(nl)(p) to the luminance value Lu(nl)(p) obtained through the tone correction. More specifically, for example, the tone correction unit 85-1 obtains a pixel value Ru(nl) through the tone correction by performing the following equation (2).

Equation (2)

$$Ru(nl)(p) = \left(\frac{R(nl)(p)}{L(nl)(p)}\right) \cdot Lu(nl)(p) \qquad (2)$$

In equation (2), the pixel value R(nl)(p) obtained through the nonlinear conversion is multiplied by the ratio of the luminance value before the tone correction to the luminance value after the tone correction, that is, by a value obtained by dividing the luminance value Lu(nl)(p) after the tone correction by the luminance value L(nl)(p) before the tone correction. Calculations similar to equation (2) described above are performed in the tone correction units 85-2 and 85-3 so that the pixel values after the tone correction are obtained.

Note that when the nonlinear conversion performed in the nonlinear conversion units 82 and 84 are logarithmic conversion, the pixel values after the tone correction may be obtained by performing a calculation shown as equation (3).

Equation (3)

$$Ru(nl)(p) = (Ru(nl)(p) - L(nl)(p)) + Lu(nl)(p)$$

In equation (3), a difference value between the luminance value Lu(nl)(p) after the tone correction and the luminance value L(nl)(p) before the tone correction is added to the pixel value R(nl)(p) so that the pixel value Ru(nl)(p) after the tone correction is obtained.

In step S57, the nonlinear reverse conversion units 86-1 to 86-3 perform nonlinear reverse conversion, which is reverse conversion of the nonlinear conversion performed by the nonlinear conversion units 84, on the pixel values supplied from the tone correction units 85. Then, in step S58, the nonlinear reverse conversion units 86-1 to 86-3 output pixel values Ru(p), Gu(p), and Bu(p) obtained through the nonlinear reverse conversion to the gamma correction processor 54.

In step S59, the tone correction processor 53 determines whether all pixels included in the RGB image of a frame being processed have been processed. When it is determined that at least one pixel has not been processed, that is, at least one pixel has not been set as a processing pixel in step S59, the process returns to step S43, and the processing described above is performed again.

On the other hand, when it is determined that all the pixels have been processed in step S59, the luminance-region-information calculation unit 111 (shown in FIG. 5) obtains luminance-region information in step S60. Specifically, the sorting unit 153 of the luminance-region-information calculation unit 111 supplies a value recorded in the register 162-k as the skirt value Ldark(nl) on the dark luminance side serving as the luminance-region information to the luminance-region-information memory 112 which records the luminance-region information. Furthermore, the sorting unit 154 supplies a value recorded in the register 172-k as the skirt value Lbright(nl) on the bright side serving as the luminance-region information to the luminance-region-information memory 112 which records the luminance-region information.

In step S61, the block-histogram calculation unit 113 obtains block histograms. Specifically, the block-histogram calculation unit 113 supplies values stored in the counters 202-1 to 202-N as block histograms of corresponding luminance blocks to the block-histogram memory 114 which stores the histograms.

Figure 11:
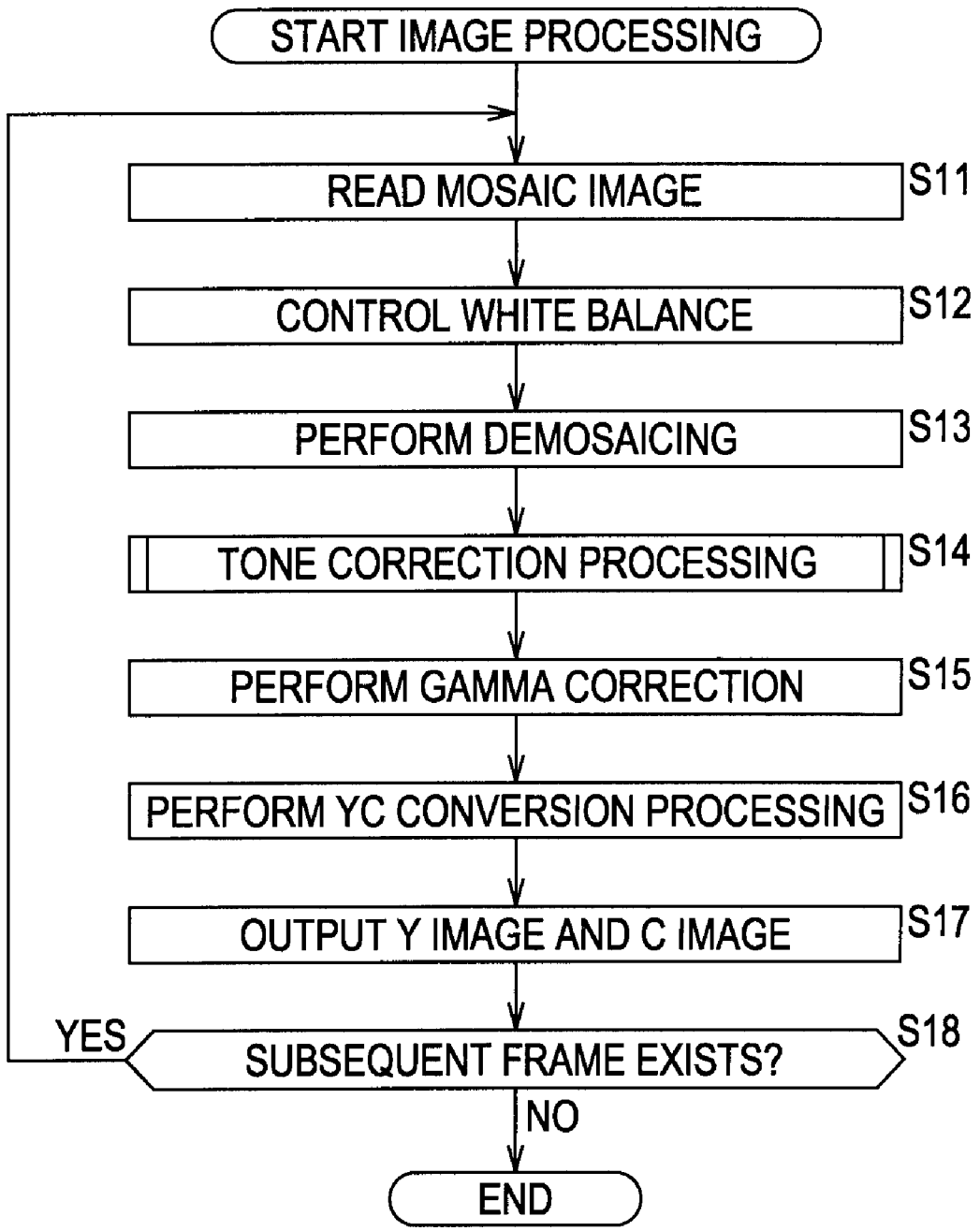
FIG. 11 is a flowchart illustrating image processing.

In step S62, the block-integration-value calculation unit 115 obtains block integration values, the tone correction processing is terminated, and the process proceeds to step S15 of FIG. 11. Specifically, the block-integration-value calculation unit 115 supplies sums of the luminance values L(nl)(p) recorded in the registers 242-1 to 242-N as the block integration values to the block-integration-value memory 116 which records the sums.

As described above, in the tone correction processing, intermediate data is obtained in accordance with the luminance image for one frame. Then, after the intermediate data is obtained, the luminance-region information, the block histograms, and the block integration values are stored in the luminance-region-information memory 112, the block-histogram memory 114, and the block-integration-value memory 116, respectively. In the luminance-tone correction unit 83, since the general luminance value and the tone curve of the processing pixel are calculated (the edge preserving smoothing processing is performed) using intermediate data which has been obtained from a temporally succeeding frame relative to the frame being processed, even if the image being processed is an moving image, the edge preserving smoothing processing employing a large operator size can be performed using a small working memory without double scanning of all the pixels of the image.

Figure 15:
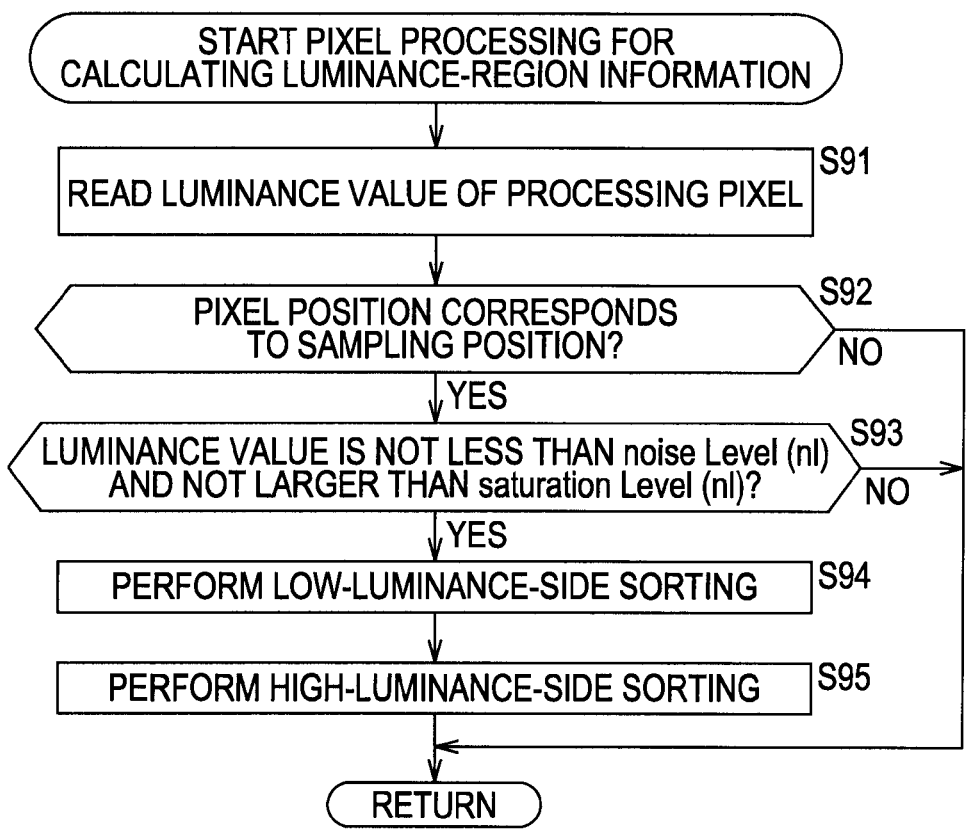
FIG. 15 is a flowchart illustrating image processing for calculating luminance region information.
Figure 16:
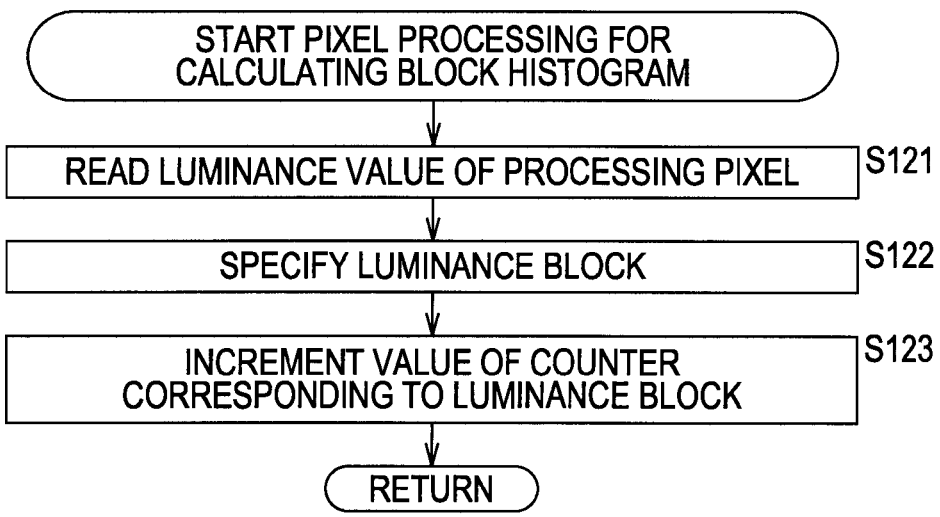
FIG. 16 is a flowchart illustrating image processing for calculating a block histogram.
Figure 17:
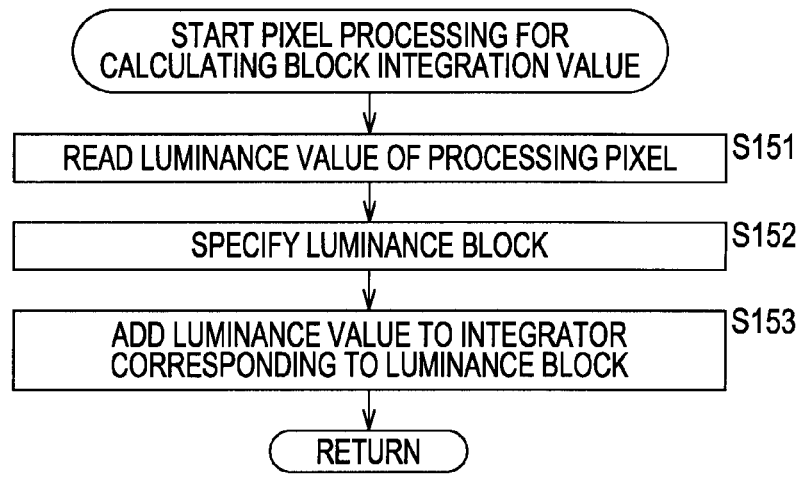
FIG. 17 is a flowchart illustrating image processing for calculating a block integration value.

Next, referring to flowcharts of FIGS. 15 to 17, operations of step S47 to step S49 of FIG. 12 will be described.

First, referring to the flowchart of FIG. 15, the pixel processing performed for calculating luminance-region information which corresponds to the operation of step S47 of FIG. 12 will be described.

In step S91, the thinning-out unit 151 of the luminance-region-information calculation unit 111 reads the luminance value L(nl)(p) of the processing pixel from the nonlinear conversion unit 82.

In step S92, the thinning-out unit 151 determines whether a pixel position of the processing pixel having the read luminance value L(nl)(p) corresponds to one of sampling positions provided with predetermined intervals. When it is determined that the pixel position does not correspond to one of the sampling positions in step S92, the read luminance value L(nl)(p) is not output to the saturated-pixel exception unit 152 and the process proceeds to step S48 of FIG. 12.

On the other hand, when it is determined that the pixel position corresponds to one of the sampling positions in step S92, the read luminance value L(nl)(p) is output to the saturated-pixel exception unit 152, and the process proceeds to step S93. In step S93, the saturated-pixel exception unit 152 determines whether the luminance value supplied from the thinning-out unit 151 is equal to or larger than noiseLevel(nl) and equal to or smaller than saturationLevel(nl).

When it is determined that the luminance value supplied from the thinning-out unit 151 is not equal to or larger than noiseLevel(nl) or not equal to or smaller than saturationLevel(nl) in step S93, the luminance value L(nl)(p) is not output from the saturated-pixel exception unit 152, and the process proceeds to step S48 of FIG. 12.

On the other hand, when it is determined that the luminance value supplied from the thinning-out unit 151 is equal to or larger than noiseLevel(nl) and equal to or smaller than saturationLevel(nl) in step S93, that is, the luminance value is within an effective luminance region, the saturated-pixel exception unit 152 outputs the luminance value L(nl)(p) to the sorting units 153 and 154, and the process proceeds to step S94.

In step S94, the sorting unit 153 performs dark-luminance-side sorting. Specifically, the comparator 161-1 of the sorting unit 153 compares a value recorded in the register 162-1 with the luminance value L(nl)(p) supplied from the saturated-pixel exception unit 152. When the luminance value L(nl)(p) is smaller than the value of the register 162-1, the comparator 161-1 supplies the value recorded in the register 162-1 to the comparator 161-2 in the subsequent stage and the luminance value L(nl)(p) is recorded in the register 162-1. On the other hand, when the luminance value L(nl)(p) is equal to or larger than the value in the register 162-1, the comparator 161-1 merely outputs the luminance value L(nl)(p) to the comparator 161-2 in the subsequent stage. The same processing is performed in the comparators 161-2 to 161-k in the subsequent stages. As a result, among luminance values L(nl)(p) of pixels at the sampling positions in the frame, the smallest luminance value L(nl)(p) to the k-th smallest luminance value L(nl)(p) are finally recorded in the registers 162-1 to 162-k, respectively, in ascending order.

In step S95, the sorting unit 154 performs bright-luminance-side sorting, and the process proceeds to step S48 of FIG. 12. Specifically, the comparator 171-1 compares a value recorded in the register 172-1 with the luminance value L(nl)(p) supplied from the saturated-pixel exception unit 152. When the luminance value L(nl)(p) is larger than the value of the register 172-1, the comparator 171-1 supplies the value recorded in the register 172-1 to the comparator 171-2 in the subsequent stage and the luminance value L(nl)(p) is recorded in the register 172-1. On the other hand, when the luminance value L(nl)(p) is equal to or smaller than the value in the register 172-1, the comparator 171-1 merely outputs the luminance value L(nl)(p) to the comparator 171-2 in the subsequent stage. The same processing is performed in the comparators 171-2 to 171-$k$ in the subsequent stages. As a result, among the luminance values L(nl)(p) of the pixels at the sampling positions in the frame, the smallest luminance value L(nl)(p) to the k-th largest luminance value L(nl)(p) are finally recorded in the registers 172-1 to 172-$k$, respectively, in descending order.

As described above, by performing the dark-luminance-side sorting and the bright-luminance-side sorting every time the luminance value of the processing pixel is read, a skirt value serving as the luminance-region information is obtained.

Next, referring to the flowchart of FIG. 16, the pixel processing performed for calculating a block histogram which corresponds to the operation in step S48 of FIG. 12 will be described.

In step S121, the block selection unit 201 of the block-histogram calculation unit 113 reads the luminance value L(nl)(p) of the processing pixel from the nonlinear conversion unit 82.

In step S122, the block selection unit 201 specifies a luminance block to which the processing pixel belongs in accordance with the read luminance value L(nl)(p) and a position of the processing pixel having the luminance value L(nl)(p). Then, in step S123, the block selection unit 201 instructs one of the counters 202-1 to 202-N which corresponds to the specified luminance block to increment the value stored therein. The counter 202 increments the stored value by one in accordance with the instruction issued by the block selection unit 201, and the process proceeds to step S49 of FIG. 12.

As described above, every time the luminance value of the processing pixel is read, the processing pixel is categorized into one of the luminance blocks, and a value of one of the counters 202 corresponding to the categorized luminance block into which the processing pixel has been categorized is incremented by one. By this, the number of pixels included in each of the luminance blocks is obtained, and the number of pixels is determined as a block histogram for each luminance block.

Next, referring to the flowchart of FIG. 17, the pixel processing performed for calculating a block integration value which corresponds to the operation of step S49 of FIG. 12 will be described.

In step S151, the block selection unit 231 of the block-integration-value calculation unit 115 reads the luminance value L(nl)(p) of the processing pixel from the nonlinear conversion unit 82.

In step S152, the block selection unit 231 specifies a luminance block to which the processing pixel belongs in accordance with the read luminance value L(nl)(p) and a position of the processing pixel having the luminance value L(nl)(p). Then, in step S153, the block selection unit 231 supplies the luminance value L(nl)(p) to one of the integrators 232-1 to 232-N which corresponds to the specified luminance block, and adds the luminance value L(nl)(p) of the processing pixel to an integration value of the recorded luminance value.

The adder 241 of one of the integrators 232 to which the luminance value L(nl)(p) of the processing pixel is supplied from the block selection unit 231 adds the luminance value L(nl)(p) supplied from the block selection unit 231 to the integration value recorded in a corresponding one of the registers 242, and a resultant value is recorded in the register 242. Then, the register 242 updates the integration value recorded therein, and the process proceeds to step S50 of FIG. 12.

As described above, every time the luminance value of the processing pixel is read, the processing pixel is categorized into one of the luminance blocks, and the luminance value of the processing pixel is added to the value of one of the registers 242 corresponding to the luminance block in which the processing pixel is categorized. By this, a sum of luminance values of pixels included in each of the luminance blocks is obtained for each luminance block and is determined as a block integration value.

Figure 18:
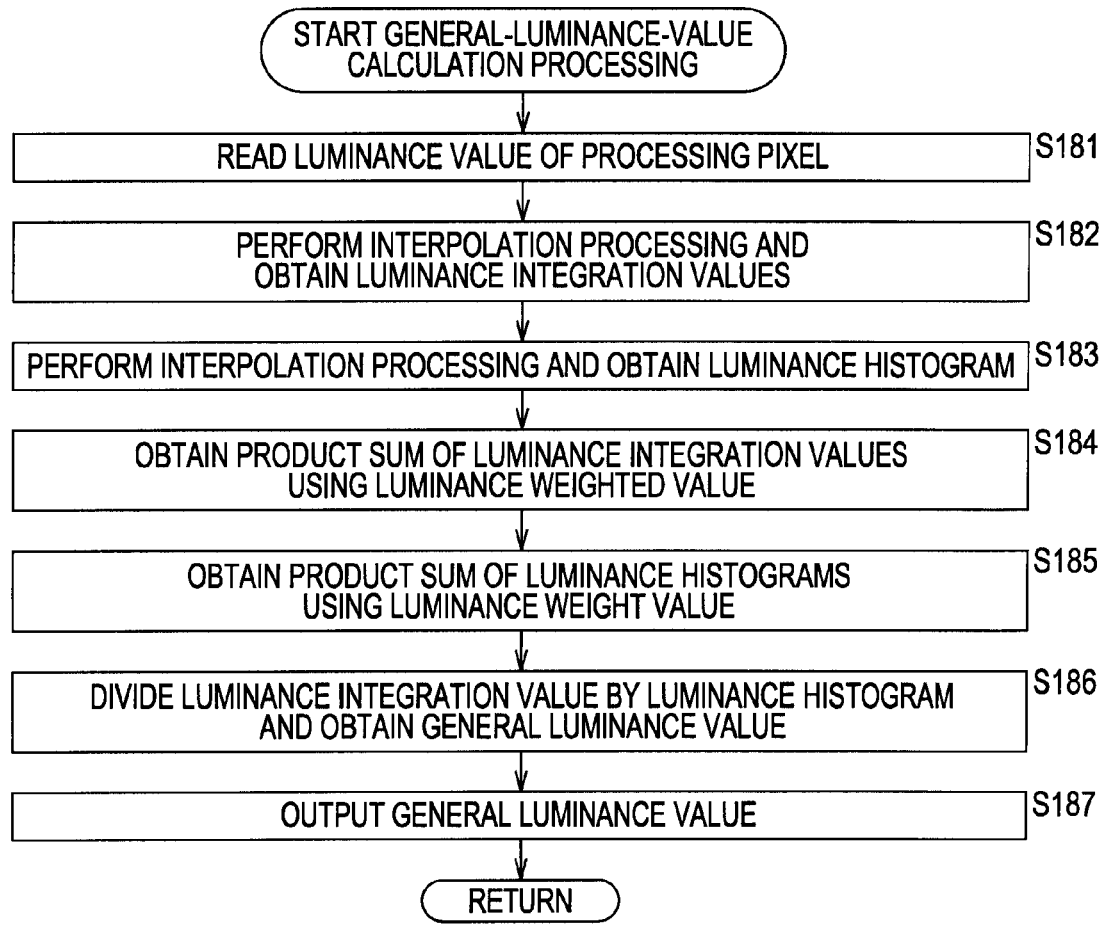
FIG. 18 is a flowchart illustrating general-luminance-value calculation processing.

Next, referring to a flowchart of FIG. 18, the general-luminance-value calculation processing corresponding to the operation of step S50 of FIG. 12 will be described.

In step S181, the interpolation units 271 and 272 and the product-sum units 274 and 275 of the weighted product-sum unit 117 read the luminance value L(nl)(p) of the processing pixel from the nonlinear conversion unit 82.

In step S182, the interpolation unit 271 performs interpolation processing using block integration values of luminance blocks included in spatial blocks in the vicinity of the processing pixel having the read luminance value L(nl)(p) so as to obtain a luminance integration value for each center value $\lambda$ at a position of the processing pixel.

That is, the interpolation unit 271 reads, assuming that each of the 16 spatial blocks (4×4 blocks) in the vicinity of the processing pixel in the spatial direction (including a spatial block including the processing pixel) is determined as a spatial block $BK_{i,j}$ (where $1 \leq i \leq 4$, $1 \leq j \leq 4$), an interpolation coefficient $B_{i,j}$ for each spatial block $BK_{i,j}$. For example, a look-up table including function values of a third-order B-spline function is stored in the spatial-weight-function storage unit 273. The interpolation unit 271 reads a function value determined in accordance with a relative position between a position of the processing pixel and a position of the spatial block $BK_{i,j}$ from the look-up table, and determines the read function value as the interpolation coefficient $B_{i,j}$ of the spatial block $BK_{i,j}$. Note that the interpolation unit 271 may directly calculate the interpolation coefficient $B_{i,j}$ by a calculation using the three-order B-spline function, for example.

Then, the interpolation unit 271 determines center values of luminance ranges of the D luminance blocks obtained from one of the spatial blocks to be $\lambda 1$ to $\lambda D$, and determines luminance blocks having the center value of Xh (where $1 \leq h \leq D$), from among the D luminance blocks included in the spatial block $BK_{i,j}$, to be luminance blocks $LBK_{i,j,h}$. Then, the interpolation unit 271 reads a block integration value S(i, j, $\lambda$h) of each of the luminance blocks $LBK_{i,j,h}$ from the block-integration-value memory 116. Note that the center values $\lambda 1$ to $\lambda D$ are simply referred to as center values $\lambda$ hereinafter unless otherwise distinguished.

Furthermore, the interpolation unit 271 calculates, for each center value $\lambda$, a total sum of products of read interpolation coefficients $B_{i,j}$ and corresponding block integration values S(i, j, $\lambda$), and determines a resultant value as a luminance integration value Sinterpolated($\lambda$) for each center value $\lambda$. That is, the interpolation unit 271 obtains the luminance integration value Sinterpolated for each center value $\lambda$ by calculating equation (4) below.

Equation (4)

$$Sinterpolated(\lambda) = \sum_{i,j} B_{i,j} \cdot S(i, j, \lambda) \qquad (4)$$

Here, in equation (4), Σ represents that a sum of block integration values S(i, j, λ) multiplied by the interpolation coefficients $B_{i,j}$ is obtained while variables i and j are changed from 1 to 4. Therefore, the luminance integration value Sinterpolated(λ) is calculated by multiplying block integration values S(i, j, 7) of 16 luminance blocks having the center values λ, from among luminance blocks obtained from the 16 spatial blocks $BK_{i,j}$, by interpolation coefficients $B_{i,j}$ of the spatial blocks $BK_{i,j}$ including the luminance blocks, and obtaining a sum of values obtained from operation for multiplying 16 block integration values $B_{i,j}$ which have been multiplied by the correction coefficients by S(i, j, λ).

In this way, the D luminance integration values Sinterpolated(λ) are obtained. These luminance integration values are interpolated block integration values at the position of the processing pixel and are obtained for luminance (center values λ) of the individual luminance blocks. After obtaining the luminance integration values, the obtained luminance integration values are supplied to the product-sum unit 274.

In step S183, the interpolation unit 272 performs interpolation processing using block histograms of luminance blocks included in spatial blocks in the vicinity of the processing pixel having the read luminance value L(nl)(p) so as to obtain a luminance histogram for each center value λ, at the position of the processing pixel.

That is, the interpolation unit 272 reads, similarly to the operation of step S182, a function value determined in accordance with a relative position between the position of the processing pixel and a position of the spatial block $BK_{i,j}$ from the look-up table stored in the spatial-weight-function storage unit 273, and determines the read function value as the interpolation coefficient $B_{i,j}$ of the spatial block $BK_{i,j}$.

Then, the interpolation unit 272 reads a block histogram H(i, j, λ) of each of the luminance blocks $LBK_{i,j,h}$ from the block-histogram memory 114. Furthermore, the interpolation unit 272 calculates, for each center value λ, a total sum of products of read interpolation coefficients $B_{i,j}$ and corresponding block integration values H(i, j, λ), and determines a resultant value as a luminance histogram Hinterpolated(λ) for the center values λ. That is, the interpolation unit 272 obtains the luminance histogram Hinterpolated for each center value λ by calculating equation (5) below.

Equation (5)

$$Hinterpolated(\lambda) = \sum_{i,j} B_{i,j} \cdot H(i, j, \lambda) \quad (5)$$

Here, the right-hand side of equation (5) is obtained by replacing the block integration value S(i, j, λ) on the right-hand side of equation (4) by the block histogram H(i, j, λ).

In this way, D luminance histograms Hinterpolated(λ) are obtained. These luminance histograms represent block histograms in which positions of the processing pixels having luminance (center values λ) corresponding to luminance blocks are interpolated. After obtaining the luminance histograms, the interpolation unit 272 supplies the obtained luminance histograms to the product-sum unit 275.

In step S184, the product-sum unit 274 performs product-sum operation on the D luminance integration values supplied from the interpolation unit 271 using luminance weight values, and supplies a luminance integration value obtained through the product-sum operation to the divider 277.

That is, the product-sum unit 274 reads a luminance weight function from the luminance-weight-function look-up table stored in the luminance-weight-function storage unit 276. Then, the product-sum unit 274 obtains luminance weight values φ (λ, L(nl)(p)) for individual center values λ using the read luminance weight function, the luminance values L(nl) (p) supplied from the nonlinear conversion unit 82, and the center values λ.

Figure 19:
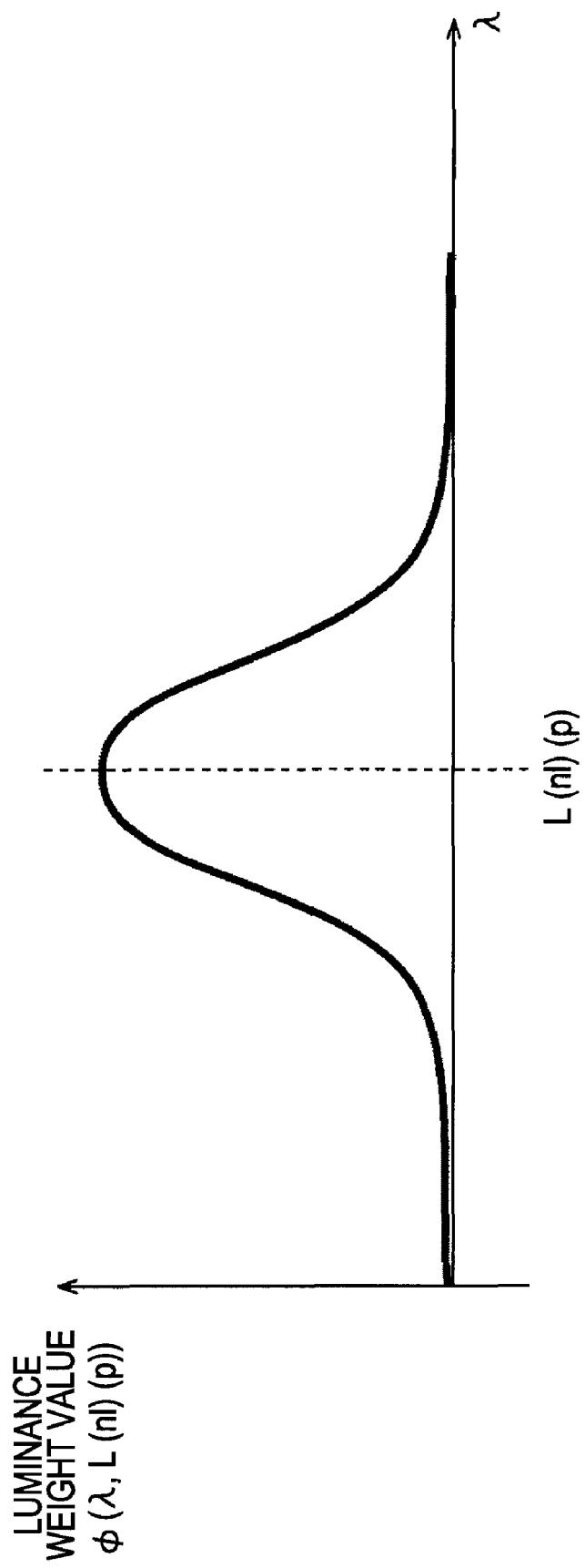
FIG. 19 is a diagram illustrating a luminance weight function.

For example, in the luminance-weight-function look-up table stored in the luminance-weight-function storage unit 276, a luminance-weight function in a form shown in FIG. 19 is stored. Note that, in FIG. 19, the axis of ordinate denotes values of the luminance-weight function, that is, the luminance-weight value φ(λ, L(nl)(p)) and the axis of abscissa denotes the center value λ.

The luminance weight function shown in FIG. 19 has a monomodal shape and has a larger value as a difference value between a luminance level of a luminance block corresponding to the luminance integration value (and the luminance histogram) interpolated at the position of the processing pixel, i.e., the center value λ, and a luminance value L(nl)(p) of the processing pixel is smaller.

When such a luminance weight function having a monomodal shape is used, for example, the product-sum unit 274 may obtain the luminance weight values φ(λ, L(nl)(p)) for individual center values λ by calculating the equation (6) below instead of by referring to the luminance-weight-function look-up table stored in the luminance-weight-function storage unit 276.

Equation (6)

$$\phi(\lambda, L(nl)(p)) = \exp\left(-\frac{(\lambda - L(nl)(p))^2}{2 \cdot \sigma th^2}\right) \quad (6)$$

Here, in equation (6), σth denotes a constant value which determines a degree of broadening of a skirt of the luminance weight function and is determined in advance. The product-sum unit 274 assigns the luminance values L(nl)(p) and the center values λ on the right-hand side of equation (6) so that the luminance weight values φ(λ, L(nl)(p)) for individual center values λ are obtained.

In the luminance weight function shown in equation (6), as the center values λ (luminance blocks) are nearer to the luminance value L(nl)(p) of the processing pixel, large weight values are assigned whereas as the center values λ (luminance blocks) are farther from the luminance value L(nl)(p), a small weight value is assigned.

After obtaining the luminance weight values φ(λ, L(nl)(p)) for individual center values λ, the product-sum unit 274 multiplies, for individual center values λ, the luminance integration values Sinterpolated(λ) by the luminance weight values φ(λ, L(nl)(p)) of the center values λ, and obtains a sum of the luminance integration values which are multiplied by the luminance weight values. That is, a weighted sum of the luminance integration values Sinterpolated(λ) by the luminance weight values of the individual center values λ is obtained.

This weighted sum is a total sum of the block integration values of all the luminance blocks obtained from the 16 spatial blocks in the vicinity of the position of the processing pixel which are multiplied by the interpolation coefficients determined in accordance with a relative position between the position of the processing pixel and positions of the spatial blocks including the luminance blocks and luminance weight values determined by a distance between (the center values λ of) the luminance blocks and the luminance values L(nl)(p) in a luminance direction.

In step S185, the product-sum unit 275 performs product-sum operation on the D luminance histograms supplied from the interpolation unit 272 using the luminance weight values, and supplies a luminance histogram which has been subjected to the product-sum operation to the divider 277.

That is, the product-sum unit 275 reads the luminance weight function from the luminance-weight-function look-up table stored in the luminance-weight-function storage unit 276, and obtains luminance weight values $\phi(\lambda, L(nl)(p))$ for individual center values λ using the read luminance weight function, the luminance values L(nl)(p) supplied from the nonlinear conversion unit 82, and the center values λ by calculating equation (6), for example.

Furthermore, the product-sum unit 275 multiplies the luminance histograms Hinterpolated(λ) by the luminance weight values $\phi(\lambda, L(nl)(p))$ for the individual center values λ, and obtains a sum of the luminance histograms multiplied by the luminance weight values. That is, a weighted sum of the luminance histograms Hinterpolated(λ) using the luminance weight values of the individual center values λ is obtained.

The weighted sum is a total sum of the block histograms of all the luminance blocks obtained from the 16 spatial blocks in the vicinity of the position of the processing pixel which are multiplied by the interpolation coefficients determined in accordance with a relative position between the position of the processing pixel and positions of the spatial blocks including the luminance blocks and luminance weight values determined by a distance between (the center values λ of) the luminance blocks and the luminance values L(nl)(p) in a luminance direction.

In step S186, the divider 277 divides the luminance integration value supplied from the product-sum unit 274 by the luminance histogram supplied from the product-sum unit 275 so as to obtain a general luminance value Ll(nl)(p). That is, the divider 277 calculates the general luminance value Ll(nl)(p) by calculating equation (7) below.

Equation (7)

$$Ll(nl)(p) = \frac{\sum_{\lambda} Sinterpolated(\lambda) \cdot \phi(\lambda, L(nl)(p))}{\sum_{\lambda} Hinterpolated(\lambda) \cdot \phi(\lambda, L(nl)(p))} \quad (7)$$

Here, in equation (7), ΣSinterpolated(λ)·φ(λ, L(nl)(p)) represents the luminance integration value obtained through the product-sum operation supplied from the product-sum unit 274, and the ΣHinterpolated(λ)·φ(λ, L(nl)(p)) represents the luminance histogram obtained through the product-sum operation supplied from the product-sum unit 275.

Accordingly, a weighted sum obtained by performing weighted addition on the block integration values using the interpolation coefficients and the luminance weight values is divided by a weighted sum obtained by performing weighted addition on the block histograms by the interpolation coefficients and the luminance weight values whereby a weighted mean of the block integration values is obtained which corresponds to the general luminance value Ll(nl)(p).

In step S187, the divider 277 outputs the obtained general luminance value Ll(nl)(p) to the tone-curve calculation unit 118 and the mapping unit 120. After the general luminance value is output, the general-luminance-value calculation processing is terminated, and thereafter, the process proceeds to step S51 of FIG. 12.

In this way, the weighted product-sum unit 117 obtains the general luminance value using the block integration values and the block histograms obtained from the luminance blocks included in the spatial blocks in the vicinity of the processing pixel.

Pixels having similar luminance values belong to the same luminance block for each spatial block, and the block integration value is obtained by integrating the luminance values of the pixels included in the luminance block. Furthermore, the block histogram represents the number of pixels included in each of the luminance blocks. Accordingly, by performing the product-sum operation on characteristic values representing characteristics of the luminance blocks, that is, the block integration values of the luminance blocks while the luminance blocks having luminance levels similar to the luminance values of the processing pixel are weighted, a result of integration of the luminance values of the pixels which are similar to the luminance value of the processing pixel is obtained.

As a result, for example, even when luminance values of pixels included in a large region, such as 16 spatial blocks in the vicinity of the processing pixel, for example, are integrated, influence from pixels of an object which is different from an object (an object displayed using the processing pixel) to which the processing pixel belongs and which have brightness different from that of the processing pixel is negligible, and accordingly, a general luminance value representing an average luminance value of the object to which the processing pixel belong can be calculated.

Next, referring to a flowchart of FIG. 20, the contrast correction processing corresponding to step S54 of FIG. 12 will be described.

In step S211, the contrast correction unit 122 reads the luminance value of the processing pixel obtained through the tone correction and the general luminance value. Specifically, the gain-value calculation unit 301 of the contrast correction unit 122 reads the luminance value Lc(nl)(p) obtained through the tone correction using the tone curve from the mapping unit 121. Furthermore, the contrast emphasizing unit 302 reads the luminance value Lc(nl)(p) from the mapping unit 121 and reads the general luminance value Lcl(nl)(p) obtained through the tone correction using the tone curve from the mapping unit 120.

In step S212, the gain-value calculation unit 301 obtains a γ-comp parameter. For example, the gain-value calculation unit 301 reads the input luminance and the output luminance at the control points P5 and P7 from the tone-curve memory 119 in order to obtain a value similar to an inclination of the tone curve CL in the vicinity of the control point P6 shown in FIG. 14. Then, the gain-value calculation unit 301 obtains an inclination of the segment AL which connects the control points P5 and P7 as the γ-comp parameter using the read input luminance and the read output luminance.

In step S213, the gain-value calculation unit 301 calculates a gain value g(p) using the read luminance value Lc(nl)(p) and the obtained γ-comp parameter. For example, the gain-value calculation unit 301 obtains the gain value g(p) by calculating equations (8) and (9) below in accordance with the luminance value Lc(nl)(p) and the γ-comp parameter.

Equation (8)

$$k(p) = \begin{cases} 1 & \text{if } Lc(nl)(p) > L\max(nl) \\ \dfrac{Lc(nl)(p) - Lmid(nl)}{L\max(nl) - Lmid(nl)} & \text{if } L\max(nl) \geq Lc(nl) \\ & (p) \geq Lmid(nl) \\ \dfrac{Lc(nl)(p) - Lmid(nl)}{L\min(nl) - Lmid(nl)} & \text{if } L\min(nl) \leq Lc(nl) \\ & (p) < Lmid(nl) \\ 1 & \text{if } Lc(nl)(p) < L\min(nl) \end{cases} \quad (8)$$

Equation (9)

$$g(p) = \left( \frac{contrastGain}{\gamma_{comp}} - 1 \right) \cdot (1 - k(p)) \quad (9)$$

Note that in equation (8), Lmin(nl) and Lmax(nl) denote the minimum value and the maximum value in a possible range of the luminance value Lc(nl)(p), respectively, and Lmid(nl) denotes an middle luminance level Lmid(nl) shown in FIG. 14. Furthermore, in equation (9), contrastGain denotes a predetermined constant.

After obtaining the gain value g(p), the gain-value calculation unit 301 supplies the obtained gain value g(p) to the contrast emphasizing unit 302.

Figure 21:
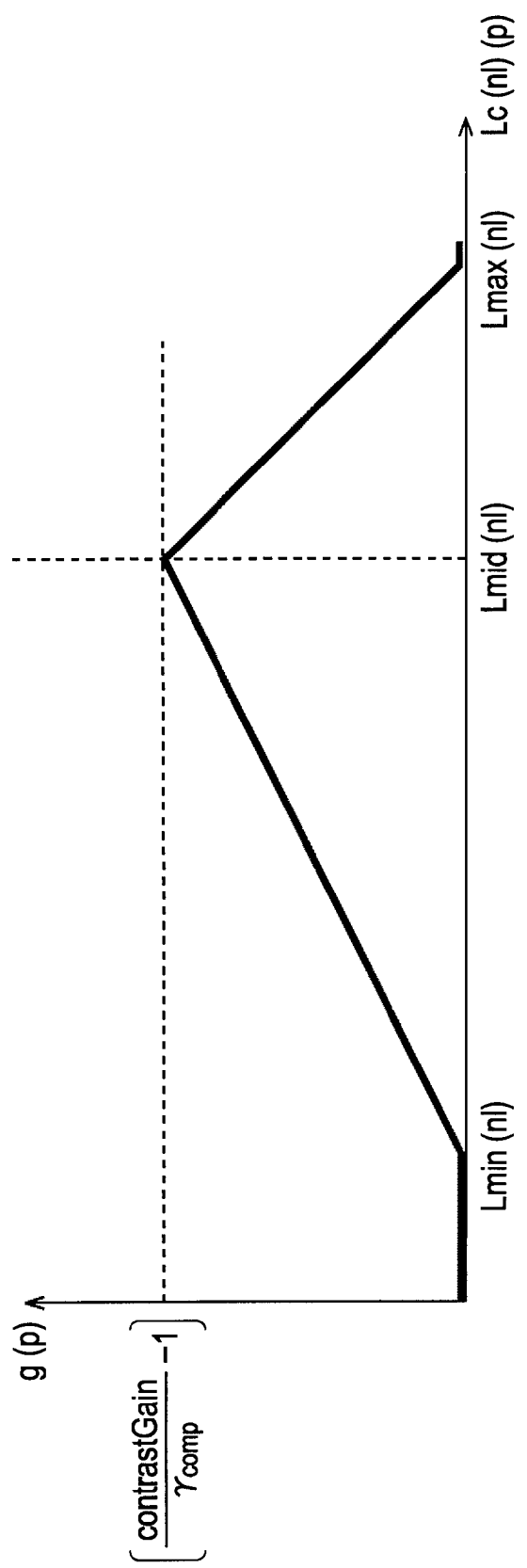
FIG. 21 is a diagram illustrating a gain value.

Here, FIG. 21 shows a graph illustrating the relationship between the luminance value Lc(nl)(p) and the gain value g(p). That is, in the figure, the axis of ordinate represents the gain value g(p) and the axis of abscissa represents the luminance value Lc(nl)(p).

In FIG. 21, when the luminance value Lc(nl)(p) corresponds to the middle luminance level Lmid(nl), the maximum gain value g(p) is obtained, and the value corresponds to a value ((contrastGain/γ-comp)-1) which is determined by the predetermined constant contrastGain and the γ-comp parameter. Furthermore, as the luminance value Lc(nl)(p) becomes close from the middle luminance level Lmid(nl) to the minimum value Lmin(nl) or the maximum value Lmax(nl), the gain value g(p) is linearly reduced.

Furthermore, in a range in which the luminance value Lc(nl)(p) is smaller than the minimum value Lmin(nl) and a range in which the luminance value Lc(nl)(p) is larger than the maximum value Lmax(nl), the gain value g(p) is 0. Therefore, contrast of luminance components in the vicinity of the middle luminance level is emphasized when compared with contrast of luminance components in the vicinity of the minimum value Lmin(nl) or the maximum value Lmax(nl). More precisely, as the luminance components are located nearer to the middle luminance level Lmid(nl), the contrast thereof is emphasized, and the contrast of the luminance components in the vicinity of the minimum value Lmin(nl) or the maximum value Lmax(nl) is barely emphasized.

The image (image having the luminance values Lc(nl)(p)) in which tone of the luminance values thereof are corrected (compressed) using the tone curve has suppressed (compressed) contrast when compared with an original image (image having the luminance values L(nl)(p)). Furthermore, a degree of suppressing of the contrast depends on the inclination of the tone curve, and as the inclination of the tone curve is moderate, the degree of suppressing is large. Therefore, when a correction is made in order to emphasize the contrast of the image in which the tone thereof has been compressed in accordance with an inverse number relative to the inclination of the tone curve, contrast similar to the contrast of the original image in which the tone thereof has not been compressed can be obtained. However, in a case where a similar correction is performed on pixels having the luminance values Lc(nl)(p) in the vicinity of noiseLevel(nl) or saturation Level(nl), clipping which is a phenomenon in which the luminance values obtained after the correction become smaller than noiseLevel(nl) or larger than saturationLevel(nl) occurs, and therefore, detail of the image may be conversely lost.

Therefore, the gain-value calculation unit 301 calculates the γ-comp parameter which represents the inclination of the tone curve in the vicinity of the middle luminance level Lmid (nl), and determines the gain value g(p) such that as the luminance values Lc(nl)(p) become closer to noiseLevel(nl) (the minimum value Lmin(nl)) or saturation level (nl) (the maximum value Lmax(nl)), the gain value g(p) attenuates from a reference value.

Figure 20:
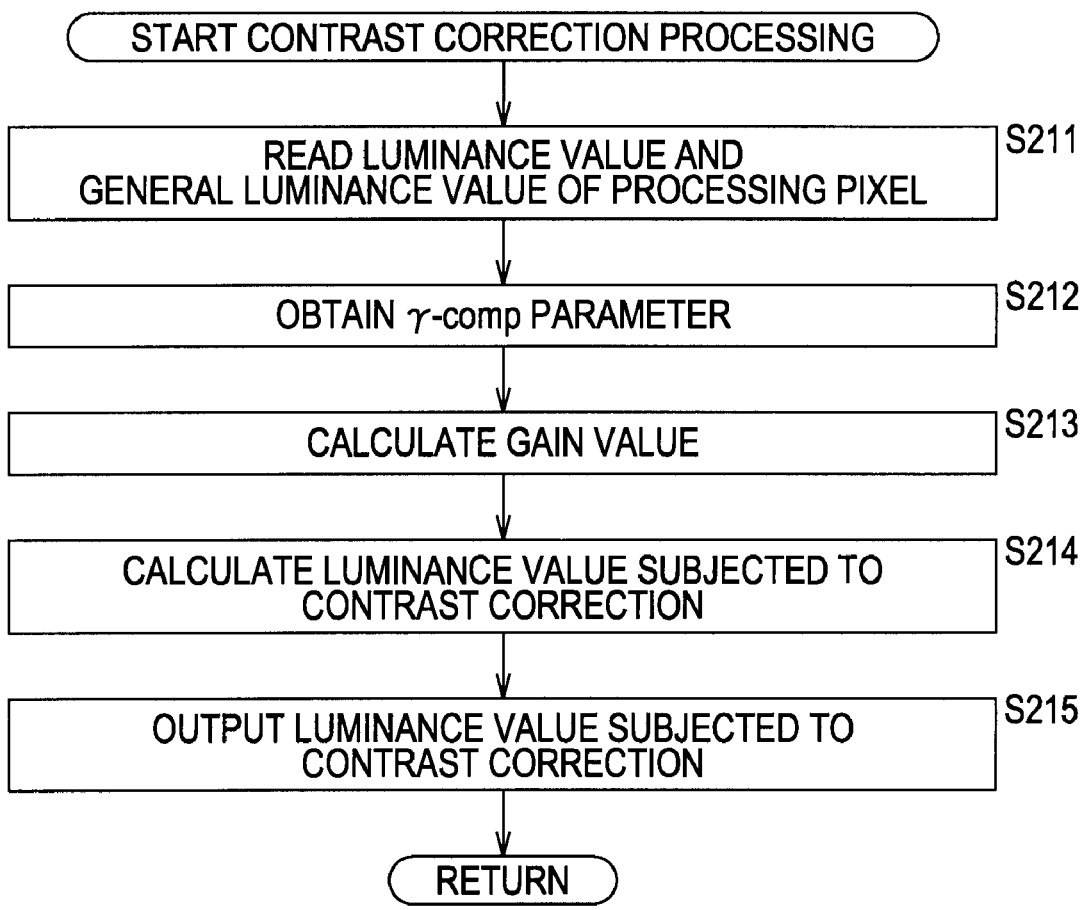
FIG. 20 is a flowchart illustrating contrast correction processing.

Referring back to the flowchart of FIG. 20, in step S214, the contrast emphasizing unit 302 calculates a luminance value Lu(nl)(p) obtained trough the contrast correction using the read luminance value Lc(nl)(p), the general luminance value Lcl(nl)(p), and the gain value g(p) which has been supplied from the gain-value calculation unit 301.

For example, the contrast emphasizing unit 302 obtains a contrast component value of a luminance value having the luminance value Lc(nl)(p) by calculating a difference between the luminance value Lc(nl)(p) obtained through the tone correction using the tone curve and the general luminance value Lcl(nl)(p). Furthermore, the contrast emphasizing unit 302 adds a value obtained by amplifying a contrast component value by the gain value g(p) to the luminance value Lc(nl)(p) obtained through the tone correction so as to perform contrast correction on the luminance value Lc(nl)(p). By this, the luminance value Lu(nl)(p) after the contrast correction is obtained.

More specifically, the contrast emphasizing unit 302 calculates the luminance value Lu(nl)(p) obtained through the contrast correction by performing equation (10) below using the luminance value Lc(nl)(p), the general luminance value Lcl(nl)(p), and the gain value g(p).

Equation (10)

$$Lu(nl)(p) = (g(p) + 1) \cdot (Lc(nl)(p) - Lcl(nl)(p)) + Lcl(nl)(p)$$
$$= g(p) \cdot (Lc(nl)(p) - Lcl(nl)(p)) + Lc(nl)(p)$$

Note that in equation (10), the luminance image (contrast component value) having a luminance value (Lc(nl)(p)−Lc1(nl)(p)) is obtained by subtracting a general luminance image constituted by low-frequency components of the luminance image having the luminance value Lc(nl)(p) from the luminance image having the luminance value Lc(nl)(p). Therefore, the luminance image having the luminance value Lu(nl)(p) is an image in which frequency components, except for a low frequency region, of the luminance image having the luminance value Lc(nl)(p) is emphasized by the gain value g(p).

In step S215, the contrast emphasizing unit 302 outputs the luminance value Lu(nl)(p) obtained through the contrast correction to the tone correction units 85 shown in FIG. 4. The contrast correction processing is terminated, and the process proceeds to step S55 of FIG. 13.

In this way, the contrast correction unit 122 emphasizes contrast of components from a low-to-mid frequency range to a high-frequency range except for a low-frequency range of the luminance image having the luminance value Lc(nl)(p). Accordingly, local overshoot which is to be locally generated at edge portions when only contrast of the components of the high-frequency range is emphasized is not generated, and image in which the contrast thereof is naturally emphasized can be obtained.

Furthermore, since the correction is performed such that, as luminance components have luminance levels nearer to the middle luminance level Lmid(nl), contrast thereof is emphasized, and luminance components in the vicinity of the minimum value Lmin(nl) or the maximum value Lmax(nl) are barely subjected to the contrast correction, and therefore, generation of overexposed portions and underexposed portions of an image is negligible.

As described above, the tone correction processor 53 obtains the luminance blocks by dividing, in the luminance direction, the spatial blocks obtained by dividing the luminance image in the spatial direction, and obtains, for each luminance block, frequency values of pixels included in a luminance block of interest and a characteristic value representing a characteristic of the luminance block. Then, using the frequency values and characteristic values, the characteristic values of individual luminance blocks are subjected to weighted average in accordance with weight (interpolation coefficients and luminance weight values) defined by a distance between the processing pixels and the luminance blocks in the spatial direction and the luminance direction whereby the edge preserving smoothing is realized.

These characteristic values correspond to the block integration values of individual luminance blocks, for example, and a calculation of the weighted average (weighted addition) of the block integration values is represented by equation (11) below.

Equation (11)

$$I(p)' = \frac{\sum_{i,j,\lambda} \omega(i, j, p) \cdot \phi(\lambda, I(p)) \cdot S(i, j, \lambda)}{\sum_{i,j,\lambda} \omega(i, j, p) \cdot \phi(\lambda, I(p)) \cdot H(i, j, \lambda)} \quad (11)$$

In equation (11), I(p) represents a pixel value of a processing pixel at a pixel position p, and I(p)' represents a pixel value of a processing pixel which has been subjected to the edge preserving smoothing processing. Furthermore, $S(i, j, \lambda)$ and $H(i, j, \lambda)$ denote a block integration value and a block histogram. Moreover, $\omega(i, j, p)$ represents a function defined by a relative position between the position p of the processing pixel and a spatial block $BK_{i,j}$, and $\phi(\lambda, I(p))$ denotes a luminance weight value defined by a center value $\lambda$ and the pixel value I(p).

The calculation of equation (11) is configured such that a weight function $\omega$ in the spatial direction and a weight function $\phi$ in the luminance direction of the bilateral filter are discretized along division of blocks (the spatial blocks or the luminance blocks) in a step shape, and therefore, effect of the edge preserving smoothing is attained.

Furthermore, even if cost required for calculating the block histograms and the block integration values is taken into consideration, an amount of operation of the weighted product-sum for luminance blocks is smaller than that for each pixel. Therefore, the edge preserving smoothing processing is performed with less operation amount. Furthermore, as a result, memory consumption in the edge preserving smoothing processing can be reduced. The larger an operator size of the edge preserving smoothing is, the larger this effect is.

Note that the operator size herein represents a size of a region in the luminance image which includes the spatial blocks to be processed in the vicinity of the processing pixels in the interpolation processing performed by the interpolation units 271 and 272, for example.

Furthermore, if the luminance value of the input luminance image is processed by the edge preserving smoothing processing in which a large region is integrally processed by the luminance-tone correction unit 83, a luminance value similar to a luminance value obtained by averaging for each object region is obtained. This luminance value is determined as the general luminance value Ll(nl)(p), that is, a value representing information on general brightness of each of the pixels, and a shape of a tone curve of each of the pixels is determined by the tone-curve calculation unit 118 so that the value is changed to a mean (middle) luminance value. By correcting the luminance of the pixel positions using tone curves determined for individual pixel positions, tone correction performed for attaining appropriate brightness in all regions in the image is realized.

Furthermore, by subtracting the general luminance value Lc1(nl)(p) obtained by compressing the tone from the luminance values Lc(nl)(p) of the processing pixels in which tones thereof are compressed, contrast components of the individual pixel positions can be extracted. Then, the contrast components can be corrected using the gain values g(p) serving as interpolation coefficients in accordance with a degree of contrast deterioration which can be obtained using a tone-curve shape.

Next, another embodiment which is different from the embodiment of the present invention described above will be described.

Figure 22:
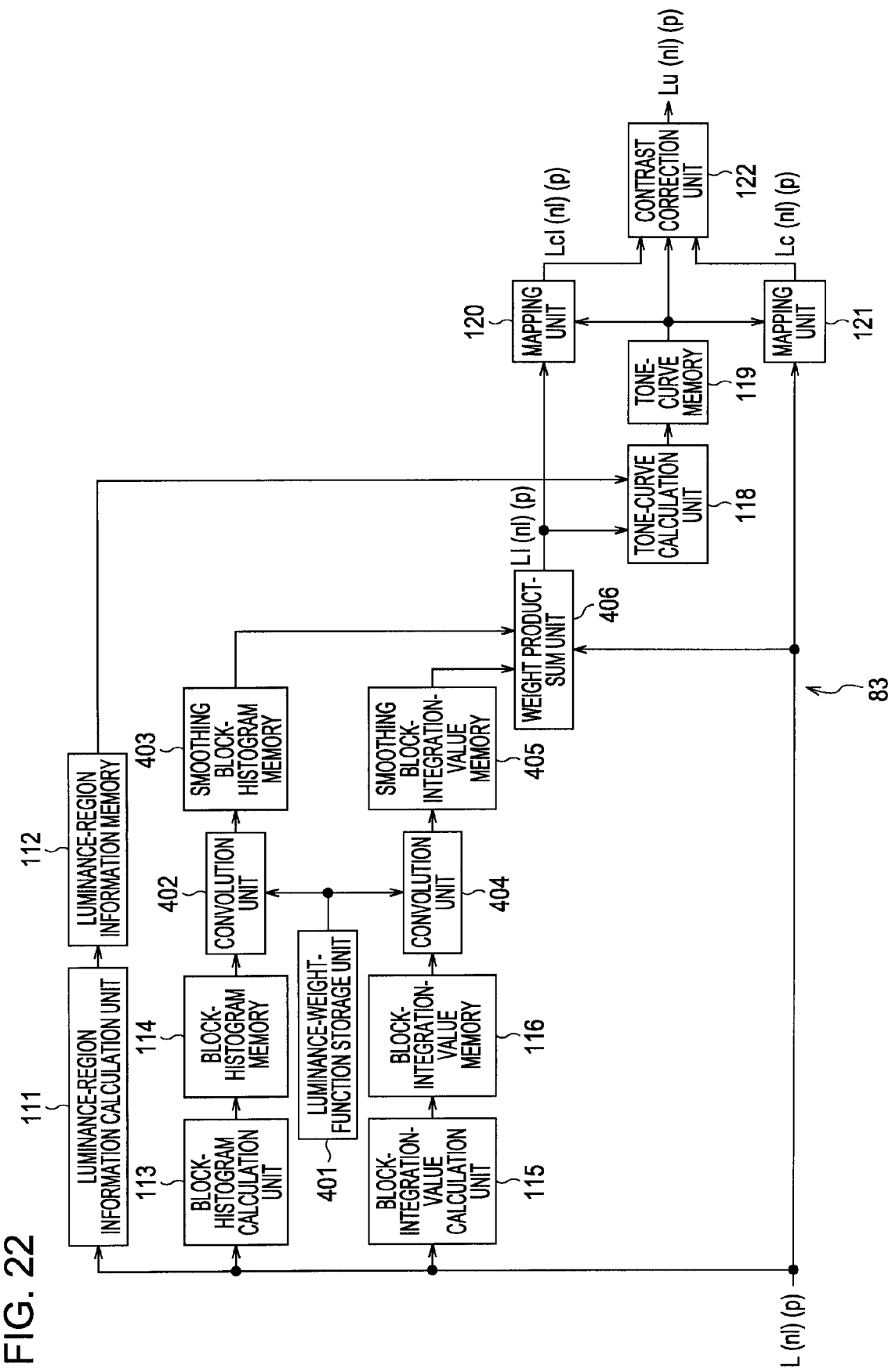
FIG. 22 is a diagram illustrating an example of another configuration of the luminance-tone correction unit.

FIG. 22 is a diagram illustrating an example of another configuration of the luminance-tone correction unit 83. Note that, in FIG. 22, components corresponding to those of FIG. 5 are denoted by reference numerals the same as those shown in FIG. 5, and descriptions thereof are omitted where appropriate.

The luminance-tone correction unit 83 shown in FIG. 22 includes a convolution-function storage unit 401, a convolution unit 402, a smoothing block-histogram memory 403, a convolution unit 404, a smoothing block-integration-value memory 405, and a weighted product-sum unit 406 in addition to the components of the luminance-tone correction unit 83 shown in FIG. 5. Note that the luminance-tone correction unit 83 of FIG. 22 does not include the weighted product-sum unit 117 but includes the weighted product-sum unit 406 instead of the weighted product-sum unit 117.

The convolution-function storage unit 401 stores a luminance-weight-function look-up table, and the luminance-weight-function look-up table is the same as that stored in the luminance-weight-function storage unit 276 shown in FIG. 9, for example.

The convolution unit 402 performs operation for convolving the luminance-weight function of the luminance-weight-function look-up table stored in the convolution-function storage unit 401 to block histograms recorded in the block-histogram memory 114 so as to obtain smoothing block histograms. Since the smoothing block histograms are obtained by convolving the luminance-weight function, the block histograms have been subjected to smoothing processing in a luminance direction. The convolution unit 402 supplies the calculated smoothing block histograms to the smoothing block-histogram memory 403. The smoothing block-histogram memory 403 temporarily stores the smoothing block histograms.

The convolution unit 404 performs operation for convolving the luminance-weight function of the luminance-weight-function look-up table stored in the convolution-function storage unit 401 to block integration values stored in the block-integration-value memory 116 so as to obtain smoothing block integration values. Since the smoothing block integration values are obtained by convolving the luminance-weight function, the block integration values have been subjected to smoothing processing in a luminance direction. The convolution unit 404 supplies the calculated smoothing block integration values to the smoothing block-integration-value memory 405. The smoothing block-integration-value memory 405 temporarily stores the smoothing block integration values.

Note that, in the luminance-tone correction unit 83 shown in FIG. 22, luminance-region information, the smoothing block histograms, and the smoothing block integration values serve as intermediate data. Therefore, the luminance-region information, the smoothing block histograms, and the smoothing block integration values are stored in the luminance-region-information memory 112, the smoothing block-histogram memory 403, and the smoothing block-integration-value memory 405, respectively, for a period of time corresponding to one frame of a luminance image (RGB image).

The weighted product-sum unit 406 calculates general luminance values Ll(nl)(p) using the smoothing block histograms supplied from the smoothing block-histogram memory 403 and the smoothing block integration values supplied from the smoothing block-integration-value memory 405. The weighted product-sum unit 406 supplies the calculated general luminance values Ll(nl)(p) to the tone-curve calculation unit 118 and the mapping unit 120.

According to the configuration of the luminance-tone correction unit 83 shown in FIG. 22, by involving a portion of operation for calculating the general luminance values for individual pixel positions of the processing pixels into processing for calculating information on an entire frame of the luminance image, an operation amount for each pixel can be reduced.

Figure 23:
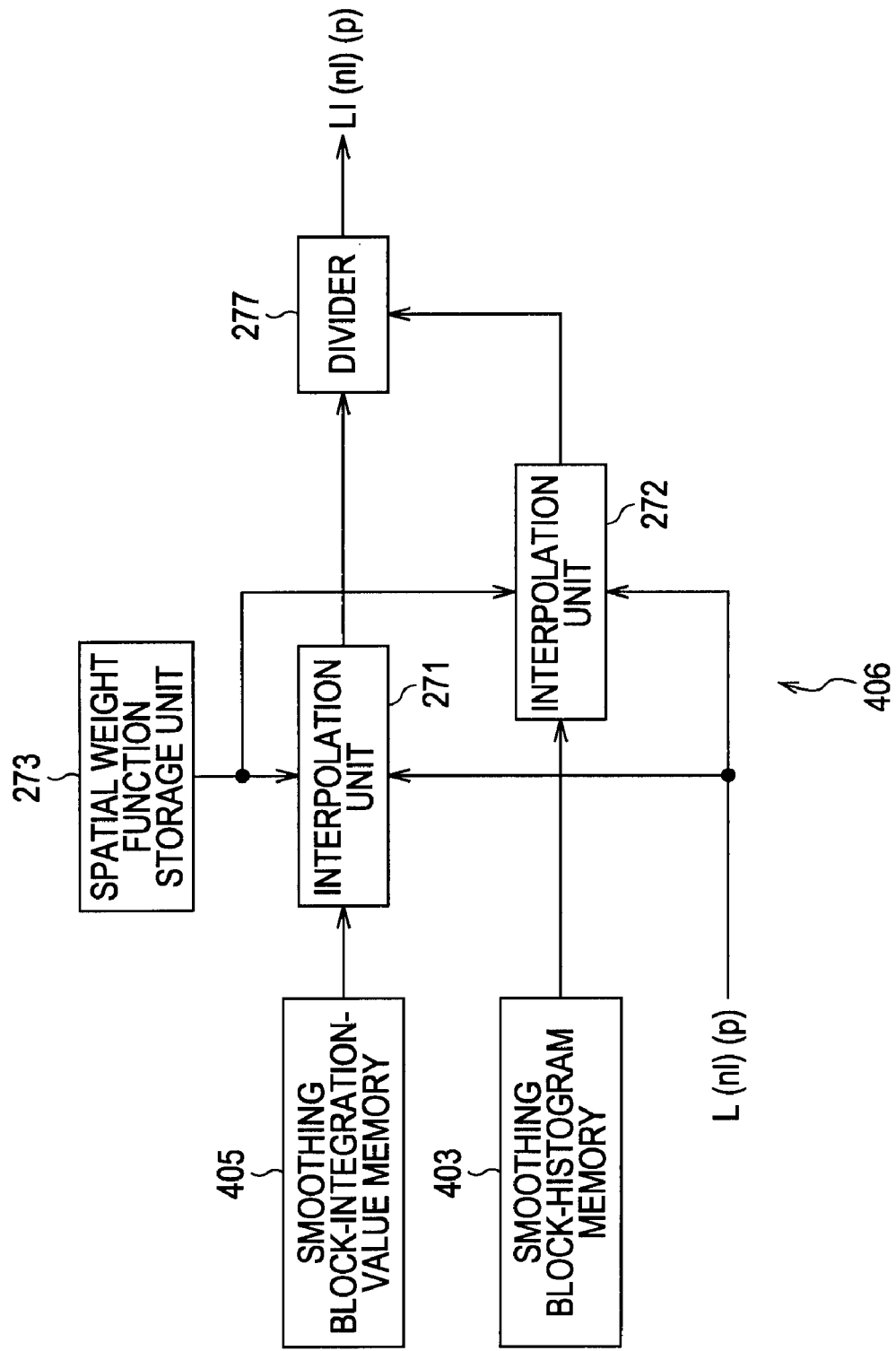
FIG. 23 is a diagram illustrating an example of another configuration of the weighted product-sum unit.

FIG. 23 is a diagram illustrating an example of a configuration of the weighted product-sum unit 406 shown in FIG. 22. Note that, in FIG. 23, components corresponding to those of FIG. 9 are denoted by reference numerals the same as those shown in FIG. 9, and descriptions thereof are omitted where appropriate.

In FIG. 23, the weighted product-sum unit 406 includes interpolation units 271 and 272, a spatial-weight-function storage unit 273, and a divider 277. That is, the weighted product-sum unit 406 shown in FIG. 23 is different from the weighted product-sum unit 117 shown in FIG. 9 in that the weighted product-sum unit 406 does not include the product-sum unit 274 to the luminance-weight-function storage unit 276.

The interpolation unit 271 obtains luminance integration values for positions of processing pixels having luminance values L(nl)(p) supplied from the nonlinear conversion unit 82 in the luminance image using interpolation coefficients read from the spatial-weight-function storage unit 273 and the smoothing block integration values recorded in the smoothing block-integration-value memory 405, and supplies the luminance integration values to the divider 277.

The interpolation unit 272 obtains luminance histograms for the positions of the processing pixels, in the luminance image, having the luminance values L(nl)(p) supplied from the nonlinear conversion unit 82 using the interpolation coefficients read from the spatial-weight-function storage unit 273 and the smoothing block histograms recorded in the smoothing block-histogram memory 403, and supplies the luminance integration values to the divider 277.

The divider 277 divides the luminance integration values supplied from the interpolation unit 271 by the luminance histograms supplied from the interpolation unit 272 so as to obtain the general luminance values Ll(nl)(p) of the processing pixels, and supplies the general luminance values Ll(nl)(p) to the tone-curve calculation unit 118 and the mapping unit 120.

Figure 24:
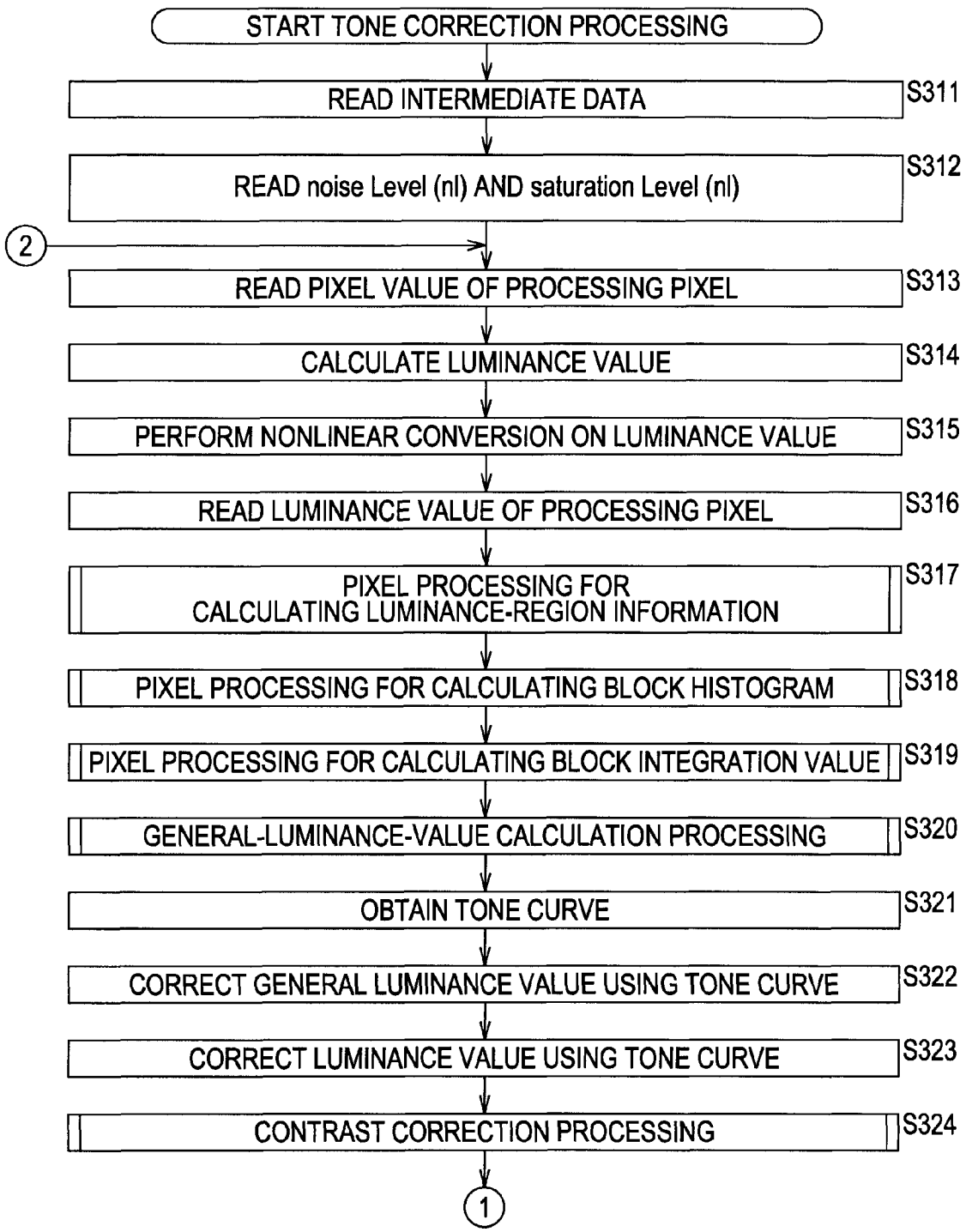
FIG. 24 is a flowchart illustrating tone correction processing.
Figure 25:
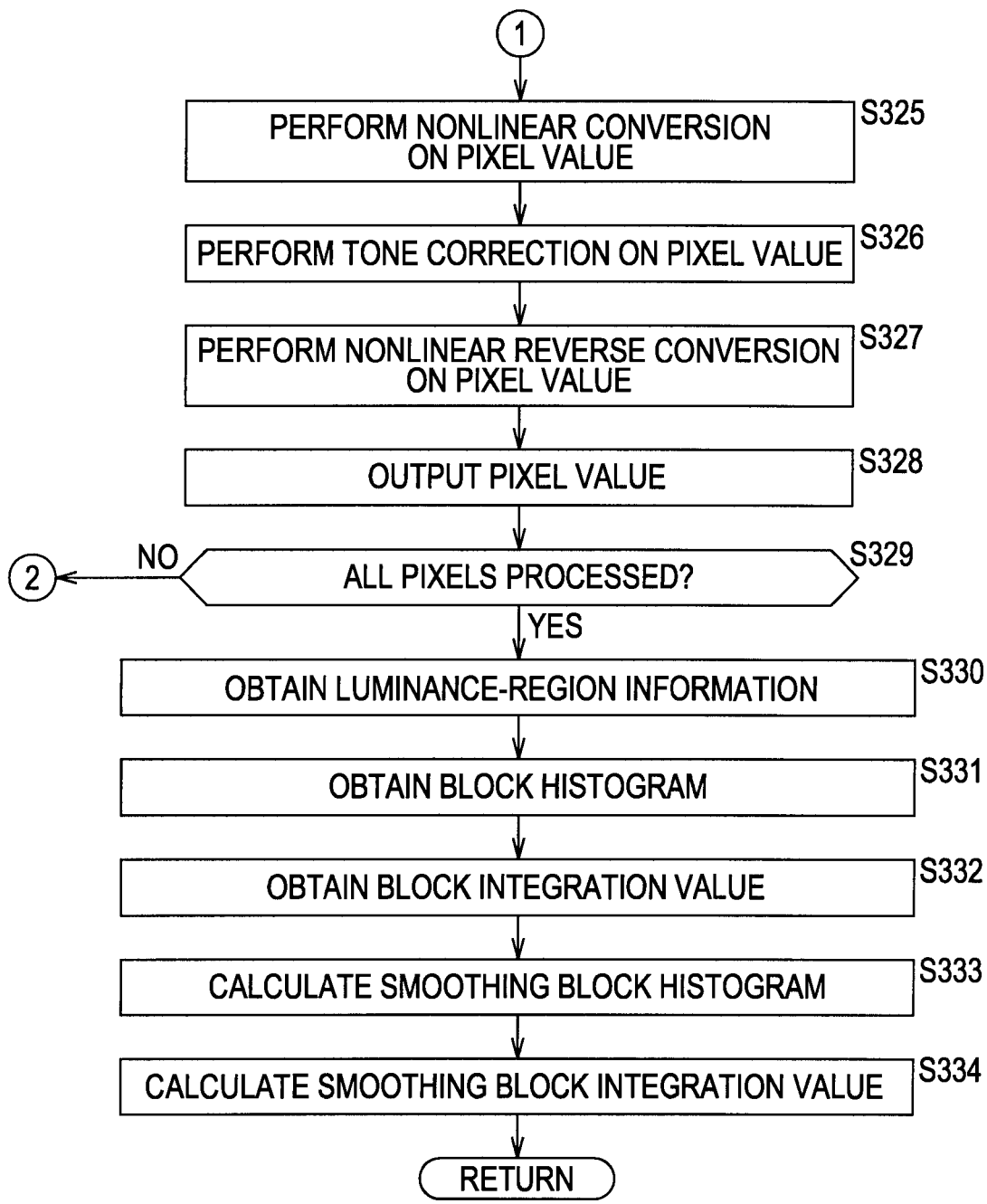
FIG. 25 is a flowchart illustrating the tone correction processing.

Next, referring to flowcharts of FIGS. 24 and 25, tone correction processing in a case where the luminance-tone correction unit 83 is configured as shown in FIG. 22 will be described. Note that this tone correction processing corresponds to the operation of step S14 of FIG. 11.

In step S311, the weighted product-sum unit 406 and the tone-curve calculation unit 118 read intermediate data. Specifically, the interpolation unit 271 of the weighted product-sum unit 406 reads smoothing block integration values serving as the intermediate data from the smoothing block-integration-value memory 405, and the interpolation unit 272 of the weighted product-sum unit 406 reads smoothing block histograms serving as the intermediate data from the smoothing block-histogram memory 403. Furthermore, the tone-curve calculation unit 118 reads luminance-region information serving as the intermediate data from the luminance-region-information memory 112.

Thereafter, operations in step S312 to step S319 are performed. These operations are the same as those in step S42 to step S49, and therefore, descriptions thereof are omitted.

In step S320, the weighted product-sum unit 406 calculates a general luminance value Ll(nl)(p) of a processing pixel through general-luminance-value calculation processing, and supplies the general luminance values Ll(nl)(p) to the tone-curve calculation unit 118 and the mapping unit 120. Note that although the general-luminance-value calculation processing will be described in detail hereinafter, the smoothing block histograms and the smoothing block integration values are used for calculating the general luminance values Ll(nl)(p).

After the general luminance value Ll(nl)(p) is obtained, operations in step S321 to step S332 are performed. However, these operations are the same as those in step S51 to step S62 shown in FIGS. 12 and 13, and therefore, descriptions thereof are omitted.

In step S333, the convolution unit 402 calculates the smoothing block histograms, and supplies the smoothing block histograms to the smoothing block-histogram memory 403 so that the smoothing block-histogram memory 403 stores the smoothing block histograms.

Specifically, the convolution unit 402 obtains block histograms $H(i, j, \lambda)$ from the block-histogram memory 114, and reads a luminance weight function $\phi(\lambda, v)$ from the luminance-weight-function look-up table stored in the convolution-function storage unit 401. Here, variables $\lambda$ and $v$ included in the luminance weight function $\phi(\lambda, v)$ denote center values of luminance blocks and luminance values corresponding to the center values of the luminance blocks, respectively.

Then, the convolution unit 402 calculates smoothing block histograms Hconvolved $(i, j, v)$ for individual luminance blocks $LBK_{i,j,v}$ by calculating equation (12) using block histograms $H(i, j, \lambda)$ of D luminance blocks obtained by dividing the spatial blocks $BK_{i,j}$ and the luminance weight functions $\phi(\lambda, v)$.

Equation (12)

$$Hconvolved(i, j, v) = \sum_{\lambda} H(i, j, \lambda) \cdot \phi(\lambda, v) \quad (12)$$

In equation (12), a sum of the D block histograms $H(i, j, \lambda)$ of the D luminance blocks which are multiplied by the luminance weight functions $(\lambda, v)$ corresponds to a smoothing block histogram Hconvolved $(i, j, v)$.

Here, the luminance blocks $LBK_{i,j,v}$ correspond to luminance blocks $LBK_{i,j,h}$. The luminance values v are center values of the luminance blocks $LBK_{i,j,v}$ of the smoothing block histograms. Specifically, the smoothing block histograms are obtained for a predetermined number of luminance blocks $LBK_{i,j,v}$ obtained by dividing spatial blocks in the luminance direction. Furthermore, the luminance weight function $\phi(\lambda, v)$ has variables such as the center values $\lambda$ and the luminance values v, and is the same as the luminance weight function described with reference to FIG. 19, for example.

The smoothing bloc histograms Hconvolved(i,j, v) of individual luminance blocks $LBK_{i,j,v}$ thus obtained are supplied to the smoothing block-histogram memory 403 to be stored.

In step S334, the convolution unit 404 calculates the smoothing block integration values, and supplies the smoothing block integration values to the smoothing block-integration-value memory 405 to be stored.

Specifically, the convolution unit 404 obtains the block integration values $S(i, j, \lambda)$ from the block-integration-value memory 116 and reads the luminance weight functions $\phi(\lambda, v)$ from the luminance-weight-function look-up table stored in the convolution-function storage unit 401.

Then, the convolution unit 404 operates equation (13) below, for each spatial block $BK_{i,j}$, using the block integration values $S(i, j, \lambda)$ of the D luminance blocks obtained by dividing each of the spatial blocks $BK_{i,j}$ and the luminance weight functions $\phi(\lambda, v)$, and calculates the smoothing block integration values Sconvolved $(i, j, v)$ for individual luminance blocks $LBK_{i,j,v}$.

Equation (13)

$$Sconvolved(i, j, v) = \sum_{\lambda} S(i, j, \lambda) \cdot \phi(\lambda, v) \quad (13)$$

That is, in equation (13), a sum of the block integration values $S(i, j, \lambda)$ of the D luminance blocks multiplied by the luminance weight values $\phi(\lambda, v)$ is determined as each of the smoothing block integration value Sconvolved $(i, j, v)$.

The smoothing block integration values Sconvolved $(i, j, v)$ thus obtained for individual luminance blocks $LBK_{i,j,v}$ are supplied to the smoothing block-integration-value memory 405 to be recorded.

Then, the tone correction processing is terminated, the process proceeds to step S15 of FIG. 11.

As described above, in the tone correction processing, the intermediate data is obtained in accordance with the luminance image for one frame. Then, the luminance-region information, the smoothing block histograms, and the smoothing block integration values serving as the intermediate data are stored in the luminance-region-information memory 112, the smoothing block-histogram memory 403, and the smoothing block-integration-value memory 405, respectively. Since the luminance-tone correction unit 83 calculates the general luminance values and the tone curve of the processing pixels using intermediate data obtained from a temporally succeeding frame relative to a frame being processed (the edge preserving smoothing processing is performed), even if an image to be processed is a moving image, the edge preserving smoothing processing with a large operator size can be performed using a small working memory without scanning all pixels included in the image twice.

Figure 26:
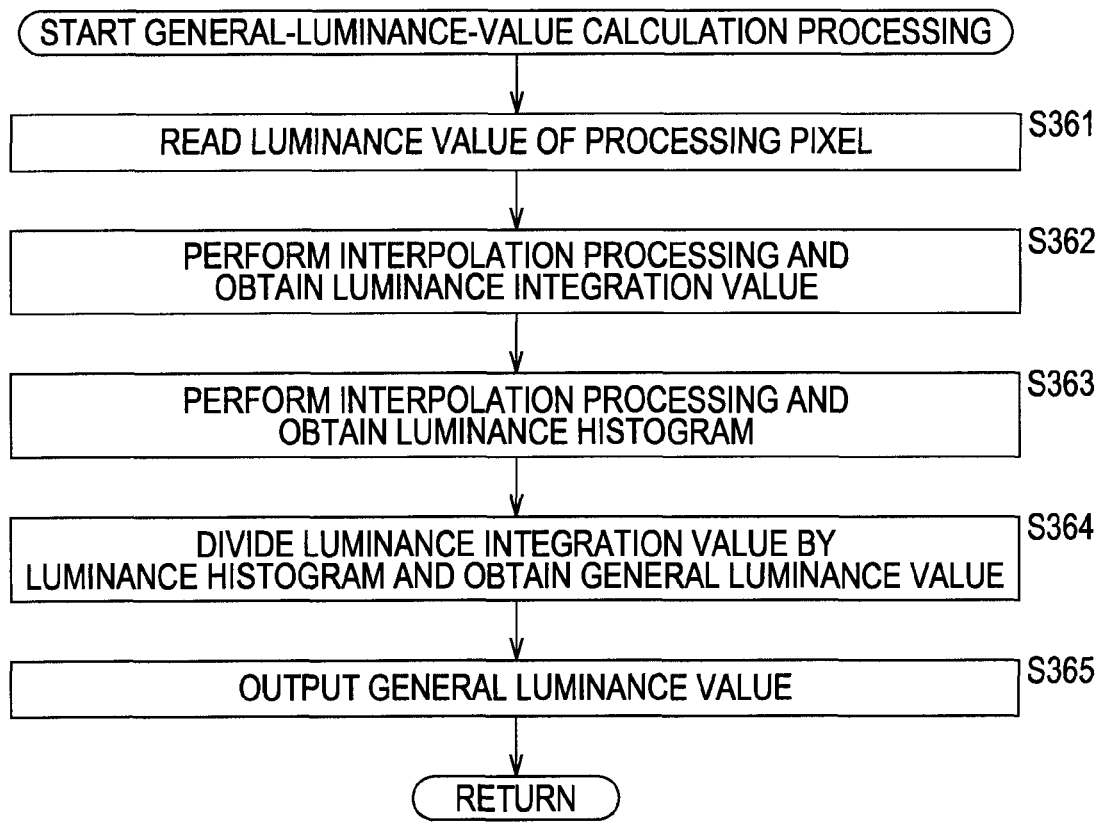
FIG. 26 is a flowchart illustrating general-luminance-value calculation processing.

Next, referring to a flowchart of FIG. 26, the general-luminance-value calculation processing corresponding to the operation in step S320 of FIG. 24 will be described.

In step S361, the interpolation units 271 and 272 of the weighted product-sum unit 406 read the luminance values L(nl)(p) of the processing pixels from the nonlinear conversion unit 82.

In step S362, the interpolation unit 271 performs interpolation processing using the smoothing block integration values of the luminance blocks obtained from the spatial blocks in the vicinity of the processing pixels so as to obtain luminance integration values of the processing pixels.

It is assumed that the interpolation unit 271 reads interpolation coefficients $B_{i,j}$ of 16 (4×4) spatial blocks (where $1 \leq i \leq 4, 1 \leq j \leq 4$) in the vicinity of a processing pixel in the spatial direction from the look-up table stored in the spatial-weight-function storage unit 273. Then, the interpolation unit 271 reads smoothing block integration values Sconvolved(i, j, v) of individual luminance blocks obtained from each of the 16 spatial blocks $BK_{i,j}$ from the smoothing block-integration-value memory 405.

Furthermore, the interpolation unit 271 determines a sum of products of the interpolation coefficients $B_{i,j}$ and the corresponding smoothing block integration values Sconvolved(i, j, v), that is, the interpolation unit 271 performs weighted product-sum on the smoothing block integration values, and resultant values are determined as luminance integration values. Furthermore, when the luminance integration values are calculated, the interpolation unit 271 assigns the read luminance values L(nl)(p) to the variable v of the smoothing block integration values Sconvolved(i, j, v) for calculation.

Note that, more specifically, for each spatial block, the interpolation unit 271 obtains the smoothing block integration values Sconvolved(i, j, L(nl)(p)) corresponding to the luminance values L(nl)(p) of the processing pixels through interpolation, for example, from the smoothing block integration values Sconvolved(i, j, v) of the luminance blocks obtained from each of the spatial blocks. Then, the smoothing block integration values Sconvolved(i, j, L(nl)(p)) are multiplied by the interpolation coefficients $B_{i,j}$ whereby luminance integration values are obtained.

After obtaining the luminance integration values, the interpolation unit 271 supplies the obtained luminance integration values to the divider 277. The luminance integration values correspond to block integration values obtained by performing interpolation on luminance values of the processing pixel at a position of the processing pixel.

In step S363, the interpolation unit 272 obtains luminance histograms of the processing pixel through interpolation processing using the smoothing block histograms of the luminance blocks obtained from the spatial blocks in the vicinity of the processing pixel having the read luminance values L(nl)(p).

It is assumed that the interpolation unit 272 reads interpolation coefficients $B_{i,j}$ of 16 (4×4) spatial blocks (where $1 \leq i \leq 4, 1 \leq j \leq 4$) in the vicinity of the processing pixel in the spatial direction from the look-up table stored in the spatial-weight-function storage unit 273. Then, the interpolation unit 272 reads smoothing block histograms Hconvolved(i, j, v) of individual luminance blocks obtained from each of the 16 spatial blocks $BK_{i,j}$ from the smoothing block-histogram memory 403.

Furthermore, the interpolation unit 272 determines a sum of products of the interpolation coefficients $B_{i,j}$ and the corresponding smoothing block histograms Hconvolved(i, j, v), that is, the interpolation unit 271 performs weighted product-sum on the smoothing block histograms, and resultant values are determined as luminance histograms. Furthermore, when the luminance histograms are calculated, the interpolation unit 272 assigns the read luminance values L(nl)(p) to the variable v of the smoothing block histograms Hconvolved(i, j, v) for calculation.

Note that, more specifically, for each spatial block, the interpolation unit 272 obtains the smoothing block histograms Hconvolved(i, j, L(nl)(p)) corresponding to the luminance values L(nl)(p) of the processing pixel through the interpolation from the smoothing block histograms Hconvolved(i, j, v) of the luminance blocks obtained from each of the spatial blocks. Then, the smoothing block histograms Hconvolved(i, j, L(nl)(p)) are multiplied by the interpolation coefficients $B_{i,j}$ whereby luminance histograms are obtained.

After obtaining the luminance histograms, the interpolation unit 272 supplies the obtained luminance histograms to the divider 277. The luminance histograms correspond to block histograms obtained by performing interpolation on luminance values of the processing pixels at the position of the processing pixel.

In step S364, the divider 277 divides the luminance integration values supplied from the interpolation unit 271 by the corresponding luminance histograms supplied from the interpolation unit 272 so as to obtain general luminance values Ll(nl)(p). That is, the divider 277 calculates the general luminance values Ll(nl)(p) by calculating equation (14) below.

Equation (14)

$$Ll(nl)(p) = \frac{\sum_{i,j} B_{i,j} \cdot Sconvolved(i, j, L(nl)(p))}{\sum_{i,j} B_{i,j} \cdot Hconvolved(i, j, L(nl)(p))} \quad (14)$$

In equation (14), $\Sigma B_{i,j} \cdot Sconvolved(i, j, L(nl)(p))$ denotes the luminance integration values supplied from the interpolation unit 271, and $\Sigma B_{i,j} \cdot Hconvolved(i, j, L(nl)(p))$ denotes luminance histograms supplied from the interpolation unit 272. Specifically, a luminance integration value is a sum of the smoothing block integration value $B_{i,j} \times Sconvolved(i, j, L(nl)(p))$ multiplied by the interpolation coefficient, and a luminance histogram is a sum of the smoothing block histogram $B_{i,j} \times Hconvolved(i, j, L(nl)(p))$ multiplied by the interpolation coefficient.

Specifically, a weighted sum obtained by performing weighted addition on the block integration value obtained by convolving the luminance weight function by the interpolation coefficient is divided by a weighted sum obtained by performing weighted addition on the block histogram obtained by convolving the luminance weight function by the interpolation coefficient whereby a value of weighted means of the block integration value is obtained which corresponds to the general luminance value Ll(nl)(p).

In step S365, the divider 277 outputs obtained general luminance values Ll(nl)(p) to the tone-curve calculation unit 118 and the mapping unit 120, and the general-luminance-value calculation processing is terminated. The process proceeds to step S321 of FIG. 24.

As described above, the weighted product-sum unit 406 obtains the general luminance values using the smoothing block integration values and the smoothing block histograms of the spatial blocks in the vicinity of the processing pixel.

The luminance-tone correction unit 83 of FIG. 22 performs operation for convolving the weight functions (luminance weight functions) in the luminance direction to the block histograms and the block integration values and stores results of the operation. Therefore, in the weighted product-sum operation performed for each pixel, the results obtained by performing interpolation on the block histograms and the block integration values into which the luminance weight functions are convolved in the spatial direction are merely divided, and the edge preserving smoothing processing can be performed with less operations. This operation is represented by equation (15) below.

Equation (15)

$$I(p)' = \frac{\sum_{i,j,\lambda} \omega(i, j, p) \cdot Sconvolved(i, j, I(p))}{\sum_{i,j,\lambda} \omega(i, j, p) \cdot Hconvolved(i, j, I(p))} \quad (15)$$

In equation (15), I(p) denotes a pixel value of a processing pixel at a pixel position p, and I(p)' denotes a pixel value of the processing pixel subjected to the edge preserving smoothing processing. Furthermore, ω(i, j, p) denotes a function determined by a relative position between the position p of the processing pixel and the spatial block $BK_{i,j}$. Similarly to equation (11), equation (15) attains effect of the edge preserving smoothing. As the edge preserving smoothing processing is performed while an image is divided into a number of spatial blocks smaller than those of an original image, that is, as the edge preserving smoothing processing is performed on a larger region of the image, the edge preserving smoothing processing can be performed with less operations.

Furthermore, the luminance-tone correction unit 83 may generate a size-reduced image which is a luminance image in which a size thereof is reduced. Since the intermediate data used in the tone correction processing is obtained by extracting a general luminance distribution and a configuration of the entire luminance image, even if the intermediate data is calculated from the luminance image in which the size thereof has been reduced in advance, the information is not deteriorated. Accordingly, by generating the intermediate data from the size-reduced image, an amount of operation for generating the intermediate data can be reduced.

Figure 27:
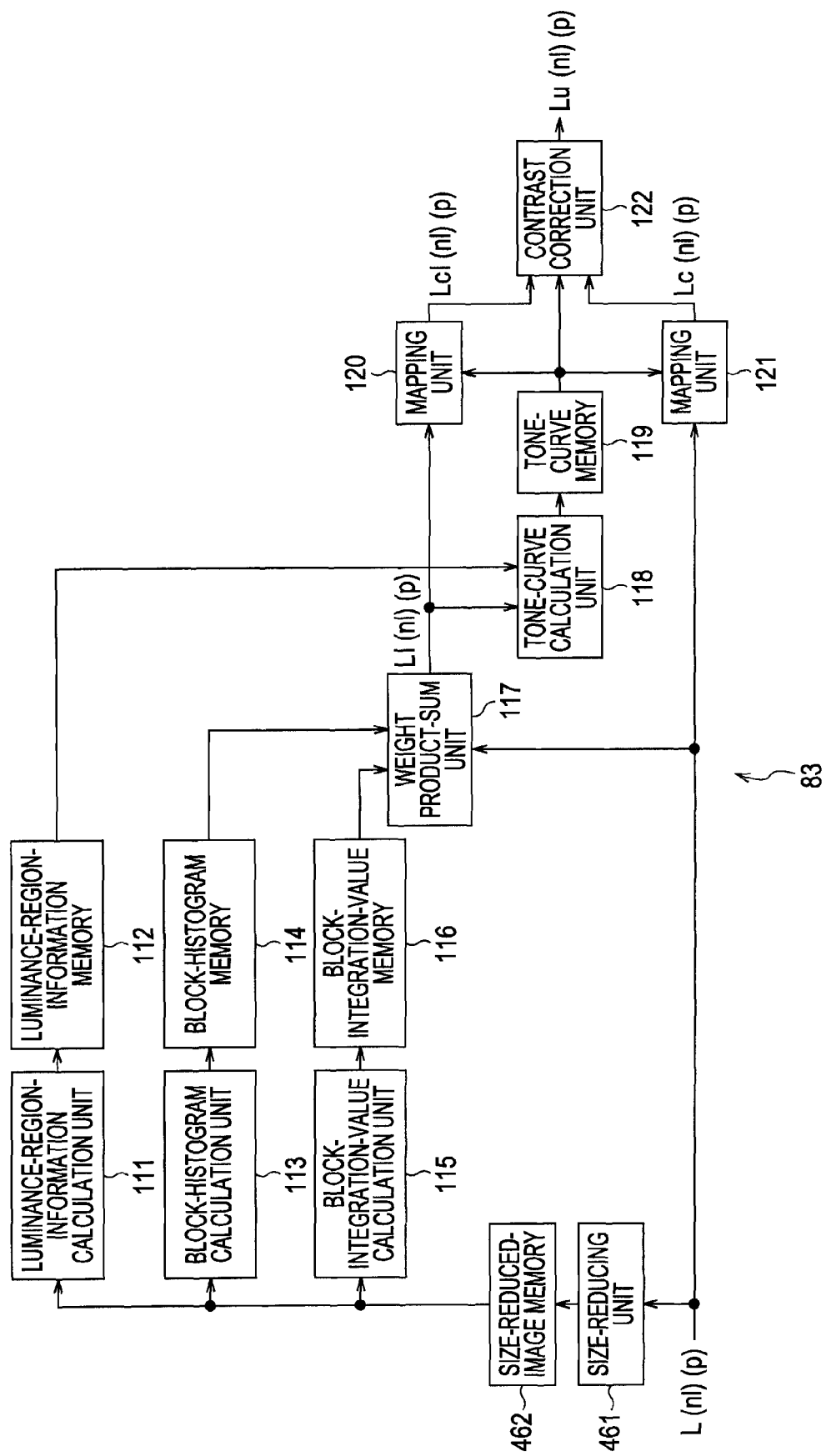
FIG. 27 is a diagram illustrating an example of still another configuration of the luminance-tone correction unit.

When the luminance-tone correction unit 83 generates a size-reduced image, the luminance-tone correction unit 83 is configured as shown in FIG. 27, for example. Note that, in FIG. 27, components corresponding to those of FIG. 5 are denoted by reference numerals the same as those shown in FIG. 5, and descriptions thereof are omitted where appropriate.

The luminance-tone correction unit 83 shown in FIG. 27 includes a size-reducing unit 461 and a size-reduced-image memory 462 in addition to the components of the luminance-tone correction unit 83 shown in FIG. 5.

The size-reducing unit 461 reads luminance values L(nl)(p) of processing pixels included in a luminance image from the nonlinear conversion unit 82, and generates a size-reduced image in accordance with the read luminance values L(nl)(p). For example, the size-reducing unit 461 determines a mean value of the luminance values of the pixels within a region included in the luminance image positioned so as to correspond to pixels of the size-reduced image to be generated as luminance values of the pixels included in the size-reduced image. The size-reducing unit 461 supplies the size-reduced image to the size-reduced-image memory 462.

The size-reduced-image memory 462 temporarily stores the size-reduced image supplied from the size-reducing unit 461.

Furthermore, the luminance-region-information calculation unit 111, the block-histogram calculation unit 113, and the block-integration-value calculation unit 115 successively set each of the pixels of the size-reduced image recorded in the size-reduced-image memory 462 as a processing pixel and calculate luminance-region information, block histograms, and block integration values from the size-reduced image.

Figure 28:
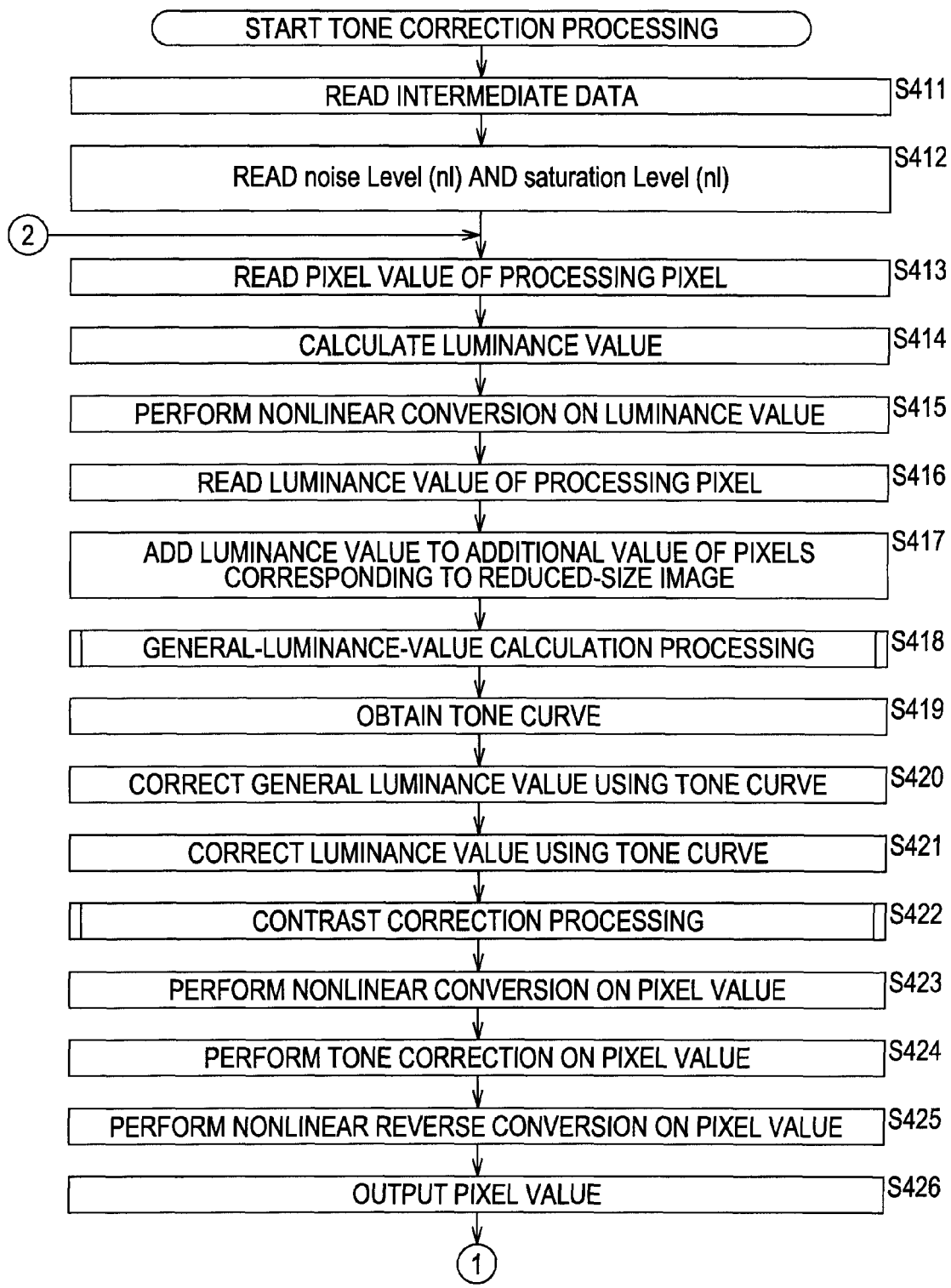
FIG. 28 is a flowchart illustrating tone correction processing.
Figure 29:
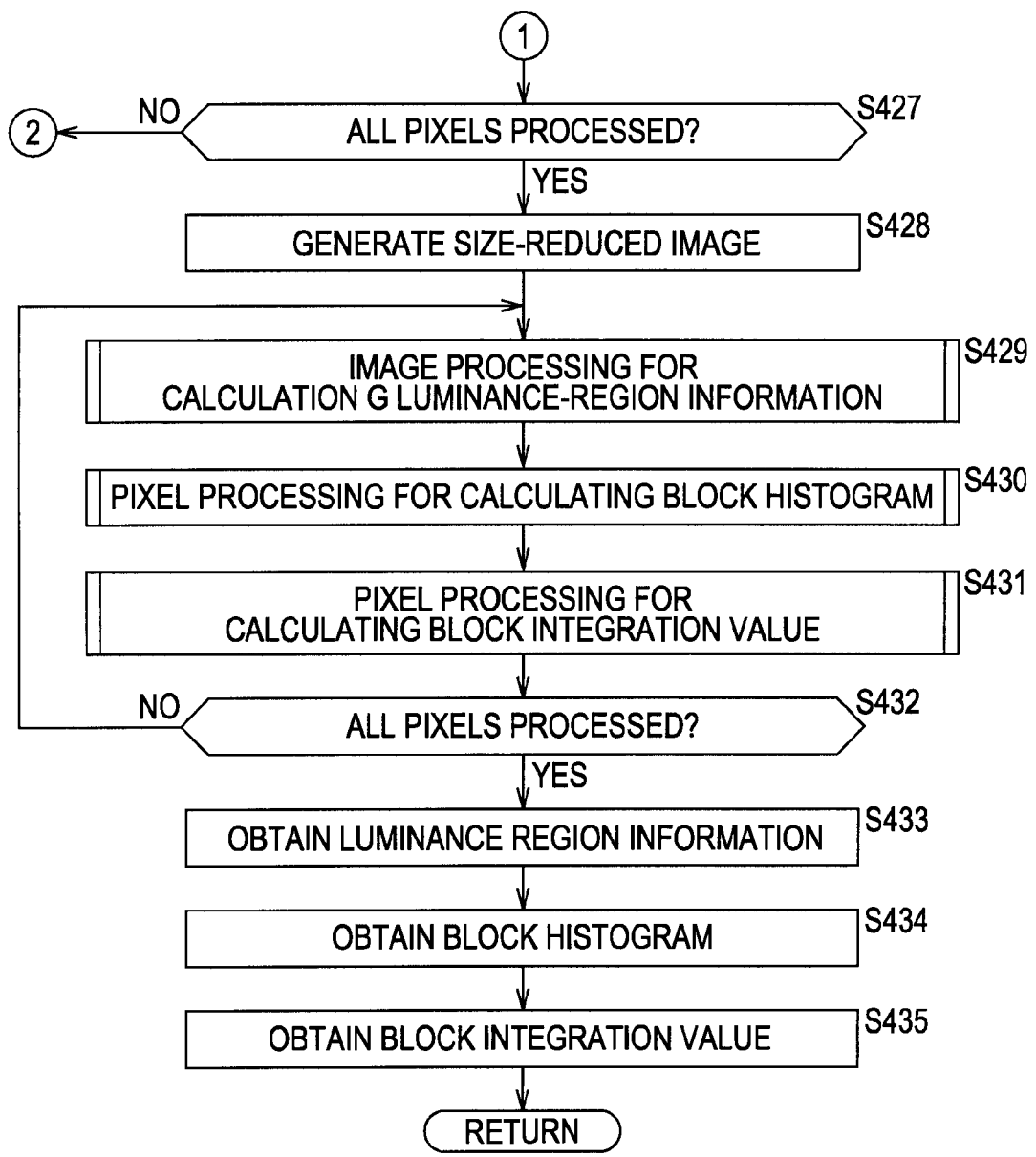
FIG. 29 is a flowchart illustrating the tone correction processing.

Next, referring to flowcharts of FIGS. 28 and 29, tone correction processing performed when the luminance-tone correction unit 83 is configured as shown in FIG. 27 will be described. The tone correction processing corresponds to the operation in step S14 of FIG. 11.

Note that operations in step S411 to step S416 are the same as those in step S41 to step S46 shown in FIG. 12, and therefore, descriptions thereof are omitted.

In step S417, the size-reducing unit 461 adds a luminance value L(nl)(p) of a processing pixel read from the nonlinear conversion unit 82 to an additional value of a corresponding pixel included in the size-reduced image.

That is, the size-reducing unit 461 stores additional values of the individual pixels included in the size-reduced image to be generated. The additional values are updated to 0 every time generation of a size-reduced image corresponding to a luminance image in a new frame is started. After reading the luminance value of the processing pixel, the size-reducing unit 461 specifies a pixel included in the size-reduced image corresponding to the processing pixel, that is, a pixel of the size-reduced image at a corresponding position, and adds the luminance value of the processing pixel to the additional value of the specified pixel of the size-reduced image.

In this way, every time a luminance value of a processing pixel of the luminance image is read, the read luminance value is added to the additional value of the pixel of the size-reduced image corresponding to the processing pixel. By this, for each pixel of the size-reduced image, a sum of luminance values of pixels included in a region of the luminance image which correspond to the pixels included in the size-reduced image is obtained as an additional value.

After the luminance value of the processing pixel is added to the additional value of the pixel corresponding to the size-reduced image, operations in step S418 to step S426 are performed. Note that these operations are the same as the operations in step S50 to step S58 shown in FIGS. 12 and 13, and therefore, descriptions thereof are omitted.

In step S427, the tone correction processor 53 determines whether all pixels included in an RGB image of the frame being processed have been processed. When the determination is negative in step S427, that is when it is determined that at least one of the pixels has not been set as a processing pixel, the process returns to step S413, and the foregoing processing is performed again.

On the other hand, when it is determined that all the pixels have been processed in step S427, the size-reducing unit 461 generates a size-reduced image in accordance with additional values, which have been stored, for individual pixels included in the size-reduced image to be generated in step S428. That is, the size-reducing unit 461 divides the additional values by the number of pixels included in regions in the luminance image corresponding to the pixels, and determines resultant values as luminance values of the pixels of the size-reduced image. After generating the size-reduced image, the size-reducing unit 461 supplies the size-reduced image to the size-reduced-image memory 462 which stores the size-reduced image.

After the size-reduced image is generated, operations in step S429 to step S431 are performed. Note that these operations are the same as those in step S47 to step S49, and therefore descriptions thereof are omitted. Furthermore, in the operations in step S429 to step S431, each of the pixels in the size-reduced image is successively selected as a processing pixel. That is, the processing is performed using the luminance values of the pixels of the size-reduced image.

After the pixel processing for calculating block integration values is performed in step S431, the luminance-tone correction unit 83 determines whether all the pixels of the size-reduced image recorded in the size-reduced-image memory 462 have been processed in step S432. For example, when all the pixels of the size-reduced image have been set as the processing pixels and the operations from step S429 to step S431 are performed, it is determined that all the pixels have been processed.

In step S432, when it is determined that at least one of the pixels has not been processed, the process returns to step S429 where the next one of the pixels included in the size-reduced image is set as the processing pixel, and the processing described above is performed again.

On the other hand, when it is determined that all the pixels have been processed in step S432, the luminance-region-information calculation unit 111 obtains luminance-region information in step S433. Then, thereafter, operations in step S434 and step S435 are performed, the tone correction processing is terminated, and the process proceeds to step S15 of FIG. 11. Note that the operations in step S433 to step S435 are the same as those in step S60 to step S62, and therefore descriptions thereof are omitted.

As described above, the luminance-tone correction unit 83 generates a size-reduced image from the luminance image, and generates intermediate data using the size-reduced image.

As described above, by reducing the size of the luminance image before the intermediate data is generated, an amount of operation for generating the intermediate data can be reduced, and in addition, a consumption amount of the memory in the operation can be reduced.

Note that the size-reduced-image memory 462 and the size-reducing unit 461 may be arranged in preceding stages of the luminance-region-information calculation unit 111, the block-histogram calculation unit 113, and the block-integration-value calculation unit 115 in the luminance-tone correction unit 83 shown in FIG. 22.

Furthermore, the block-integration-value calculation unit 115 and the block-integration-value memory 116 may not be included in the luminance-tone correction unit 83 shown in FIG. 5 only if sufficiently fine division of blocks in the luminance direction for block histograms, that is, sufficiently fine division of spatial blocks into luminance blocks, can be attained. In this case, for each luminance block, a value obtained by multiplying a center value λ by a block histogram of a luminance block of interest is determined as a block integration value. That is, the center value λ of the luminance block a value obtained by multiplying the center value λ by the block histogram is determined as a characteristic value representing a characteristic of the luminance block.

In this case, the general luminance value Ll(nl)(p) are obtained by calculating equation (16) below instead of equation (7) described above using the weighted product-sum unit 117.

Equation (16)

$$Ll(nl)(p) = \frac{\sum_\lambda \lambda \cdot Hinterpolated(\lambda) \cdot \phi(\lambda, L(nl)(p))}{\sum_\lambda Hinterpolated(\lambda) \cdot \phi(\lambda, L(nl)(p))} \quad (16)$$

Specifically, a numerator of equation (16) "$\sum_\lambda \lambda \cdot Hinterpolated(\lambda) \cdot \phi(\lambda, L(nl)(p))$" is a luminance integration value obtained through product sum operation.

Furthermore, when a stable dynamic range of the RGB image (luminance image) can be expected, the luminance-region-information calculation unit 111 and the luminance-region-information memory 112 may not be included in the luminance-tone correction unit 83 shown in FIG. 5 and calculation for obtaining the luminance-region information may be omitted.

In this case, among the control points which determine the shape of the tone curve shown in FIG. 14, the control points P4, P5, P7, and P8 are not calculated, and the shape of the tone curve is determined using the remaining control points. Also in this case, since the position of the control point P6 is changed in accordance with the general luminance value Ll(nl)(p) calculated for each pixel, a characteristic of the tone curve in which brightness of each of the pixels is appropriately corrected is maintained.

Note that if a configuration in which different tone curves are set for different pixels is employed, the contrast correction is not a required component of the present invention since the characteristic in which the brightness of each of the pixels is appropriately corrected is maintained. However, if contrast-component calculation using the general luminance value calculated for each pixel and processing for correcting contrast components are employed, more appropriate outputs can be obtained.

Figure 30:
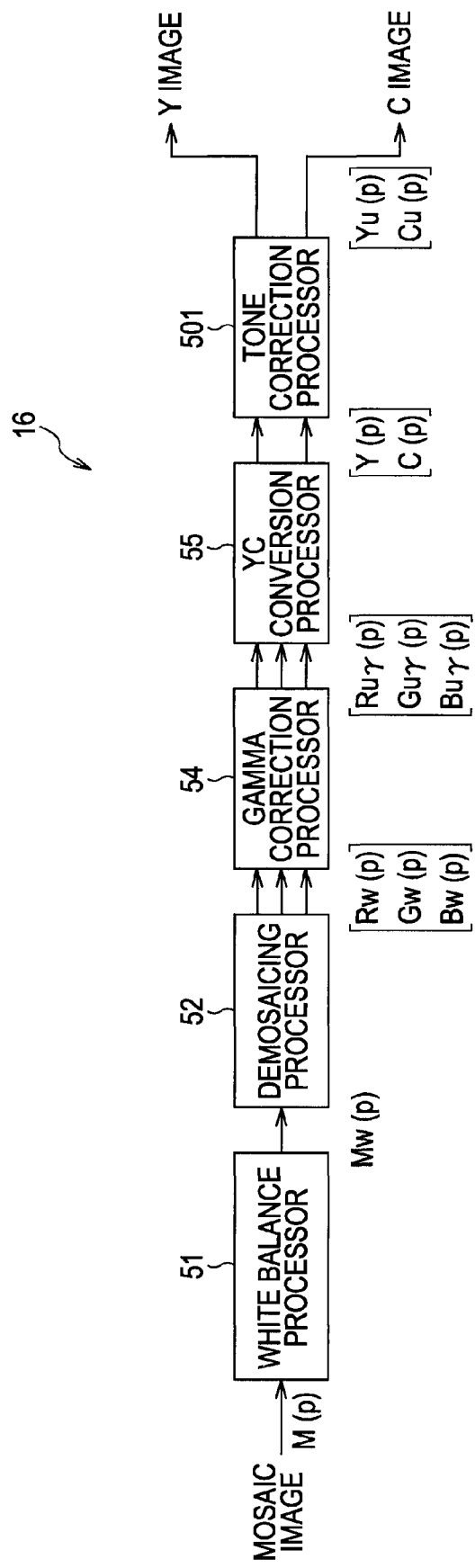
FIG. 30 is a diagram illustrating an example of another configuration of the DSP.

Furthermore, although, in the foregoing description, the tone correction processing is performed on the RGB image, the tone correction processing may be performed on image signals which have been subjected to the YC conversion processing. In this case, the DSP 16 is configured as shown in FIG. 30, for example. Note that, in FIG. 30, components corresponding to those of FIG. 2 are denoted by reference numerals the same as those shown in FIG. 2, and descriptions thereof are omitted where appropriate.

The DSP 16 shown in FIG. 30 is different from the DSP 16 shown in FIG. 2 in that the tone correction processor 53 is not provided between the demosaicing processor 52 and the gamma correction processor 54 and a tone-correction processor 501 is connected to the YC conversion processor 55. The tone-correction processor 501 performs tone correction processing on a Y image and a C image (Cb and Cr components) supplied from the YC conversion processor 55, and supplies the Y image and the C image which have been subjected to the tone correction processing to the LCD driver 18 or the CODEC 20 where appropriate.

Note that a pixel value at a pixel position p of image data which has been subjected to the tone correction processing is denoted by [Yu(p), Cu(p)] hereinafter. Here, Yu(p) denotes values of luminance components in the Y image, and Cu(p) denotes values of color-difference components in the C image. Note that the Cb component and the Cr component of the pixel value Cu(p) are especially denoted by Cbu(p) and Cru(p), respectively, hereinafter.

Figure 31:
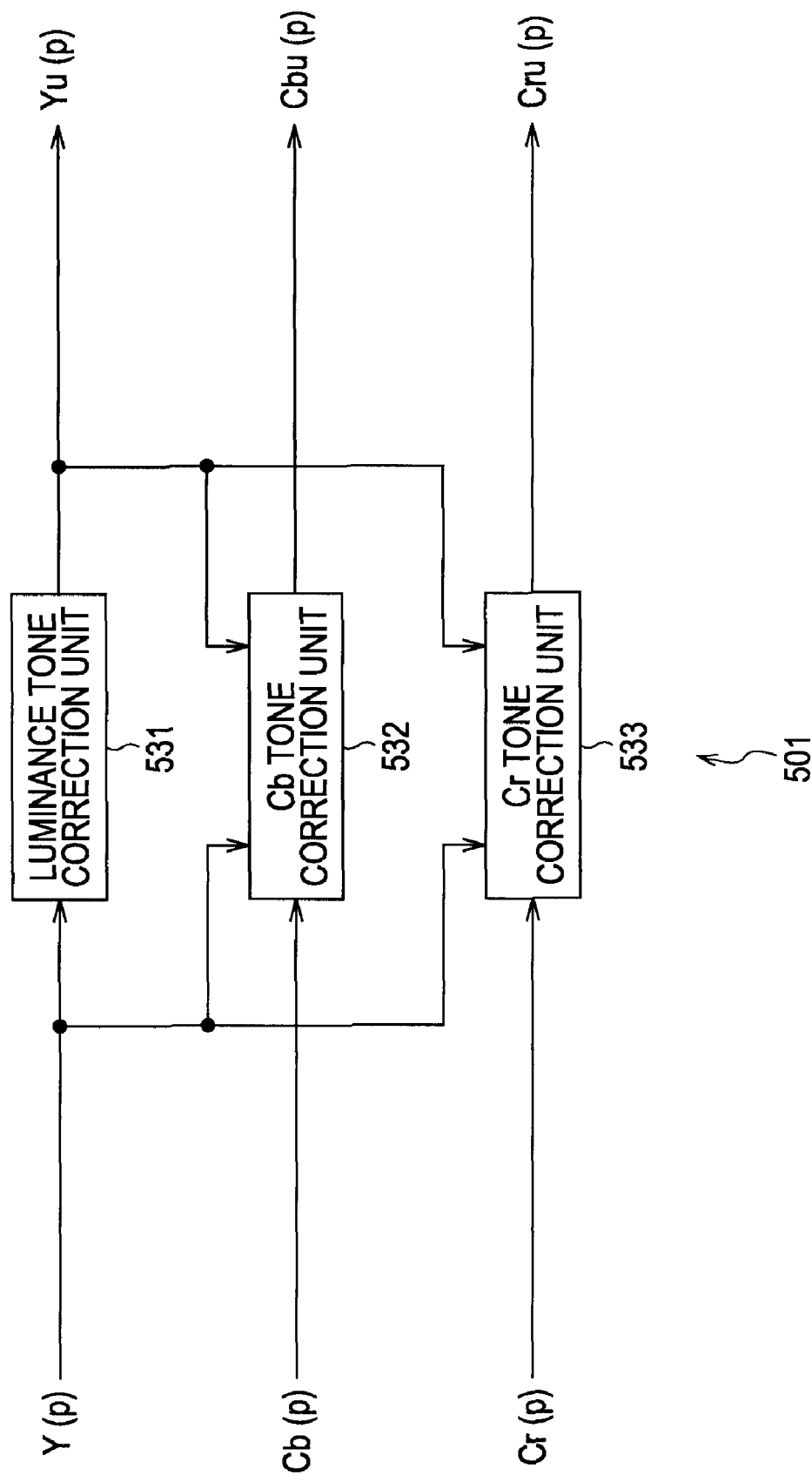
FIG. 31 is a diagram illustrating an example of another configuration of the tone correction processor.

The tone-correction processor 501 shown in FIG. 30 is configured as shown in FIG. 31, for example. Specifically, the tone-correction processor 501 includes a luminance-tone correction unit 531, a Cb tone correction unit 532, and a Cr tone correction unit 533.

The luminance-tone correction unit 531 performs processing the same as that performed by the luminance-tone correction unit 83 shown in FIG. 4, and corrects (compresses) tone of the pixel value Y(p) of the Y image supplied from the YC conversion processor 55. Then, the luminance-tone correction unit 531 supplies the pixel value Yu(p) obtained through the tone correction to the LCD driver 18 or the CODEC 20 where appropriate, and supplies the pixel value Yu(p) to the Cb tone correction unit 532 and the Cr tone correction unit 533.

The Cb tone correction unit 532 performs processing the same as that performed by the tone correction units 85 shown in FIG. 4 using the pixel value Y(p) of the Y image supplied from the YC conversion processor 55 and the pixel value Yu(p) of the Y image supplied from the luminance-tone correction unit 531, correct tone of the pixel value Cb(p) of the C image supplied from the YC conversion processor 55, and supplies the pixel value Cbu(p) obtained through the tone correction to the LCD driver 18 or the CODEC 20 where appropriate.

Furthermore, the Cr tone correction unit 533 performs processing the same as that performed by the tone correction units 85 using the pixel value Y(p) of the Y image supplied from the YC conversion processor 55 and the pixel value Yu(p) of the Y image supplied from the luminance-tone correction unit 531, corrects tone of the pixel value Cr(p) of the C image supplied from the YC conversion processor 55, and supplies the pixel value Cru(p) obtained through the tone correction to the LCD driver 18 or the CODEC 20 where appropriate.

For example, the tone correction by the Cb tone correction unit 532 and the Cr tone correction unit 533 is performed such that, similar to the operation shown in equation (2) described above, the pixel value (the pixel value Cr(p) or the pixel value Cb(p)) of the C image is multiplied by a ratio of the pixel value of the Y image obtained through the tone correction to the pixel value Y(p) of the Y image. That is, the pixel value of the C image is multiplied by a value obtained by dividing the pixel value Yu(p) by the pixel value Y(p).

Since the Y image and the C image, i.e., a luminance signal and a color-difference signal, are supplied to the tone-correction processor 501, it is not necessary to generate a luminance image in the tone-correction processor 501. Furthermore, since the Y image and the C image supplied to the tone-correction processor 501 have already been subjected to gamma correction, the Y image and the C image are not required to be subjected to nonlinear conversion. Therefore, the tone-correction processor 501 does not include blocks corresponding to the luminance calculation unit 81, the nonlinear conversion unit 82, the nonlinear conversion units 84, and the nonlinear reverse conversion units 86.

As described above, by performing the tone correction processing on the Y and C images, tone is more easily corrected.

Figure 32:
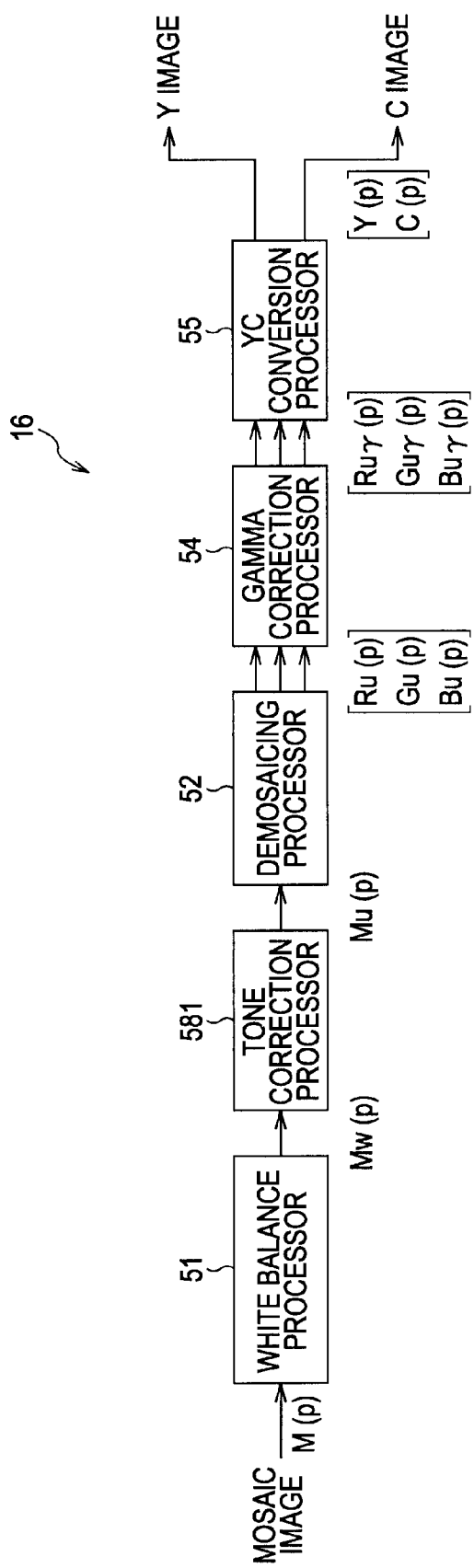
FIG. 32 is a diagram illustrating an example of still another configuration of the DSP.

Furthermore, the tone correction processing may be performed on RAW data, i.e., a mosaic image. In this case, the DSP 16 is configured as shown in FIG. 32, for example. Note that, in FIG. 32, components corresponding to those of FIG.

2 are denoted by reference numerals the same as those shown in FIG. 2, and descriptions thereof are omitted where appropriate.

The DSP 16 shown in FIG. 32 is different from the DSP 16 shown in FIG. 2 in that a tone correction processor 581 is arranged between the white balance processor 51 and the demosaicing processor 52. Specifically, the tone correction processor 53 is arranged between the white balance processor 51 and the gamma correction processor 54 in the DSP 16 shown in FIG. 2 whereas the tone correction processor 581 corresponding to the tone correction processor 53 shown in FIG. 2 is arranged between the white balance processor 51 and the demosaicing processor 52 in the DSP 16 shown in FIG. 32.

Figure 33:
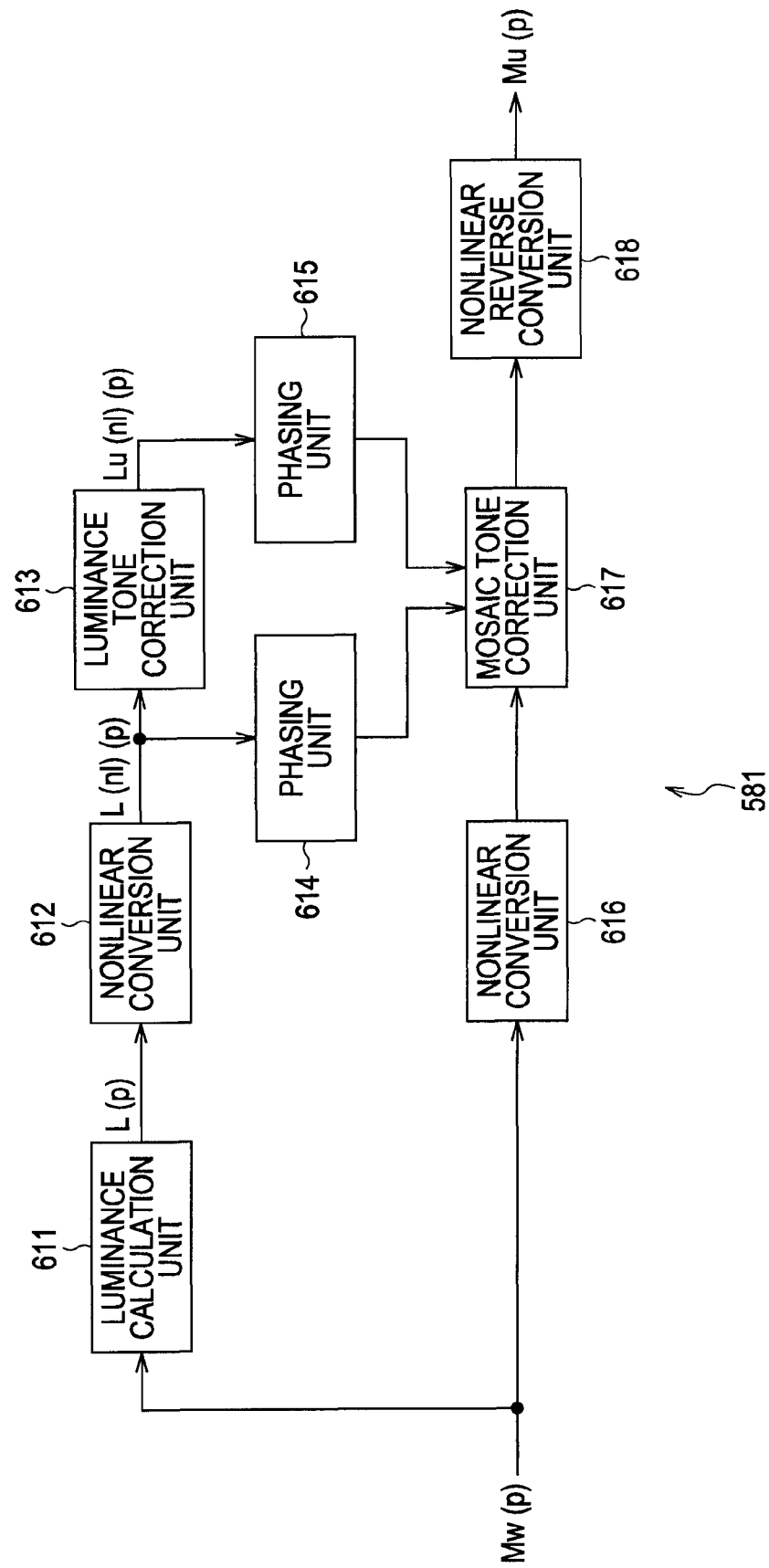
FIG. 33 is a diagram illustrating an example of a further configuration of the tone correction processor.

The tone correction processor 581 performs tone correction processing on a mosaic image Mw supplied from the white balance processor 51 and supplies a mosaic image Mu obtained through the tone correction processing to the demosaicing processor 52. The tone correction processor 581 is configured as shown in FIG. 33, for example.

Specifically, the tone correction processor 581 includes a luminance calculation unit 611, a nonlinear conversion unit 612, a luminance-tone correction unit 613, phasing units 614 and 615, a nonlinear conversion unit 616, a mosaic tone correction unit 617, and a nonlinear reverse conversion unit 618.

The luminance calculation unit 611 performs processing the same as that performed by the luminance calculation unit 81 shown in FIG. 4 and generates a luminance image from the mosaic image Mw. Specifically, the luminance calculation unit 611 sets a value of a pixel at a pixel position p of the mosaic image Mw supplied from the white balance processor 51 to be a pixel value Mw(p) of the processing pixel, calculates luminance values L(p) from some of pixel values of the mosaic image Mw, and supplies the luminance values L(p) to the nonlinear conversion unit 612.

Figure 34:
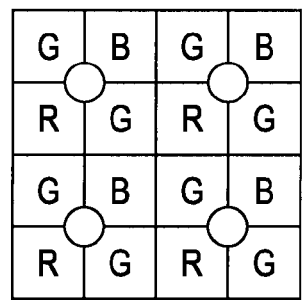
FIG. 34 is a diagram illustrating positions of luminance values to be obtained.

Since each of the pixels included in the mosaic image Mw has, as shown in FIG. 34, one of pixel values corresponding to R, G (Gr or Gb), and B components, the luminance calculation unit 611 refers to not only pixel value Mw(p) of the supplied pixel but also pixel values of pixels in the vicinity of the pixel so as to calculate a luminance value.

In FIG. 34, pixels having R, G, and B components are arranged as Bayer array, and a square denotes a pixel of the mosaic image. Furthermore, in the drawing, letters "R", "G", and "B" included in squares represent that the squares correspond to pixels having pixel values corresponding to R components, G components, and B components.

Making use of a fact that the pixel values of the R, G (Gr components and Gb components), and B components are obtained provided that four pixels in a matrix of 2 pixels×2 pixels which are adjacent to one another are set as a unit, the luminance calculation unit 611 obtains luminance values at positions denoted by circles in the drawing in accordance with the pixel values of the four pixels. That is, in the drawing, a luminance signal is generated as a result of a sum of R, G, and B signals in the four pixels in the vicinity of a circle.

In the example shown in FIG. 34, each of the circles in the drawing is located at a center of a region including an R pixel, a B pixel, and two G pixels. Note that the positions in which the luminance values are obtained are shifted from the positions of the pixels included in the mosaic image by half pixel, and intervals among the positions in which the luminance values are obtained do not correspond to one pixel. However, these displacements of the positions (phases) are negligible when the tone of the luminance values is corrected.

Referring back to the description referred to FIG. 33, the nonlinear conversion unit 612 performs processing the same as that performed by the nonlinear conversion unit 82 shown in FIG. 4 so as to perform nonlinear conversion on the luminance value L(p) supplied from the luminance calculation unit 611 and supplies luminance value L(nl)(p) obtained through the nonlinear conversion to the luminance-tone correction unit 613 and the phasing unit 614.

The luminance-tone correction unit 613 performs processing the same as that performed by the luminance-tone correction unit 83 shown in FIG. 4 so as to compress tone of the luminance value L(nl)(p) supplied from the nonlinear conversion unit 612 whereby the tone correction is performed on the luminance values L(nl)(p), and supplies luminance value Lu(nl)(p) obtained through the tone correction to the phasing unit 615.

The phasing unit 614 performs correction processing using some luminance values which are located in the vicinity of the processing pixel from among the luminance values supplied from the nonlinear conversion unit 612, and calculates a luminance value at the position of the processing pixel through the tone correction. Here, the correction processing performed by the phasing unit 614 corresponds to bilinear correction processing using luminance values at a matrix of 2×2 positions, i.e., four positions, in the vicinity of the processing pixel, for example.

After obtaining the luminance value of the processing pixel, the phasing unit 614 supplies the obtained luminance value to the mosaic tone correction unit 617.

The phasing unit 615 performs correction processing using some luminance values which are located in the vicinity of the processing pixel from among the luminance values supplied from the nonlinear conversion unit 613, and calculates a luminance value at the position of the processing pixel through the tone correction. Here, the correction processing performed by the phasing unit 615 is the same as that performed by the phasing unit 614, and is the bilinear correction processing, for example.

The nonlinear conversion unit 616 performs processing the same as that performed by the nonlinear conversion units 84 shown in FIG. 4 so as to perform nonlinear conversion on the pixel values Mw(p) of the processing pixels supplied from the white balance processor 51, and supplies the pixel values obtained through the nonlinear conversion to the mosaic tone correction unit 617.

The mosaic tone correction unit 617 performs processing the same as that performed by the tone correction units 85 shown in FIG. 4 using the luminance values supplied from the phasing unit 614 and the luminance values obtained through the tone correction supplied from the phasing unit 615, performs tone correction on the pixel values supplied from the nonlinear conversion unit 616, and supplies the pixel values obtained through the tone correction to the nonlinear reverse conversion unit 618. For example, the mosaic tone correction unit 617 performs, similarly to the operation shown in equation (2) as described above, the tone correction on the pixel values by multiplying the pixel values supplied from the nonlinear conversion unit 616 by values obtained by dividing the luminance values obtained through the tone correction supplied from the phasing unit 615 by the luminance value supplied from the phasing unit 614. By this, the pixel value of the processing pixel, that is, the pixel values of the R, G, and B components are subjected to the tone correction.

The nonlinear reverse conversion unit 618 performs nonlinear reverse conversion which is reverse conversion of the nonlinear conversion performed by the nonlinear conversion unit 616 on the pixel values supplied from the mosaic tone correction unit 617. The nonlinear reverse conversion unit 618 supplies pixel values Mu(p) obtained through the nonlinear reverse conversion to the demosaicing processor 52.

As described above, when the tone correction processing is performed on a mosaic image, a position of a luminance value calculated by the luminance calculation unit 611 is different from a position of the processing pixel in the mosaic image. However, since the phasing units 614 and 615 perform phase correction, the luminance value at the position of the processing pixel is obtained.

Note that, as described above, the digital video camera shown in FIG. 1 performs the image processing for extracting a general configuration of an image. Since such information extracted through the image processing can be utilized in processing for improving image quality, as devices which implement blocks and which extract a general configuration of an image, devices other than digital video cameras may be employed. Examples of such a device include imaging apparatus such as digital still cameras, printers, and display apparatuses such as displays. Furthermore, this can be applicable to apparatuses and computer programs used for editing.

The series of operations described above may be executed by hardware or software. When the series of operations are executed by software, programs constituting the software are installed into a computer incorporated in dedicated hardware or a general personal computer, for example, which can execute various functions by installing the various programs from a program recording medium.

Figure 35:
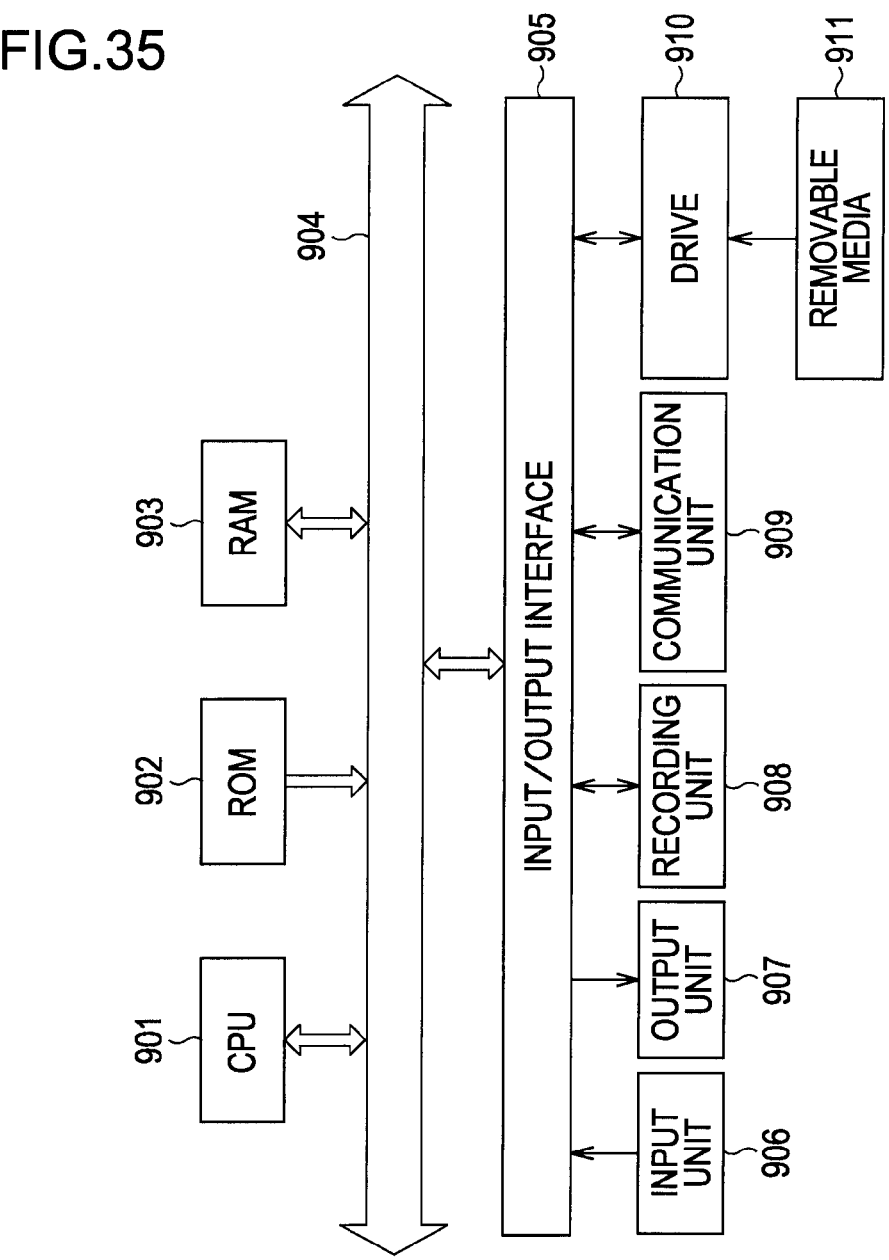
FIG. 35 is a block diagram illustrating an example of a configuration of a computer.

FIG. 35 is a block diagram illustrating an example of a configuration of hardware of a computer which executes the series of operations using programs.

In the computer, a CPU 901, a ROM (Read Only Memory) 902, and a RAM 903 are connected to one another through a bus 904.

An input/output interface 905 is further connected to the bus 904. An input unit 906 including a keyboard, a mouse, and a microphone, an output unit 907 including a display and a speaker, a recording unit 908 including a hard disk and a nonvolatile memory, a communication unit 909 including a network interface, and a drive 910 which drives a removable medium such as a magnetic disk, an optical disc, a magneto-optical disc, or a semiconductor memory are further connected to the bus 904.

In the computer configured as described above, the series of operations is performed by loading a program recorded in the recording unit 908 by the CPU 901 through the input/output interface 905 and the bus 904 into the RAM 903 and executing the program, for example.

The program executed by the computer (CPU 901) may be supplied by being recorded in a removable medium 911 which is a package medium constituted by a magnetic disk (including a flexible disk), an optical disc (including a CD-ROM (Compact Disc-Read Only Memory), a DVD (Digital Versatile Disc)), a magneto-optical disc, or a semiconductor memory or supplied through a wired or a wireless communication medium such as a local area network, the Internet, or digital satellite broadcasting.

Then, the program can be installed into the recording unit 908 through the input/output interface 905 by inserting the removable medium 911 into the drive 910. Furthermore, the program can be received by the communication unit 909 through the wired or wireless communication medium and can be installed in the recording unit 908. Alternatively, the program may be installed into the ROM 902 and the recording unit 908 in advance.

Note that the program executed by the computer may be processed in a time-series manner or in parallel, or may be processed at an appropriate timing when the program is called.

Note that embodiments of the present invention are not limited to the foregoing embodiments, and various modifications may be made without departing from the scope of the invention.

The invention claimed is:

1. An image processing apparatus which performs edge preserving processing on an input image, comprising:
   frequency-value calculation means for calculating, in luminance blocks into which pixels included in spatial blocks obtained by dividing the input image in a spatial direction are classified in accordance with luminance values of the pixels whereby the spatial blocks are further divided in a luminance direction, frequency values of the pixels which belong to the luminance blocks;
   characteristic-value calculation means for calculating characteristic values representing characteristics of the luminance blocks; and
   weighted product-sum means for performing edge preserving smoothing on the input image at pixel positions of the input image, by performing weighted mean on the characteristic values using the characteristic values and the frequency values of neighborhood luminance blocks which are included in the luminance blocks obtained from some of the spatial blocks in the vicinity of the pixels in accordance with a distance between the pixels and the neighborhood luminance blocks in the spatial direction and the luminance direction.

2. The image processing apparatus according to claim 1, wherein the characteristic-value calculation means calculates a sum of luminance values of pixels included in one of the luminance blocks as the characteristic value.

3. The image processing apparatus according to claim 1, wherein the characteristic-value calculation means calculates center values of the luminance ranges of the luminance blocks as the characteristic values.

4. The image processing apparatus according to claim 1, wherein the weighted product-sum means includes
   frequency-value interpolation means for performing interpolation processing using a spatial weight determined in accordance with a relative position between one of the spatial blocks from which the neighborhood luminance blocks are obtained and the pixels and the frequency values in the neighborhood luminance blocks and calculating interpolation frequency values which are frequency values obtained by performing interpolation on the positions of the pixels for each of luminance levels corresponding to the neighborhood luminance blocks,
   characteristic-value interpolation means for performing interpolation processing using the spatial weight and the characteristic values of the neighborhood luminance blocks and calculating interpolation characteristic values which are characteristic values obtained by performing interpolation on the positions of the pixels for each of the luminance levels corresponding to the neighborhood luminance blocks,
   frequency-value product-sum means for obtaining a sum of the interpolation frequency values which are multiplied by luminance weight determined by the luminance values of the pixels and the luminance levels corresponding to the neighborhood luminance blocks and calculating a weighted sum of the interpolation frequency values using the luminance weight, characteristic-value product-sum means for obtaining a sum of the interpolation characteristic values which are multiplied by the luminance weight and calculating a weighted sum of the interpolation characteristic values using the luminance weight, and dividing means for calculating a weighted mean of the characteristic values by dividing a weighted sum of the interpolation characteristic values by a weighted sum of the interpolation frequency values.

5. The image processing apparatus according to claim 1, wherein the weighted product-sum means includes first convolution means for convolving, for each spatial block, a luminance weight function in which a luminance value is employed as a variable to the frequency values of the neighborhood luminance blocks obtained from the spatial blocks, second convolution means for convolving, for each spatial block, the luminance weight function to the characteristic values of the neighborhood luminance blocks obtained from the spatial blocks, frequency-value interpolation means for performing interpolation processing using a spatial weight determined in accordance with a relative position between one of the spatial blocks from which the neighborhood luminance blocks are obtained and the pixels and the frequency values to which the luminance weight function is convolved, and calculating interpolation frequency values which are frequency values obtained through interpolation performed on the luminance values of the pixels at the pixel positions, characteristic-value interpolation means for performing interpolation processing using the spatial weight and the characteristic values to which the luminance weight function is convolved, and calculating interpolation characteristic values which are characteristic values obtained through interpolation performed on the luminance values of the pixels at the pixel positions, and dividing means for calculating a weighted mean of the characteristic value by dividing the interpolation characteristic value.

6. The image processing apparatus according to claim 5, wherein the weighted product-sum means further includes frequency-value storage means for storing the frequency values to which the luminance weight function is convolved and which are calculated from the input image of a predetermined frame for a period of time corresponding to one frame of the input image, and characteristic-value storage means for storing the characteristic values to which the luminance weight function is convolved and which are calculated from the input image of a predetermined frame for a period of time corresponding to one frame of the input image, wherein the frequency-value interpolation means calculates the interpolation frequency values of the input image in a frame following the predetermined frame using the frequency values which are stored in the frequency-value storage means and which are calculated from the input image of the predetermined frame, and wherein the characteristic-value interpolation means calculates the interpolation characteristic values of the input image in the following frame using the characteristic values which are stored in the characteristic-value storage means and which are calculated from the input image of the predetermined frame.

7. The image processing apparatus according to claim 1, further comprising:

size-reduced-image generating means for generating a size-reduced image obtained by reducing a size of the input image in accordance with the input image, wherein the frequency-value calculation means calculates frequency values of pixels of the size-reduced image which belong to luminance blocks obtained by dividing the size-reduced image in a spatial direction and a luminance direction, and wherein the characteristic-value calculation means calculates characteristic values representing characteristics of luminance blocks obtained by dividing the size-reduced image in a spatial direction and a luminance direction.

8. The image processing apparatus according to claim 1, further comprising:

frequency-value storage means for storing the frequency values calculated from the input image of a predetermined frame for a period of time corresponding to one frame of the input image; and characteristic-value storage means for storing the characteristic values calculated from the input image of a predetermined frame for a period of time corresponding to one frame of the input image, wherein the weighted product-sum means performs a weighted mean on the characteristic values of the input image in a frame following the predetermined frame using the frequency values which are stored in the frequency-value storage means and the characteristic values which are stored in the characteristic-value storage means.

9. An image processing method which performs edge preserving smoothing processing on an input image using at least one processor, the image processing method comprising the steps of:

calculating, using the at least one processor, in luminance blocks into which pixels included in spatial blocks obtained by dividing the input image in a spatial direction are classified in accordance with luminance values of the pixels whereby the spatial blocks are further divided in a luminance direction, frequency values of the pixels which belong to the luminance blocks;

calculating, using the at least one processor, characteristic values representing characteristics of the luminance blocks; and performing edge preserving smoothing on the input image at pixel positions of the input image, by performing weighted mean on the characteristic values using the characteristic values and the frequency values of neighborhood luminance blocks which are included in the luminance blocks obtained from some of the spatial blocks in the vicinity of the pixels in accordance with a distance between the pixels and the neighborhood luminance blocks in the spatial direction and the luminance direction using the at least one processor.

10. A non-transitory computer readable medium comprising instructions for image processing used to perform edge preserving smoothing processing on an input image, the instructions comprising the steps of:

calculating, in luminance blocks into which pixels included in spatial blocks obtained by dividing the input image in a spatial direction are classified in accordance with luminance values of the pixels whereby the spatial blocks are further divided in a luminance direction, frequency values of the pixels which belong to the luminance blocks;

calculating characteristic values representing characteristics of the luminance blocks; and performing edge preserving smoothing on the input image at pixel positions of the input image, by performing weighted mean on the characteristic values using the characteristic values and the frequency values of neighborhood luminance blocks which are included in the luminance blocks obtained from some of the spatial blocks in the vicinity of the pixels in accordance with a distance between the pixels and the neighborhood luminance blocks in the spatial direction and the luminance direction.

11. An image processing apparatus which performs tone correction on an input image, comprising:

frequency-value calculation means for calculating, in luminance blocks into which pixels included in spatial blocks obtained by dividing the input image in a spatial direction are classified in accordance with luminance values of the pixels whereby the spatial blocks are further divided in a luminance direction, frequency values of the pixels which belong to the luminance blocks;

characteristic-value calculation means for calculating characteristic values representing characteristics of the luminance blocks;

weighted product-sum means for calculating a general luminance value representing average brightness of an object region including the pixels in the input image at pixel positions of the input image, by performing weighted mean on the characteristic values using the characteristic values and the frequency values of neighborhood luminance blocks which are included in the luminance blocks obtained from some of the spatial blocks in the vicinity of the pixels in accordance with a distance between the pixels and the neighborhood luminance blocks in the spatial direction and the luminance direction;

tone-curve calculation means for calculating, at the pixel positions, a shape of a tone cure for each pixel in accordance with the general luminance value; and luminance-value tone-correction means for correcting tone of the luminance values of the pixels using the tone curve at the pixel positions.

12. The image processing apparatus according to claim 11, wherein when the general luminance value is subjected to tone correction using the tone curve, the tone-curve calculation means calculates the shape of the tone curve such that the general luminance value is converted in to a value substantially in the middle of a possible range of a luminance value after the tone correction using the tone curve.

13. The image processing apparatus according to claim 11, further comprising:

general-luminance-value tone-correction means for correcting tone of the general luminance value of the pixels using the tone curve at the pixel positions; and contrast correction means for correcting contrast of the luminance values obtained through the tone correction performed by the luminance-value tone-correction means in accordance with the general luminance value obtained through the tone correction performed by the general-luminance-value tone-correction means and the shape of the tone curve.

14. The image processing apparatus according to claim 11, wherein the weighted product-sum means includes frequency-value interpolation means for performing interpolation processing using a spatial weight determined in accordance with a relative position between one of the spatial blocks from which the neighborhood luminance blocks are obtained and the pixels and the frequency values in the neighborhood luminance blocks and calculating interpolation frequency values which are frequency values obtained by performing interpolation on the positions of the pixels for each of luminance levels corresponding to the neighborhood luminance blocks, characteristic-value interpolation means for performing interpolation processing using the spatial weight and the characteristic values of the neighborhood luminance blocks and calculating interpolation characteristic values which are characteristic values obtained by performing interpolation on the positions of the pixels for each of the luminance levels corresponding to the neighborhood luminance blocks, frequency-value product-sum means for obtaining a sum of the interpolation frequency values which are multiplied by luminance weight determined by the luminance values of the pixels and the luminance levels corresponding to the neighborhood luminance blocks and calculating a weighted sum of the interpolation frequency values using the luminance weight, characteristic-value product-sum means for obtaining a sum of the interpolation characteristic values which are multiplied by the luminance weight and calculating a weighted sum of the interpolation characteristic values using the luminance weight, and dividing means for calculating a weighted mean of the characteristic values by dividing a weighted sum of the interpolation characteristic values by a weighted sum of the interpolation frequency values.

15. The image processing apparatus according to claim 11, wherein the weighted product-sum means includes first convolution means for convolving, for each spatial block, a luminance weight function in which a luminance value is employed as a variable to the frequency values of the neighborhood luminance blocks obtained from the spatial blocks, second convolution means for convolving, for each spatial block, the luminance weight function to the characteristic values of the neighborhood luminance blocks obtained from the spatial blocks, frequency-value interpolation means for performing interpolation processing using a spatial weight determined in accordance with a relative position between one of the spatial blocks from which the neighborhood luminance blocks are obtained and the pixels and the frequency values to which the luminance weight function is convolved, and calculating interpolation frequency values which are frequency values obtained through interpolation performed on the luminance values of the pixels at the pixel positions, characteristic-value interpolation means for performing interpolation processing using the spatial weight and the characteristic values to which the luminance weight function is convolved, and calculating interpolation characteristic values which are characteristic values obtained through interpolation performed on the luminance values of the pixels at the pixel positions, and dividing means for calculating a weighted mean of the characteristic value by dividing the interpolation characteristic value.

16. The image processing apparatus according to claim 15, wherein the weighted product-sum means further includes frequency-value storage means for storing the frequency values to which the luminance weight function is convolved and which are calculated from the input image of a predetermined frame for a period of time corresponding to one frame of the input image, and characteristic-value storage means for storing the characteristic values to which the luminance weight function is convolved and which are calculated from the input image of a predetermined frame for a period of time corresponding to one frame of the input image, wherein the frequency-value interpolation means calculates the interpolation frequency values of the input image in a frame following the predetermined frame using the frequency values which are stored in the frequency-value storage means and which are calculated from the input image of the predetermined frame, and wherein the characteristic-value interpolation means calculates the interpolation characteristic values of the input image in the following frame using the characteristic values which are stored in the characteristic-value storage means and which are calculated from the input image of the predetermined frame.

17. The image processing apparatus according to claim 11, further comprising:

size-reduced-image generating means for generating a size-reduced image obtained by reducing a size of the input image in accordance with the input image, wherein the frequency-value calculation means calculates frequency values of pixels of the size-reduced image which belong to luminance blocks obtained by dividing the size-reduced image in a spatial direction and a luminance direction, and wherein the characteristic-value calculation means calculates characteristic values representing characteristics of luminance blocks obtained by dividing the size-reduced image in a spatial direction and a luminance direction.

18. The image processing apparatus according to claim 11, further comprising:

frequency-value storage means for storing the frequency values calculated from the input image of a predetermined frame for a period of time corresponding to one frame of the input image; and characteristic-value storage means for storing the characteristic values calculated from the input image of a predetermined frame for a period of time corresponding to one frame of the input image, wherein the weighted product-sum means performs a weighted mean on the characteristic values of the input image in a frame following the predetermined frame using the frequency values which are stored in the frequency-value storage means and the characteristic values which are stored in the characteristic-value storage means.

19. An image processing method which performs tone correction on an input image using at least one processor, the image processing method comprising the steps of:

calculating, using the at least one processor, in luminance blocks into which pixels included in spatial blocks obtained by dividing the input image in a spatial direction are classified in accordance with luminance values of the pixels whereby the spatial blocks are further divided in a luminance direction, frequency values of the pixels which belong to the luminance blocks;

calculating, using the at least one processor, characteristic values representing characteristics of the luminance blocks;

calculating, using the at least one processor, a general luminance value representing average brightness of an object region including the pixels in the input image by performing weighted mean on the characteristic values using the characteristic values and the frequency values of neighborhood luminance blocks which are included in the luminance blocks obtained from some of the spatial blocks in the vicinity of the pixels in accordance with a distance between the pixels and the neighborhood luminance blocks in the spatial direction and the luminance direction;

calculating, at the pixel positions, a shape of a tone cure for each pixel in accordance with the general luminance value using the at least one processor; and correcting tone of the luminance values of the pixels using the tone curve at the pixel positions using the at least one processor.

20. A non-transitory computer readable medium comprising instructions for image processing used to perform tone correction on an input image, the instructions comprising the steps of:

calculating, in luminance blocks into which pixels included in spatial blocks obtained by dividing the input image in a spatial direction are classified in accordance with luminance values of the pixels whereby the spatial blocks are further divided in a luminance direction, frequency values of the pixels which belong to the luminance blocks;

calculating characteristic values representing characteristics of the luminance blocks;

calculating a general luminance value representing average brightness of an object region including the pixels in the input image by performing weighted mean on the characteristic values using the characteristic values and the frequency values of neighborhood luminance blocks which are included in the luminance blocks obtained from some of the spatial blocks in the vicinity of the pixels in accordance with a distance between the pixels and the neighborhood luminance blocks in the spatial direction and the luminance direction;

calculating, at the pixel positions, a shape of a tone cure for each pixel in accordance with the general luminance value; and correcting tone of the luminance values of the pixels using the tone curve at the pixel positions.

* * * * *